US012070955B2

(12) United States Patent
Hosokawa et al.

(10) Patent No.: US 12,070,955 B2
(45) Date of Patent: Aug. 27, 2024

(54) STORAGE DEVICE AND LIQUID EJECTION APPARATUS

(71) Applicant: SEIKO EPSON CORPORATION, Tokyo (JP)

(72) Inventors: Yasuhiro Hosokawa, Nagano (JP); Takanori Yokoi, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 126 days.

(21) Appl. No.: 18/058,327

(22) Filed: Nov. 23, 2022

(65) Prior Publication Data

US 2023/0158805 A1 May 25, 2023

(30) Foreign Application Priority Data

Nov. 25, 2021 (JP) ................................ 2021-190889

(51) Int. Cl.
*B41J 2/175* (2006.01)

(52) U.S. Cl.
CPC ....... *B41J 2/17566* (2013.01); *B41J 2/17513* (2013.01); *B41J 2/17523* (2013.01); *B41J 2002/17579* (2013.01)

(58) Field of Classification Search
CPC .... B41J 2/175; B41J 2/17503; B41J 2/17506; B41J 2/17509; B41J 2/17513; B41J 2/1752; B41J 2/17523; B41J 2/1753; B41J 2/17553; B41J 2/17566; B41J 29/13; B41J 2002/17579
See application file for complete search history.

(56) References Cited

U.S. PATENT DOCUMENTS

2002/0122083 A1* 9/2002 Hsu ..................... B41J 2/17566 347/7
2009/0040262 A1 2/2009 Watanabe
2011/0025790 A1* 2/2011 Serizawa ............ B41J 2/17509 347/86
2012/0194582 A1* 8/2012 Matsubara .......... B41J 2/17566 347/7

FOREIGN PATENT DOCUMENTS

JP 2008-230227 A 10/2008

* cited by examiner

*Primary Examiner* — Anh T Vo
(74) *Attorney, Agent, or Firm* — Global IP Counselors, LLP

(57) ABSTRACT

A storage device includes a storage section including a plurality of walls and storing an object in a space surrounded by the plurality of walls, a first electrode provided in a first portion of a first wall among the plurality of walls, a second electrode provided in a second wall among the plurality of walls, and a first support portion supporting the first portion and a second portion among the plurality of walls. The first portion is thinner than the second portion.

10 Claims, 19 Drawing Sheets

STORAGE DEVICE AND LIQUID EJECTION APPARATUS

The present application is based on, and claims priority from JP Application Serial Number 2021-190889, filed Nov. 25, 2021, the disclosure of which is hereby incorporated by reference herein in its entirety.

BACKGROUND

1. Technical Field

The present disclosure relates to a storage device and a liquid ejection apparatus.

2. Related Art

A technique for detecting a storage amount of an object stored in a storage device has been proposed. For example, JP-A-2008-230227 describes a remaining amount detection sensor that detects a remaining amount of contents of a container. This type of remaining amount detection sensor includes a detection electrode arranged to face the container and a guard electrode arranged to face the detection electrode. The remaining amount detection sensor detects the remaining amount of the contents of the container based on a capacitance measured by the detection electrode with a potential of the guard electrode as a reference potential.

By the way, depending on a use of a device for detecting a storage amount of an object stored in a storage device, it is required to improve a detection accuracy of the storage amount of the object stored in the storage device. In the storage device of the related art, there is a room for further improvement from a viewpoint of improving the detection accuracy of the storage amount of the object.

SUMMARY

In order to solve the above problems, a storage device according to an aspect of the present disclosure includes a storage section including a plurality of walls and storing an object in a space surrounded by the plurality of walls, a first electrode provided in a first portion of a first wall among the plurality of walls, a second electrode provided in a second wall among the plurality of walls, and a first support portion supporting the first portion and a second portion among the plurality of walls, in which the first portion is thinner than the second portion.

Further, a liquid ejection apparatus according to another aspect of the present disclosure includes a storage device storing a liquid; a detection circuit detecting a storage amount of the liquid stored in the storage device; and an ejection section ejecting the liquid supplied from the storage device, in which the storage device includes a storage section including a plurality of walls and storing the liquid in a space surrounded by the plurality of walls, a first electrode provided in a first portion of a first wall among the plurality of walls, a second electrode provided in a second wall among the plurality of walls, and a first support portion supporting the first portion and a second portion among the plurality of walls, and the first portion is thinner than the second portion.

DESCRIPTION OF EXEMPLARY EMBODIMENTS

Hereinafter, embodiments for carrying out the present disclosure will be explained with reference to the drawings. However, in each figure, the dimensions and scale of each portion are different from the actual dimension and scale as appropriate. Further, since embodiments described below are preferred specific examples of the present disclosure, various technically preferable limitations are attached, but the scope of the present disclosure is not limited to the limited forms unless stated otherwise to particularly limit the present disclosure in the following description.

1. Embodiment

First, a configuration of an ink jet printer 1 according to the present embodiment will be explained with reference to FIG. 1.

Figure 1:
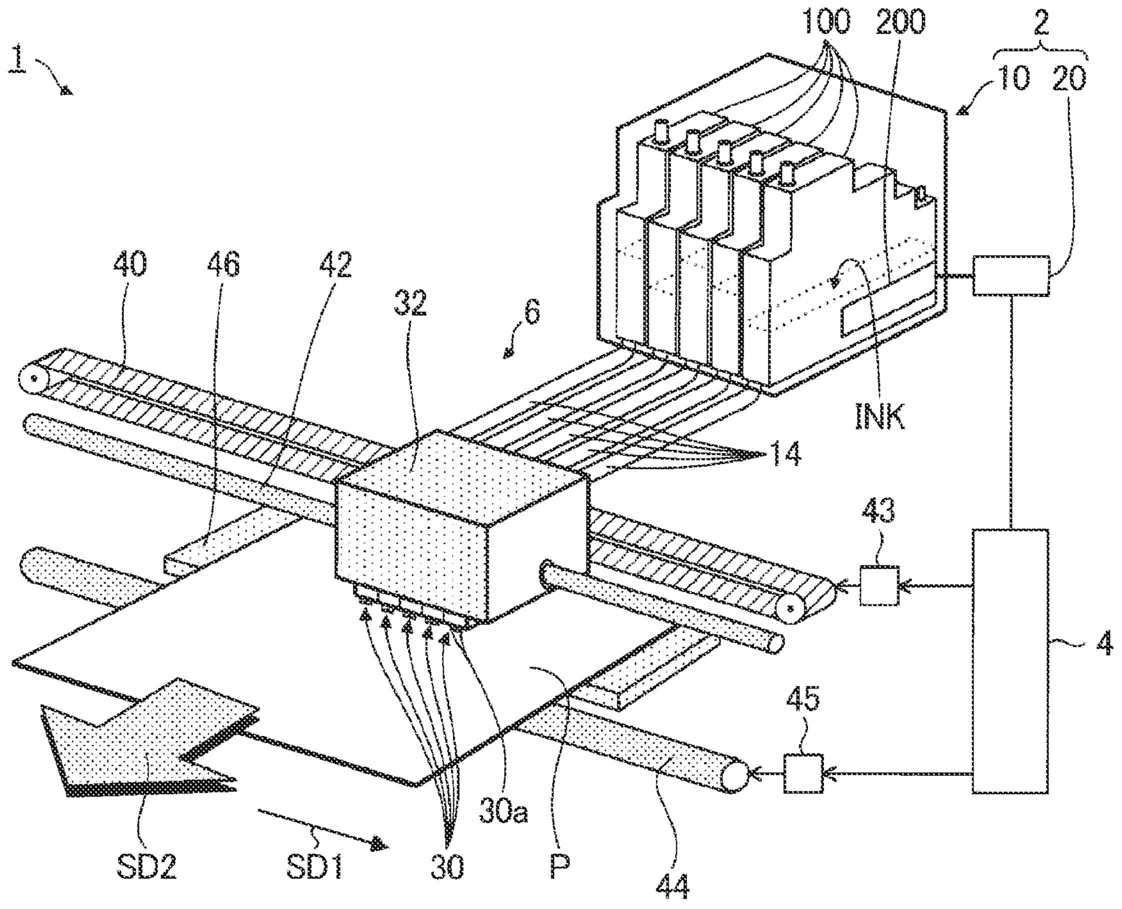
FIG. 1 is an explanatory diagram for explaining an example of a configuration of a liquid ejection apparatus according to an embodiment of the present disclosure.

FIG. 1 is an explanatory diagram for explaining an example of the configuration of the ink jet printer 1 according to the embodiment of the present disclosure. Note that FIG. 1 shows an example of a partial configuration of the ink jet printer 1. The ink jet printer 1 is an example of a "liquid ejection apparatus".

For example, the ink jet printer 1 ejects ink INK to form an image on a print medium P such as printing paper. Specifically, the ink jet printer 1 is supplied with print data indicating an image to be formed by the ink jet printer 1 from a host computer such as a personal computer or a digital camera. The ink jet printer 1 executes a printing process of forming an image indicated by the print data supplied from the host computer on the print medium P. The print medium P is not limited to the printing paper. For example, the print medium P may be a medium of any material such as a resin film or a cloth. In addition, the ink INK is an example of an "object" and a "liquid". In the present embodiment, it is assumed that the ink jet printer 1 is a serial printer. The ink jet printer 1 may have any of a copy function, a scanner function, a facsimile transmission function, and a facsimile reception function in addition to a printing function. That is, the ink jet printer 1 may correspond to a so-called "multi-function device".

The ink jet printer 1 includes, for example, a management unit 2, a control unit 4, an ejection unit 6, and the like. The management unit 2 includes, for example, a tank unit 10 for storing the ink INK and a detection circuit 20 for detecting a storage amount of the ink INK stored in the tank unit 10. For example, the management unit 2 is a storage amount management device that manages the storage amount of the ink INK stored in the tank unit 10.

The tank unit 10 includes, for example, a plurality of ink tanks 100 having a one-to-one correspondence with a plurality of different types of the ink INK, and a plurality of flexible printed substrates 200 having a one-to-one correspondence with the plurality of ink tanks 100. The tank unit 10 is an example of a "storage device", and the ink tank 100 is an example of a "storage section".

In the present embodiment, it is assumed that the types of the ink INK are a total of five types including cyan, magenta, yellow, and two types of black. In this case, the tank unit 10 includes five ink tanks 100 having a one-to-one correspondence with five types of the ink INK. The types of the ink INK are not limited to five types. That is, the number of the ink tanks 100 included in the tank unit 10 is not limited to five. For example, when there is only one type of the ink INK, the tank unit 10 may include one ink tank 100.

Each ink tank 100 stores the corresponding ink INK among a plurality of types of the ink INK. Each flexible printed substrate 200 is fixed to the corresponding ink tank 100 among a plurality of the ink tanks 100. Hereinafter, the flexible printed substrates are also referred to as flexible printed circuits (FPC). The details of the ink tank 100 and the FPC 200 will be described later in FIG. 2 and the like. The details of the detection circuit 20 will be described later in FIG. 10.

The control unit 4 is, for example, a processor that controls each portion of the ink jet printer 1. For example, the control unit 4 includes one or a plurality of central processing units (CPU) (not shown). The control unit 4 functions, for example, as a control section that controls the management unit 2, the ejection unit 6, and the like by operating according to a control program. All or a part of elements realized by the control unit 4 executing the control program are realized by hardware by an electronic circuit such as a field programmable gate array (FPGA) or an application specific IC (ASIC). Alternatively, all or a part of the respective functions of the control unit 4 may be realized by cooperation of software and hardware. The control program may be stored in a storage device (not shown) included in the control unit 4, or may be transmitted from another device via a network.

The ejection unit 6 includes, for example, a plurality of head units 30 having a one-to-one correspondence with a plurality of the ink tanks 100, a carriage 32, a timing belt 40, a carriage guide shaft 42, a carriage transport mechanism 43, a transport roller 44, and a medium transport mechanism 45, a platen 46, and the like. Each head unit 30 includes a plurality of ejection sections 30*a* for ejecting the ink INK supplied from the tank unit 10 via a tube 14. For example, the ejection unit 6 ejects the ink INK from the ejection section 30*a* while transporting the print medium P in a sub-scanning direction SD2 and reciprocating a plurality of the head units 30 along a main scanning direction SD1 intersecting the sub-scanning direction SD2 under control of the control unit 4. As a result, dots corresponding to the print data are formed on the print medium P.

The plurality of head units 30 are mounted on the carriage 32. For example, when the printing process is executed, the ejection unit 6 reciprocates the carriage 32 along the main scanning direction SD1 and transports the print medium P in the sub-scanning direction SD2 so that a position of the print medium P relative to each head unit 30 is changed. As a result, the ejection unit 6 enables the ink INK to land on the entire print medium P.

The carriage guide shaft 42 reciprocally supports the carriage 32 along the main scanning direction SD1. The timing belt 40 is fixed to the carriage 32 and driven by the carriage transport mechanism 43. As a result, the ejection unit 6 can reciprocate the plurality of head units 30 together with the carriage 32 along the carriage guide shaft 42. The transport roller 44 rotates in response to the drive of the medium transport mechanism 45, and transports the print medium P on the platen 46 in the sub-scanning direction SD2. The print medium P is located between the platen 46 and the carriage 32.

The configuration of the ink jet printer 1 is not limited to the example shown in FIG. 1. For example, in FIG. 1, a case where the tank unit 10 is provided outside the carriage 32 is illustrated, but the tank unit 10 may be stored in the carriage 32 as an ink cartridge. Further, for example, the ink jet printer 1 may be a line printer.

Figure 2:
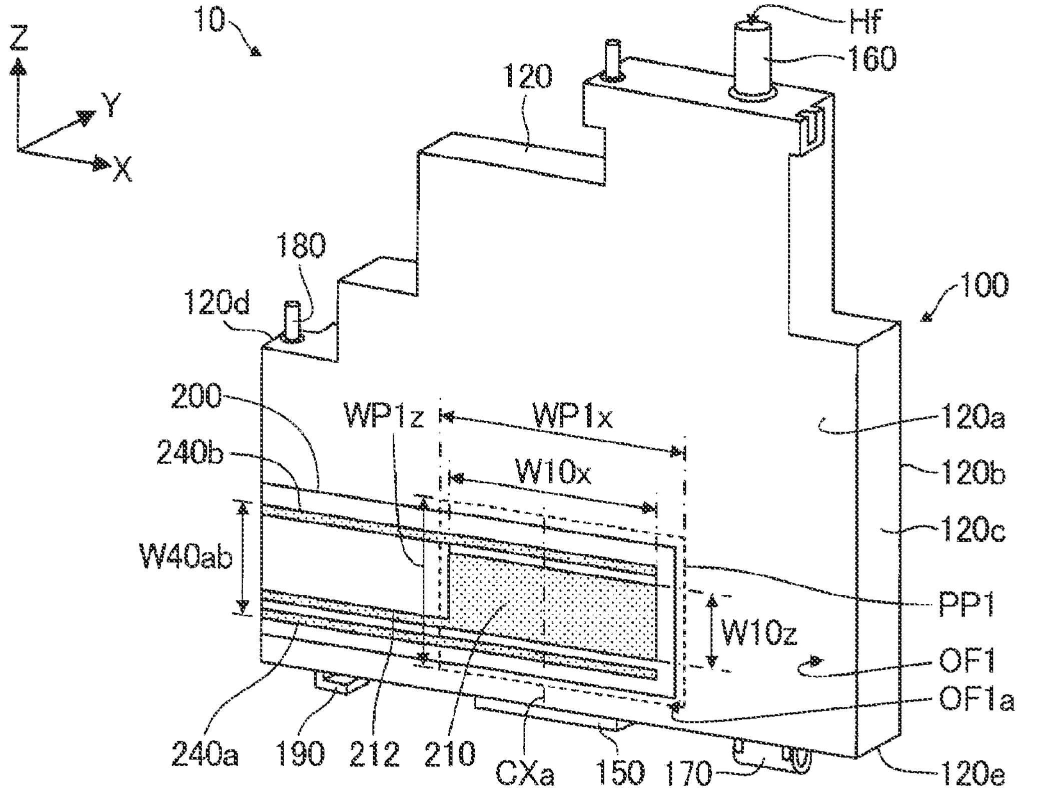
FIG. 2 is a perspective view showing an example of an ink tank.

FIG. 2 is a perspective view showing an example of the ink tank 100. In the below, the configuration and the like of the tank unit 10 will be explained mainly regarding one ink tank 100 among the plurality of ink tanks 100 included in the tank unit 10 and the FPC 200 fixed to the ink tank 100. For example, FIG. 2 shows one ink tank 100 among the plurality of ink tanks 100 included in the tank unit 10 and the FPC 200 fixed to the ink tank 100.

In the below, for convenience of explanation, a three-axis Cartesian coordinate system having an X-axis, a Y-axis, and a Z-axis that are orthogonal to each other will be appropriately introduced. Further, in the below, a direction pointed by an arrow on the X-axis is referred to as a +X direction, and a direction opposite to the +X direction is referred to as a −X direction. A direction pointed by an arrow on the Y-axis is referred to as a +Y direction, and a direction opposite to the +Y direction is referred to as a −Y direction. A direction pointed by an arrow on the Z-axis is referred to as a +Z direction, and a direction opposite to the +Z direction is referred to as a −Z direction. Further, in the below, the +X direction and the −X direction may be referred to as an X direction without particular distinction, and the +Y direction and the −Y direction may be referred to as a Y direction without particular distinction. Further, the +Z direction and the −Z direction may be referred to as a Z direction without particular distinction. Further, in the below, the +Z direction may be referred to as an upper side, and the −Z direction may be referred to as a lower side. In the present embodiment, it is assumed that the −Z direction is a gravity direction. For example, the −Z direction corresponds to a direction in which the ink INK decreases. Further, in the below, viewing an object from a specific direction may be referred to as a plan view.

The ink tank 100 includes, for example, a plurality of outer walls 120, a discharge section 150 for discharging the ink INK from the ink tank 100, a supply port 160 for supplying the ink INK to the ink tank 100, a coupling portion 170, an adjustment port 180, and an attachment portion 190. The tube 14 is coupled to the coupling portion 170. The adjustment port 180 is an introduction port for introducing air for adjusting a pressure inside the ink tank 100. The attachment portion 190 is a mechanism for attaching the ink tank 100 to the ink jet printer 1.

The plurality of outer walls 120 include, for example, outer walls 120*a*, 120*b*, 120*c*, 120*d* and 120*e*. In FIG. 2, in order to make the figure easier to see, reference numerals of some outer walls 120 among the plurality of outer walls 120 are omitted.

A material of the plurality of outer walls 120 is not particularly limited as long as the material is a dielectric and does not allow the ink INK to pass therethrough. For example, the material of the plurality of outer walls 120 may be various resin materials such as polyolefin, polycarbonate and polyester, or various glass materials. Further, the material of the plurality of outer walls 120 may be a hard material or a soft material. Alternatively, a part of the plurality of outer walls 120 may be formed of a hard material and the other part may be formed of a soft material.

For example, among the plurality of outer walls 120, the outer wall 120*a* may be formed of a soft material such as a film, and the outer wall 120 other than the outer wall 120*a* may be formed of a hard material such as a plastic. An elastic modulus of the hard material is, for example, greater than an elastic modulus of the soft material. In the present embodiment, it is assumed that the outer wall 120*a* of the plurality of outer walls 120 is formed of a nylon film, and the outer wall 120 other than the outer wall 120*a* of the plurality of outer walls 120 is formed of a plastic having a higher elastic modulus than the nylon film. In this case, for example, the outer wall 120*a* thinner than the outer wall 120*b* can be easily formed. In the present embodiment, since an elastic modulus of the outer wall 120*b* is larger than an elastic modulus of the outer wall 120*a*, for example, it is possible to suppress deformation of the outer wall 120*b* due to a pressure inside the ink tank 100 or the like as compared with a case where the elastic modulus of the outer wall 120*b* is the same as the elastic modulus of the outer wall 120*a*.

In the present embodiment, among the plurality of outer walls 120, all the outer walls 120 other than the outer wall 120*a* are formed of a plastic, so that the ink tank 100 which is hard to be deformed can be easily manufactured. For example, in the present embodiment, the ink tank 100 can be easily manufactured by adhering the outer wall 120*a* formed of a nylon film to the outer wall 120 formed of a plastic.

As shown in FIG. 2, the outer walls 120*a* and 120*b* are arranged apart from each other in the Y direction, and form a side wall substantially parallel to an X-Z plane among the side walls of the ink tank 100. In addition, "substantially parallel", and "substantially orthogonal" and "substantially perpendicular", which will be described later, are concepts including errors. For example, "substantially parallel" may be parallel in design. Further, the outer walls 120*c* and 120*d* are arranged apart from each other in the X direction, and form a side wall substantially parallel to a Y-Z plane among the side walls of the ink tank 100. For example, the outer wall 120*c* is arranged between the outer walls 120*a* and 120*b*, and is coupled to a part of the outer wall 120*a* and a part of the outer wall 120*b* at edge portions of the outer walls 120*a* and 120*b* in the +X direction. For example, the outer wall 120*d* is arranged between the outer walls 120*a* and 120*b*, and is coupled to a part of the outer wall 120*a* and a part of the outer wall 120*b* at edge portions of the outer walls 120*a* and 120*b* in the −X direction.

The outer wall 120*e* includes a plane substantially parallel to an X-Y plane and constitutes a bottom portion of the ink tank 100. For example, the outer wall 120*e* is arranged between the outer walls 120*a* and 120*b* and is coupled to a part of the outer wall 120*a* and a part of the outer wall 120*b* at edge portions of the outer walls 120*a* and 120*b* in the −Z direction. The outer walls 120*a*, 120*b*, 120*c*, 120*d* and 120*e* constitute a box that is open in the +Z direction. An opening of the box is closed by, for example, the outer wall 120 other than the outer walls 120*a*, 120*b*, 120*c*, 120*d* and 120*e* among the plurality of outer walls 120.

The outer walls 120*a* and 120*b* may be provided to be inclined at a predetermined angle with respect to the X-Z plane. Similarly, the outer walls 120*c* and 120*d* may be provided to be inclined at a predetermined angle with respect to the Y-Z plane.

The outer wall 120*a* includes, for example, a first arrangement portion PP1 provided with an input electrode 210 into which an AC signal for detecting the storage amount of the ink INK stored in the ink tank 100 is input. For example, a portion of the outer wall 120*a* including a target arrangement portion in which the input electrode 210 is to be provided and a peripheral portion of the target arrangement portion corresponds to the first arrangement portion PP1. The first arrangement portion PP1 includes, for example, the peripheral portion of the target arrangement portion of the input electrode 210 so as to include the entire input electrode 210 in a plan view from the −Y direction even when an attachment position of the FPC 200 with respect to the outer wall 120*a* deviates from a predetermined position due to an attachment error or the like.

For example, a width WP1*x* of the first arrangement portion PP1 in the X direction is larger than a width W10*x* of the input electrode 210 in the X direction, and a width WP1*z* of the first arrangement portion PP1 in the Z direction is larger than a width W10*z* of the input electrode 210 in the Z direction.

A part of the FPC 200 is attached to an outer surface OF1 of the outer wall 120*a*. In the present embodiment, in the outer surface OF1 of the outer wall 120*a*, a lowercase alphabet "a" is added to an end of a code of the outer surface OF1 of the first arrangement portion PP1.

The FPC 200 includes, for example, an input electrode 210 provided in the outer surface OF1*a* of the first arrangement portion PP1, a wiring 212 coupled to the input electrode 210 and extending in the X direction, and two shield wirings 240 held at a constant voltage such as a ground voltage. In FIG. 2, in order to distinguish the two shield wirings 240 from each other, a lowercase alphabet "a" or "b" is added to an end of a code of each of the two shield wirings 240. For example, a shield wiring 240*a* is the shield wiring 240 provided in the −Z direction with respect to the input electrode 210, and a shield wiring 240*b* is the shield wiring 240 provided in the +Z direction with respect to the input electrode 210. Also in the shield wiring 240 shown in FIG. 3 and subsequent figures, a lowercase alphabet is added to the end of the code of the shield wiring 240 in order to distinguish it from the other shield wiring 240.

Figure 3:
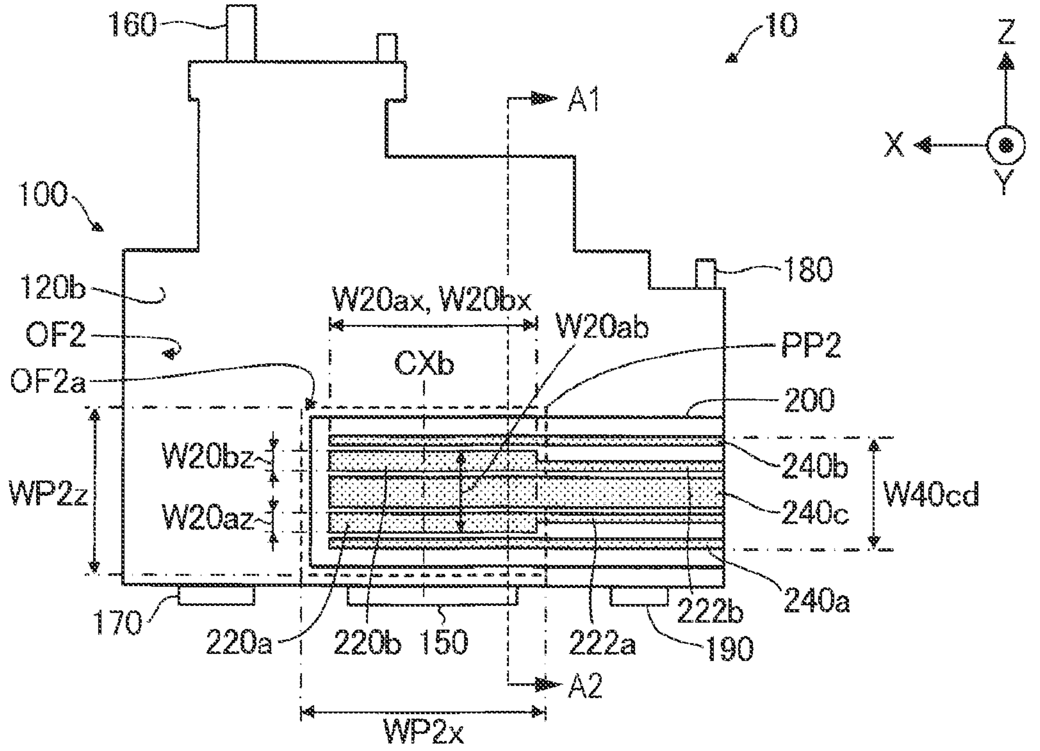
FIG. 3 is a schematic view of the ink tank seen from a +Y direction.
Figure 6:
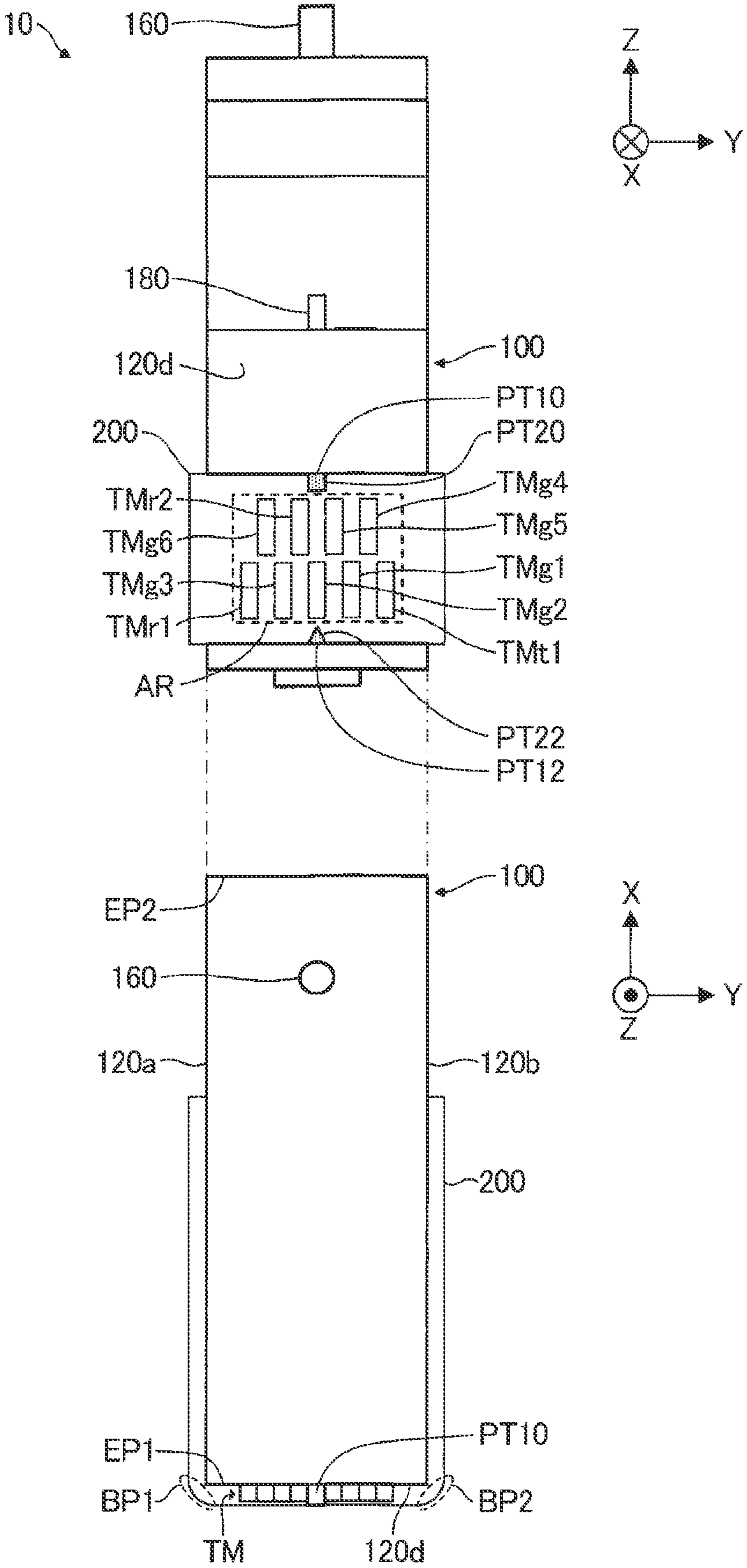
FIG. 6 is a schematic view of the ink tank seen from a −X direction and the ink tank seen from a +Z direction.
Figure 7:
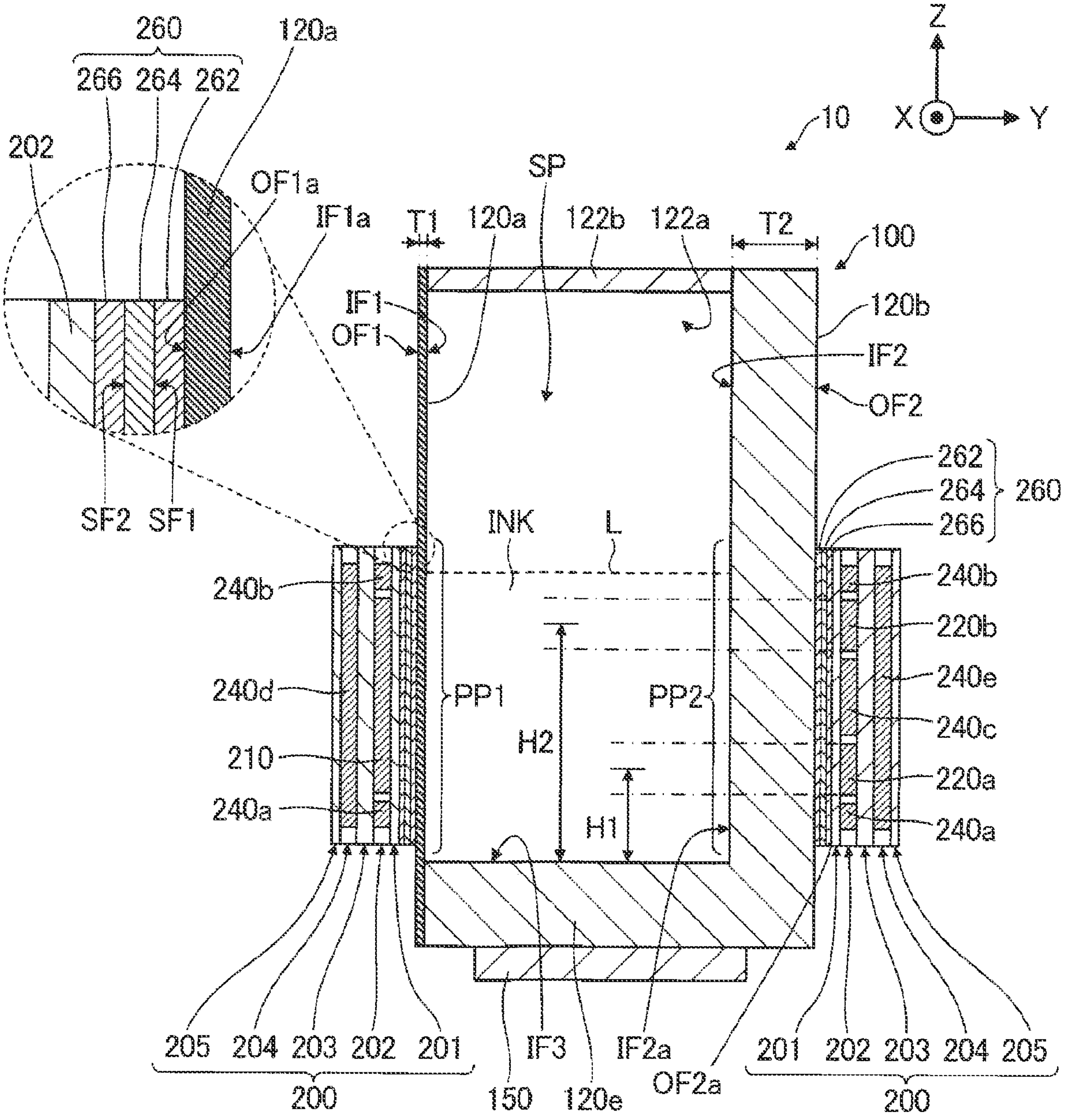
FIG. 7 is a cross-sectional view showing an example of a cross section of the ink tank and a flexible printed substrate taken along the line A1-A2 shown in FIG. 3.

The input electrode 210, the wiring 212, and the shield wirings 240*a* and 240*b* are examples of elements provided in the outer surface OF1 of the outer wall 120*a* among a plurality of elements of the FPC 200. As shown in FIGS. 3, 6, 7, and the like, the FPC 200 also includes elements other than the input electrode 210, the wiring 212, and the shield wirings 240*a* and 240*b*.

The input electrode 210, the wiring 212, and the shield wirings 240*a* and 240*b* are formed of a conductive material. The conductive material may be, for example, a metal material such as gold, silver, copper, aluminum, iron, nickel and cobalt, or an alloy containing one or more kinds of metal materials. In the present embodiment, it is assumed that the input electrode 210 and the wiring 212 are integrally formed. In this case, the wiring 212 is directly coupled to the input electrode 210.

The input electrode 210 is formed such that, for example, the width W10*z* of the input electrode 210 in the Z direction is smaller than the width W10*x* of the input electrode 210 in the X direction. For example, the input electrode 210 may be formed in a rectangular shape in which the X direction is a longitudinal direction. A shape of the input electrode 210 is not limited to the rectangular shape. In the present embodiment, the input electrode 210 is located between the shield wiring 240*a* extending in the X direction and the shield wiring 240*b* extending in the X direction. The input electrode 210 includes a portion that overlaps a center CXa of the outer wall 120*a* in the X direction in a plan view from the −Y direction.

In the present embodiment, in addition to the input electrode 210, a part of the shield wiring 240*a* and a part of the shield wiring 240*b* are also provided in the outer surface OF1*a* of the first arrangement portion PP1. Therefore, for example, the width WP1*z* of the first arrangement portion PP1 is larger than a width W40*ab* of a portion of the FPC 200 in the Z direction including the input electrode 210 and the shield wirings 240*a* and 240*b*.

Next, with reference to FIG. 3, an element facing the outer wall 120*b* among the plurality of elements of the FPC 200 will be explained.

FIG. 3 is a schematic view of the ink tank 100 seen from the +Y direction. In FIG. 3, an element provided in an outer surface OF2 of the outer wall 120*b*, which is grasped when the ink tank 100 is seen from the +Y direction, among the plurality of elements of the FPC 200, will be mainly explained.

The outer wall 120*b* includes, for example, a second arrangement portion PP2 provided with two detection electrodes 220 for detecting the storage amount of the ink INK stored in the ink tank 100. In FIG. 3, in order to distinguish the two detection electrodes 220 from each other, a lowercase alphabet "a" or "b" is added to an end of a code of each of the two detection electrodes 220. For example, the detection electrode 220*a* is a detection electrode 220 provided in the −Z direction with respect to the detection electrode 220*b*.

In the present embodiment, it is assumed that the detection electrodes 220*a* and 220*b* have the same size. In the present embodiment, it is assumed that the two detection electrodes 220*a* and 220*b* are provided in the second arrangement portion PP2 of the outer wall 120*b*, but the number of the detection electrodes 220 provided in the second arrangement portion PP2 is not limited to two. For example, the number of the detection electrodes 220 provided in the second arrangement portion PP2 may be one or three or more.

The second arrangement portion PP2 corresponds to, for example, a portion of the outer wall 120*b* including a target arrangement portion in which the detection electrode 220*a* and the detection electrode 220*b* are to be provided and a peripheral portion of the target arrangement portion. The second arrangement portion PP2 includes, for example, the peripheral portion of the target arrangement portion of the detection electrode 220 so as to include the entire detection electrode 220 in a plan view from the +Y direction even when an attachment position of the FPC 200 with respect to the outer wall 120*b* deviates from a predetermined position due to an attachment error or the like. The entire detection electrode 220 includes the entire detection electrode 220*a* and the entire detection electrode 220*b*.

For example, a width WP2*x* of the second arrangement portion PP2 in the X direction is larger than both a width W20*ax* of the detection electrode 220*a* in the X direction and a width W20*bx* of the detection electrode 220*b* in the X direction. A width WP1*z* of the second arrangement portion PP2 in the Z direction is larger than a width W20*ab* of a portion of the FPC 200 in the Z direction including the detection electrodes 220*a* and 220*b*.

A part of the FPC 200 is attached to the outer surface OF2 of the outer wall 120*b*. In the present embodiment, in the outer surface OF2 of the outer wall 120*b*, a lowercase alphabet "a" is added to an end of a code of the outer surface OF2 of the second arrangement portion PP2.

The FPC 200 includes, for example, the detection electrodes 220*a* and 220*b* provided in the outer surface OF2*a* of the second arrangement portion PP2, a wiring 222*a* coupled to the detection electrode 220*a* and extending in the X direction, and a wiring 222*b* coupled to the detection electrode 220*b* and extending in the X direction. Further, the FPC 200 includes a shield wiring 240*c* held at a constant voltage such as a ground voltage. The shield wiring 240*c* is a shield wiring 240 located between the detection electrode 220*a* and the detection electrode 220*b*. Therefore, a part of the shield wiring 240*c* is provided in the outer surface OF2*a* of the second arrangement portion PP2. In the present embodiment, a part of the shield wiring 240*a* and a part of the shield wiring 240*b* are also provided in the outer surface OF2*a* of the second arrangement portion PP2.

For example, the detection electrode 220*a* is located between the shield wiring 240*a* extending in the X direction and the shield wiring 240*c* extending in the X direction, and the detection electrode 220*b* is located between the shield wiring 240*b* extending in the X direction and the shield wiring 240*c* extending in the X direction. The shield wiring 240*c* is located between the shield wiring 240*a* and the shield wiring 240*b*.

The detection electrode 220*a* includes a portion that overlaps a center CXb of the outer wall 120*b* in the X direction in a plan view from the +Y direction. Similarly, the detection electrode 220*b* includes a portion that overlaps the center CXb of the outer wall 120*b* in the X direction in a plan view from the +Y direction. In the present embodiment, the center CXb of the outer wall 120*b* in the X direction substantially coincides with the center CXa of the outer wall 120*a* in the X direction. A position of the supply port 160 in the X direction and a position of the detection electrode 220*a* in the X direction are different from each other. Similarly, the position of the supply port 160 in the X direction and a position of the detection electrode 220*b* in the X direction are different from each other.

As described above, in the present embodiment, the detection electrodes 220*a* and 220*b*, a part of the shield wiring 240*a*, a part of the shield wiring 240*b*, and a part of the shield wiring 240*c* are provided in the outer surface OF2*a* of the second arrangement portion PP2. Therefore, for example, a width WP2*z* of the second arrangement portion PP2 is larger than a width W40*cd* of a portion of the FPC 200 in the Z direction including the detection electrodes 220*a* and 220*b* and the shield wirings 240*a*, 240*b* and 240*c*.

The overall outline of the FPC 200 will be described later in FIG. 11. For example, the detection electrode 220*a* is formed such that a width W20*az* of the detection electrode 220*a* in the Z direction is smaller than the width W20*ax* of the detection electrode 220*a* in the X direction. Similarly, the detection electrode 220*b* is formed such that a width W20*bz* of the detection electrode 220*b* in the Z direction is smaller than the width W20*bx* of the detection electrode 220*b* in the X direction. In the present embodiment, the detection electrodes 220*a* and 220*b* are grasped as a rectangular shape in which the X direction is a longitudinal direction in a plan view from the +Y direction. The shapes of the detection electrodes 220*a* and 220*b* are not limited to the rectangular shape.

Further, the detection electrodes 220*a* and 220*b*, the wiring 222*a* and 222*b*, and the shield wiring 240*c* are formed of the same material as that of the input electrode 210. In the present embodiment, it is assumed that the detection electrode 220*a* and the wiring 222*a* are integrally formed, and the detection electrode 220*b* and the wiring 222*b* are integrally formed. In this case, the wiring 222*a* is directly coupled to the detection electrode 220*a*, and the wiring 222*b* is directly coupled to the detection electrode 220*b*.

Next, an internal structure of the ink tank 100 will be explained with reference to FIG. 4.

Figure 4:
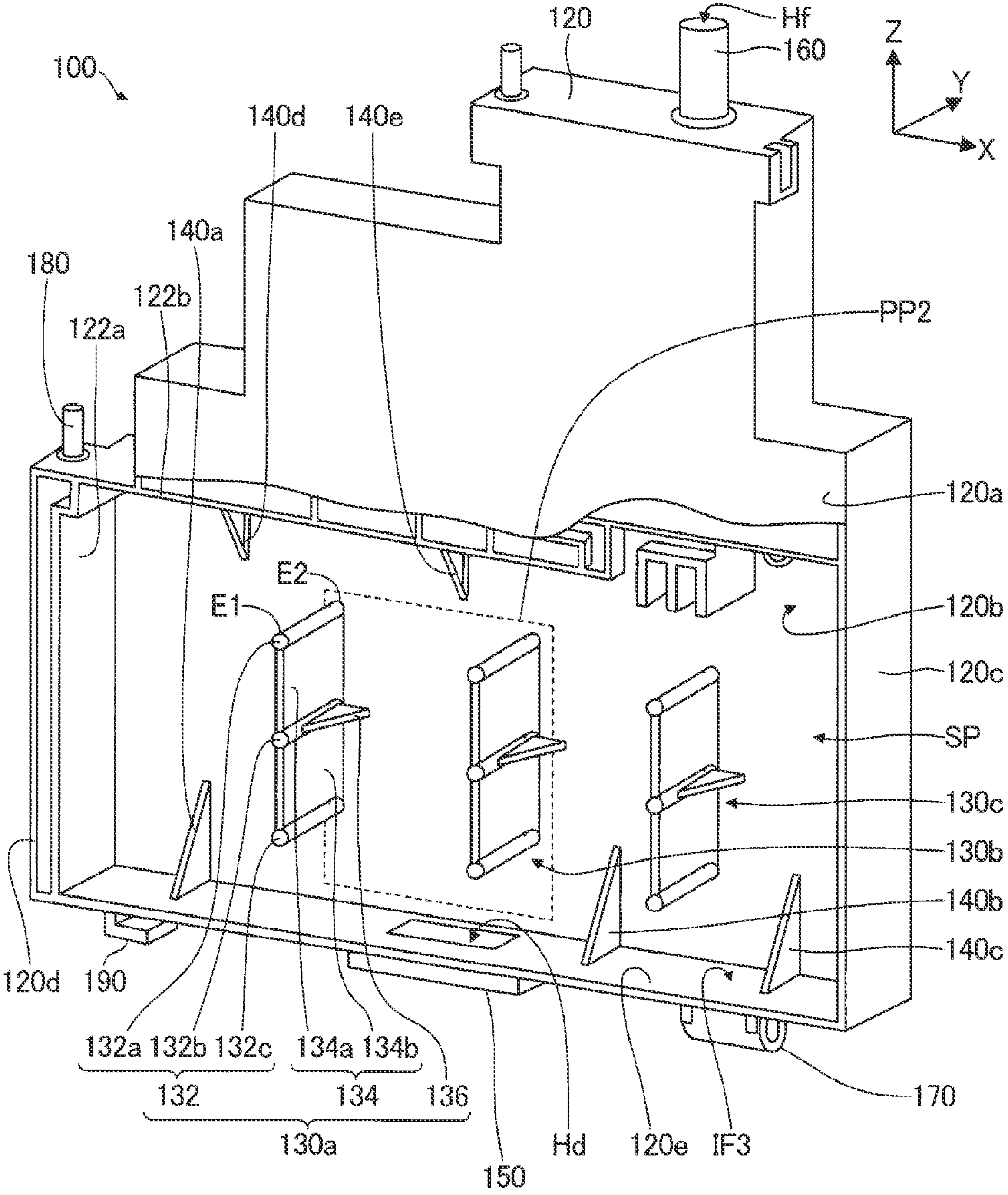
FIG. 4 is a perspective view showing an example of a schematic internal structure of the ink tank.

FIG. 4 is a perspective view showing an example of a schematic internal structure of the ink tank 100.

For example, a plurality of partition walls 122, a plurality of support portions 130, and a plurality of auxiliary portions 140 are provided inside the ink tank 100. In FIG. 4, in order to distinguish the plurality of support portions 130 from each other, a lowercase alphabet “a”, “b” or “c” is added to an end of a code of each of the plurality of support portions 130. Similarly, a lowercase alphabet “a”, “b”, “c”, “d” or “e” is added to an end of a code of each of the plurality of auxiliary portions 140. The number of the support portions 130 and the number of the auxiliary portions 140 are not limited to the example shown in FIG. 4. For example, the number of the support portions 130 may be one or two. Alternatively, the number of the support portions 130 may be four or more. The plurality of partition walls 122 include, for example, partition walls 122*a* and 122*b*.

For example, a partition wall 122*a* is arranged apart from the outer wall 120*d* in the –X direction so as to face the outer wall 120*d*. The partition wall 122*a* is located closer to the outer wall 120*d* than the outer wall 120*a*. For example, air for adjusting the pressure inside the ink tank 100 is introduced into a space between the outer wall 120*d* and the partition wall 122*a* through the adjustment port 180. For example, the ink INK is stored in a space SP surrounded by the partition wall 122*a* and the outer walls 120*a*, 120*b*, 120*c* and 120*e*.

The partition wall 122*b* separates, for example, a flow path (not shown) of the ink INK supplied from the supply port 160 from the space SP. For example, the partition wall 122*b* is arranged apart from the outer wall 120*e* in the +Z direction so as to face the outer wall 120*e*. In the present embodiment, the partition wall 122*b* is located in the +Z direction with respect to the second arrangement portion PP2 of the outer wall 120*b*.

In this way, the space SP in which the ink INK is stored is partitioned by the outer walls 120*a*, 120*b*, 120*c* and 120*e* and the partition walls 122*a* and 122*b*. The outer walls 120*a*, 120*b*, 120*c* and 120*e* and the partition walls 122*a* and 122*b* are examples of “a plurality of walls”.

The support portion 130*a* supports, for example, the outer walls 120*a* and 120*b*. For example, the support portion 130*a* includes a plurality of rod portions 132 that support the outer walls 120*a* and 120*b*, a plurality of plate portions 134 that support the outer walls 120*a* and 120*b*, and an auxiliary support portion 136. In FIG. 4, in order to distinguish the plurality of rod portions 132 from each other, a lowercase alphabet “a”, “b” or “c” is added to an end of a code of each of the plurality of rod portions 132. Similarly, a lowercase alphabet “a”, “b” or “b” is added to an end of a code of each of the plurality of plate portions 134.

Each rod portion 132 is, for example, a columnar body extending in the Y direction. In the example shown in FIG. 4, each rod portion 132 is a cylinder, but each rod portion 132 may be a prism. The plurality of rod portions 132 are arranged, for example, in the Z direction. An end portion E1 which is one end of each rod portion 132 is adhered to the outer wall 120*a*, and an end portion E2 which is the other end of each rod portion 132 is adhered to the outer wall 120*b*.

Each plate portion 134 includes, for example, a plane substantially parallel to the Y-Z plane. That is, each plate portion 134 includes a plane substantially orthogonal to the outer wall 120*b*. Two edge portions of the plate portion 134*a* along the Z direction are coupled to the outer walls 120*a* and 120*b*, respectively, and two edge portions of the plate portion 134*a* along the Y direction are coupled to the rod portions 132*a* and 132*b*, respectively. Further, two edge portions of the plate portion 134*b* along the Z direction are coupled to the outer walls 120*a* and 120*b*, respectively, and two edge portions of the plate portion 134*b* along the Y direction are coupled to the rod portions 132*b* and 132*c*, respectively.

The auxiliary support portion 136 is grasped, for example, as a substantially right triangular shape, in a plan view from the +Z direction. For example, among edge portions of the auxiliary support portion 136, two edge portions corresponding to two sides other than an oblique side of a right triangle are coupled to the outer wall 120*b* and the rod portion 132*b*, respectively. The rod portion 132*b* is stably fixed to the outer wall 120*b* by the auxiliary support portion 136.

The configurations of the support portions 130*b* and 130*c* are the same as that of the support portion 130*a*. For example, the support portions 130*b* and 130*c* also support the outer walls 120*a* and 120*b* in the same manner as the support portion 130*a*. Although the reference numerals of elements such as the rod portion 132 included in the support portions 130*b* and 130*c* are omitted in FIG. 4, the elements included in the support portions 130*b* and 130*c* are referred to by using the same reference numerals as the elements included in the support portion 130*a*.

In the present embodiment, it is assumed that the support portions 130*a* and 130*b* are arranged at two edge portions of the first arrangement portion PP1 along the Z direction, respectively. For example, the support portions 130*a* and 130*b* extend along the +Y direction, which is a direction from the first arrangement portion PP1 toward the second arrangement portion PP2, and support the first arrangement portion PP1 and the second arrangement portion PP2. Since the illustration of the first arrangement portion PP1 of the outer wall 120*a* is omitted in FIG. 4, a positional relationship between the support portions 130*a* and 130*b* and the first arrangement portion PP1 will be described later in FIG. 5.

The plurality of auxiliary portions 140 are grasped as a substantially right triangular shape, for example, in a plan view from the +X direction. For example, among edge portions of the auxiliary portion 140*a*, two edge portions corresponding to two sides other than an oblique side of a right triangle are coupled to the outer walls 120*b* and 120*e*, respectively. Also in the auxiliary portions 140*b* and 140*c*, similarly to the auxiliary portion 140*a*, two edge portions corresponding to two sides other than an oblique side of a right triangle are coupled to the outer walls 120*b* and 120*e*, respectively. The outer walls 120*b* and 120*e* are stably fixed to each other by the auxiliary portions 140*a*, 140*b* and 140*c*. Further, among edge portions of the auxiliary portion 140*d*, two edge portions corresponding to two sides other than an oblique side of a right triangle are coupled to the outer wall 120*c* and the partition wall 122*b*, respectively. Also in the auxiliary portion 140*e*, similarly to the auxiliary portion 140*d*, two edge portions corresponding to two sides other than an oblique side of a right triangle are coupled to the outer wall 120*c* and the partition wall 122*b*, respectively. The outer wall 120*c* and the partition wall 122*b* are stably fixed to each other by the auxiliary portions 140*d* and 140*e*.

In the present embodiment, it is assumed that the support portion 130 and the auxiliary portion 140 are subjected to a water-repellent treatment, but a part or all of the support portion 130 and the auxiliary portion 140 need not to be subjected to the water-repellent treatment.

The discharge section 150 is provided with a discharge port Hd that penetrates through the discharge section 150 and the outer wall 120*e* and that discharges the ink INK from the space SP. The discharge port Hd is located, for example, near a center of the outer wall 120*e* in the X direction. A positional relationship between the discharge port Hd, and the first arrangement portion PP1 and the second arrangement portion PP2 will be described later in FIG. 5.

The supply port 160 is open, for example, in the +Z direction. For example, an opening Hf of the supply port 160 communicates with the space SP via a flow path (not shown). As a result, the ink INK is supplied from the supply port 160 to the space SP.

As explained in FIG. 2, the tube 14 is coupled to the coupling portion 170. The ink INK stored in the space SP is discharged from, for example, the discharge port Hd of the discharge section 150, and reaches the coupling portion 170 via a flow path (not shown). Then, the ink INK that has reached the coupling portion 170 is supplied to the ejection section 30*a* of the head unit 30 via the tube 14 coupled to the coupling portion 170.

Next, with reference to FIG. 5, a positional relationship between the input electrode 210 and the detection electrode 220, and the discharge port Hd will be explained.

Figure 5:
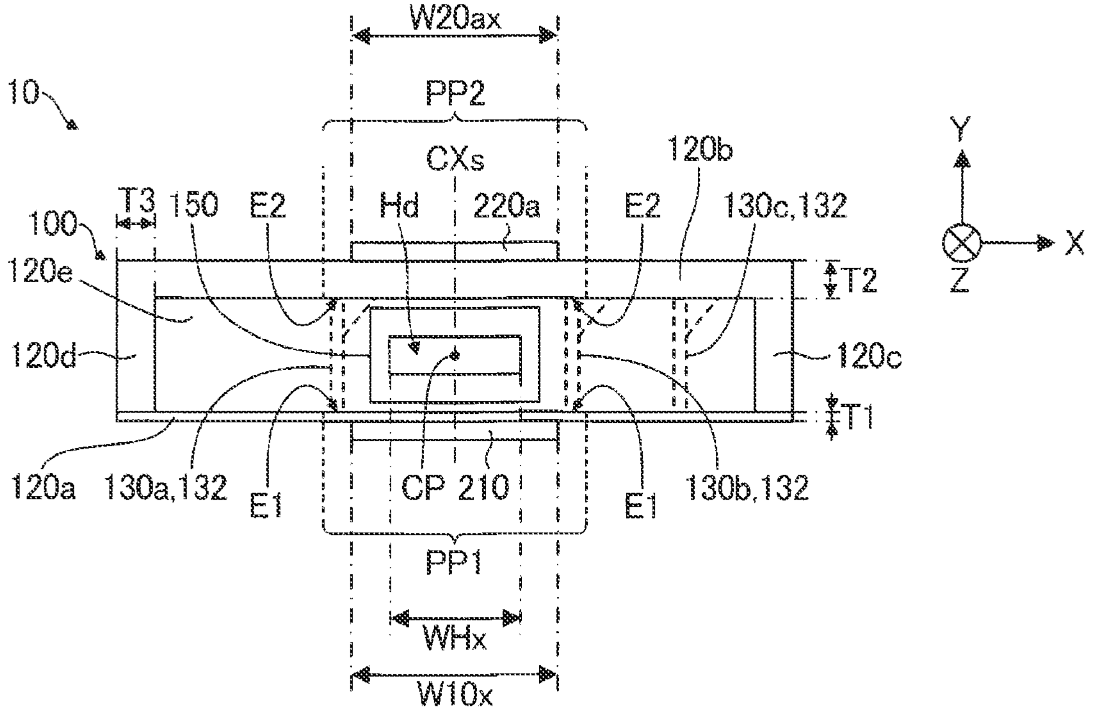
FIG. 5 is a schematic view of the ink tank seen from a −Z direction.

FIG. 5 is a schematic view of the ink tank 100 seen from the −Z direction. In FIG. 5, the positional relationship between the input electrode 210 and the detection electrode 220 and the discharge port Hd and the like are explained. In FIG. 5, the shield wiring 240 and the like are omitted in order to make it easier to understand the positional relationship between the input electrode 210 and the detection electrode 220 and the discharge port Hd. In FIG. 5, the support portions 130*a* and 130*b* are shown by broken lines in order to explain positional relationships between the first arrangement portion PP1 of the outer wall 120*a* and the second arrangement portion PP2 of the outer wall 120*b*, and the support portions 130*a* and 130*b*.

In the example shown in FIG. 5, when the discharge port Hd is seen from the −Z direction, the entire discharge port Hd is located between the input electrode 210 and the detection electrode 220. Thereby, in the present embodiment, the storage amount of the ink INK can be detected in the vicinity of the discharge port Hd.

When the discharge port Hd is seen from the −Z direction, the discharge port Hd may include a portion located between the input electrode 210 and the detection electrode 220 and a portion not located between the input electrode 210 and the detection electrode 220. Even in this case, the storage amount of the ink INK can be detected near the discharge port Hd as compared with an aspect in which the entire discharge port Hd is not located between the input electrode 210 and the detection electrode 220 when the discharge port Hd is seen from the −Z direction. Further, when the discharge port Hd is seen from the −Z direction, at least a part of the discharge port Hd may be located between the first arrangement portion PP1 of the outer wall 120*a* and the second arrangement portion PP2 of the outer wall 120*b*. Even in this case, the storage amount of the ink INK can be detected near the discharge port Hd as compared with an aspect in which the entire discharge port Hd is not located between the first arrangement portion PP1 and the second arrangement portion PP2 when the discharge port Hd is seen from the −Z direction.

Although the details will be described later in FIG. 16, in the present embodiment, by detecting the storage amount of the ink INK in the vicinity of the discharge port Hd, the storage amount of the ink INK can be detected more accurately than an aspect of a first comparative example in which the storage amount of the ink INK is detected in a place far from the discharge port Hd.

Further, when focusing on a position of the discharge port Hd, the discharge port Hd is formed near the center of the outer wall 120*e* in the X direction. For example, the discharge port Hd is formed such that a center CXs of the space SP of the ink tank 100 in the X direction is located inside the discharge port Hd in a plan view from the −Z direction. In the example shown in FIG. 5, the discharge port Hd is formed such that the center CP of the space SP of the ink tank 100 is located inside the discharge port Hd in a plan view from the −Z direction. Thereby, in the present embodiment, for example, when the ink tank 100 is used in an inclined state, an amount of the ink INK remaining in the space SP without being discharged from the discharge port Hd can be reduced.

Further, the width W10*x* of the input electrode 210 in the X direction and the width W20*ax* of the detection electrode 220*a* in the X direction are larger than a width WHx of the discharge port Hd in the X direction. Thereby, in the present embodiment, as will be described later in FIG. 16, even when the ink tank 100 is inclined, it is possible to accurately detect whether or not the storage amount of the ink INK in the ink tank 100 is equal to or more than a predetermined lower limit value.

The support portions 130*a* and 130*b* are arranged at two edge portions of the first arrangement portion PP1 of the outer wall 120*a* along the Z direction, respectively. For example, the end portion E1 of each rod portion 132 of the support portion 130*a* is fixed to one of the two edge portions of the first arrangement portion PP1 along the Z direction, and the end portion E1 of each rod portion 132 of the support portion 130*b* is fixed to the other of the two edge portions of the first arrangement portion PP1 along the Z direction. The end portion E2 of each rod portion 132 of the support portion 130*a* is fixed to one of the two edge portions of the second arrangement portion PP2 along the Z direction, and the end portion E2 of each rod portion 132 of the support portion 130*b* is fixed to the other of the two edge portions of the second arrangement portion PP2 along the Z direction.

As described above, in the present embodiment, a range of the outer wall 120*a* including positions of each rod portion 132 of the support portion 130*a* and each rod portion 132 of the support portion 130*b* in the X direction can be regarded as a range of the first arrangement portion PP1 in the X direction. Similarly, in the present embodiment, a range of the outer wall 120*b* including positions of each rod portion 132 of the support portion 130*a* and each rod portion 132 of the support portion 130*b* in the X direction can be regarded as a range of the second arrangement portion PP2 in the X direction.

A thickness T1 of the first arrangement portion PP1 of the outer wall 120*a* is thinner than a thickness T2 of the second arrangement portion PP2 of the outer wall 120*b*. Further, the thickness T1 of the first arrangement portion PP1 of the outer wall 120*a* is thinner than a thickness T3 of the outer wall 120*d*. Further, in the present embodiment, since it is assumed that the outer wall 120*a* is formed of a nylon film having a lower elastic modulus than the outer wall 120*b* or the like, the outer wall 120*a* is more easily deformed than the outer wall 120*b* or the like. Therefore, in the present embodiment, the support portions 130*a* and 130*b* for supporting the first arrangement portion PP1 and the second arrangement portion PP2 are provided. As a result, in the present embodiment, it is possible to suppress deformation of the first arrangement portion PP1. In the present embodiment, in addition to the support portions 130*a* and 130*b*, the support portion 130*c* for supporting a portion of the outer wall 120*a* other than the first arrangement portion PP1 and a portion of the outer wall 120*b* other than the second arrangement portion PP2 is provided. Therefore, it is possible to suppress deformation of the outer wall 120*a*.

For example, each rod portion 132 of the support portion 130*a* and each rod portion 132 of the support portion 130*b* may be arranged outside the first arrangement portion PP1 as long as the deformation of the first arrangement portion PP1 can be suppressed. Specifically, each rod portion 132 of the support portion 130*a* may be located in the −X direction with respect to the first arrangement portion PP1. Similarly, each rod portion 132 of the support portion 130*b* may be located in the +X direction with respect to the first arrangement portion PP1. Further, for example, the support portion 130 may be provided near a center of the first arrangement portion PP1 in the X direction.

Further, for example, the plate portion 134 may be formed in a grid pattern having through holes through which the ink INK passes. Alternatively, the plate portion 134 may be omitted. The support portion 130 may include a plurality of columnar bodies extending in the Z direction instead of the plate portion 134. In this case, the support portion 130 may be formed in a grid pattern having openings through which the ink INK passes by the plurality of columnar bodies extending in the Z direction and the plurality of rod portions 132 extending in the Y direction. Alternatively, a triangular or L-shaped support portion may be provided to support the outer walls 120*a* and 120*e*. Further, for example, a plate-shaped support portion having a surface parallel to an inner surface IF3 of the outer wall 120*e* and supporting the outer walls 120*a* and 120*b* may be provided.

Next, with reference to FIG. 6, the outline of the ink tank 100 and the like seen from the −X direction will be explained.

FIG. 6 is a schematic view of the ink tank 100 seen from the −X direction and the ink tank 100 seen from the +Z direction. In FIG. 6, a plan view shown on an upper side is a schematic view of the ink tank 100 seen from the −X direction, and a plan view shown on a lower side is a schematic view of the ink tank 100 seen from the +Z direction. In FIG. 6, the input electrode 210, the detection electrode 220, and the like are omitted in order to make the figure easier to see.

As shown in the schematic view of the ink tank 100 seen from the −X direction, the ink tank 100 includes, for example, positioning portions PT10 and PT12. For example, the positioning portions PT10 and PT12 are formed of the same material as the outer wall 120*d* and are integrally formed with the outer wall 120*d*. That is, in the present embodiment, the positioning portions PT10 and PT12 are provided in the outer wall 120*d*, which is a portion formed of a material harder than that of the first arrangement portion PP1. The positioning portions PT10 and PT12 are formed, for example, in a protruding shape protruding in the −X direction from the outer wall 120*d*. For example, the positioning portion PT10 is grasped as a rectangular shape in a plan view from the −X direction. For example, the positioning portion PT12 is grasped as a triangular shape in a plan view from the −X direction. The positioning portion PT10 and PT12 are provided in the outer wall 120*d*, and the positioning portion PT10 is located in the +Z direction with respect to the positioning portion PT12.

Further, the FPC 200 includes a positioning portion PT20 that determines a position of the FPC 200 by being coupled to the positioning portion PT10, and a positioning portion PT22 that determines the position of the FPC 200 by being coupled to the positioning portion PT12.

For example, as shown in the schematic view of the ink tank 100 seen from the −X direction, out of two edge portions of the FPC 200 along the Y direction, at the edge portion in the +Z direction, a cutout that is open in the +Z direction and fitted with the positioning portion PT10 is formed as the positioning portion PT20. That is, a region inside the cutout formed as the positioning portion PT20 is grasped as a rectangular shape in a plan view from the −X direction. Further, out of the two edge portions of the FPC 200 along the Y direction, at the edge portion in the −Z direction a cutout that is open in the −Z direction and fitted with the positioning portion PT20 is formed as the positioning portion PT22. That is, a region inside the cutout formed as the positioning portion PT22 is grasped as a triangular shape in a plan view from the −X direction.

The positioning portions PT20 and PT22 are not limited to the cutouts. For example, a through hole that penetrates through the FPC 200 in the X direction and is fitted with the positioning portion PT10 may be formed as the positioning portion PT20. Similarly, a through hole that penetrates through the FPC 200 in the X direction and is fitted with the positioning portion PT12 may be formed as the positioning portion PT22.

In the present embodiment, when the FPC 200 is attached to the ink tank 100, the positioning portion PT20 of the FPC 200 is coupled to the positioning portion PT10 of the ink tank 100, and the positioning portion PT22 of the FPC 200 is coupled to the positioning portion PT12 of the ink tank 100. Thereby, in the present embodiment, it is possible to suppress deviation of the position of the FPC 200 with respect to the ink tank 100 from a predetermined position when the FPC 200 is attached to the ink tank 100.

Further, in the present embodiment, a shape of the positioning portion PT10 is different from a shape of the positioning portion PT12. Thereby, in the present embodiment, for example, it is possible to reduce that the positioning portion PT22 is erroneously fitted with the positioning portion PT10 or the positioning portion PT20 is erroneously fitted with the positioning portion PT12. Thereby, for example, it is possible to reduce that the FPC 200 is attached to the ink tank 100 in a wrong orientation.

The positioning portion PT10 and PT12 may be formed such that one or both of a shape and a size are different between the positioning portion PT10 and the positioning portion PT12. For example, when the size of the positioning portion PT10 is different from the size of the positioning portion PT12, the shape of the positioning portion PT10 and the shape of the positioning portion PT12 may be the same as each other. Even in this case, it is possible to reduce that the FPC 200 is attached to the ink tank 100 in the wrong orientation. Hereinafter, the positioning portions PT10, PT12, PT20 and PT22 may be collectively referred to as positioning portions PT.

The FPC 200 includes a terminal TMt1 electrically coupled to the input electrode 210, a terminal TMr1 electrically coupled to the detection electrode 220*a*, and a terminal TMr2 electrically coupled to the detection electrode 220*b*. Further, the FPC 200 includes a plurality of terminals TMg1 to TMg6 held at a constant voltage such as a ground voltage. In the below, the terminals TMg1 to TMg6 may be collectively referred to as terminals TMg. The number of the terminals TMg is not limited to six. For example, the number of the terminals TMg may be two or more and five or less, or may be seven or more. Further, in the below, the terminals TMt1, TMr1, TMr2 and TMg may be collectively referred to as terminals TM. The plurality of terminals TMg are formed of, for example, the same material as the input electrode 210.

In the present embodiment, it is assumed that the plurality of terminals TMg are held at a ground voltage, but the plurality of terminals TMg may be held at a constant voltage other than the ground voltage. Alternatively, the plurality of terminals TMg may include the terminal TMg held at a first constant voltage such as a ground voltage and the terminal TMg held at a second constant voltage other than the first constant voltage. Each of the plurality of terminals TMg1 to TMg6 is electrically coupled to one or more shield wirings 240 among the plurality of shield wirings 240. When focusing on the plurality of shield wirings 240, each of the plurality of shield wirings 240 is electrically coupled to one or more terminals TMg among the plurality of terminals TMg1 to TMg6.

In the present embodiment, in order to reduce an interference between two terminals TM among the terminals TMt1, TMr1 and TMr2, one or more terminals TMg among the plurality of terminals TMg are arranged between the two terminal TM. The interference between the two terminals TM is, for example, that a signal transmitted to one of the two terminals TM is transmitted to the other terminal TM as a noise. In the present embodiment, for example, in a plan view from the −X direction, the terminal TMg that overlaps a straight line connecting any position in one terminal TM and any position in the other terminal TM of the two terminals TM corresponds to the terminal TMg located between the two terminals TM.

For example, among the plurality of terminals TMg, terminals TMg1, TMg2, and TMg3 are arranged between the terminal TMt1 and the terminal TMr1. Further, the terminals TMg3 and TMg6 are arranged between the terminal TMr1 and the terminal TMr2. Further, the terminals TMg1, TMg2, TMg4 and TMg5 are arranged between the terminal TMr2 and the terminal TMt1.

Further, for example, the terminal TMt1 is in contact with a first external contact outside the FPC 200, the terminal TMr1 is in contact with a second external contact outside the FPC 200, and the terminal TMr2 is in contact with a third external contact outside the FPC 200. For example, the first external contact is electrically coupled to an AC power supply ACP described later in FIG. 10. Further, for example, the second external contact is electrically coupled to an input terminal IN1 of a selection circuit 21 described later in FIG. 10, and the third external contact is electrically coupled to an input terminal IN2 of the selection circuit 21.

The plurality of terminals TMg1 to TMg6 are in contact with, for example, a plurality of constant voltage contacts outside the FPC 200. The plurality of constant voltage contacts are held, for example, at a constant voltage such as a ground voltage. That is, the plurality of terminals TMg1 to TMg6 are held at a constant voltage such as the ground voltage by being in contact with the plurality of constant voltage contacts held at a constant voltage such as the ground voltage.

Figure 8:
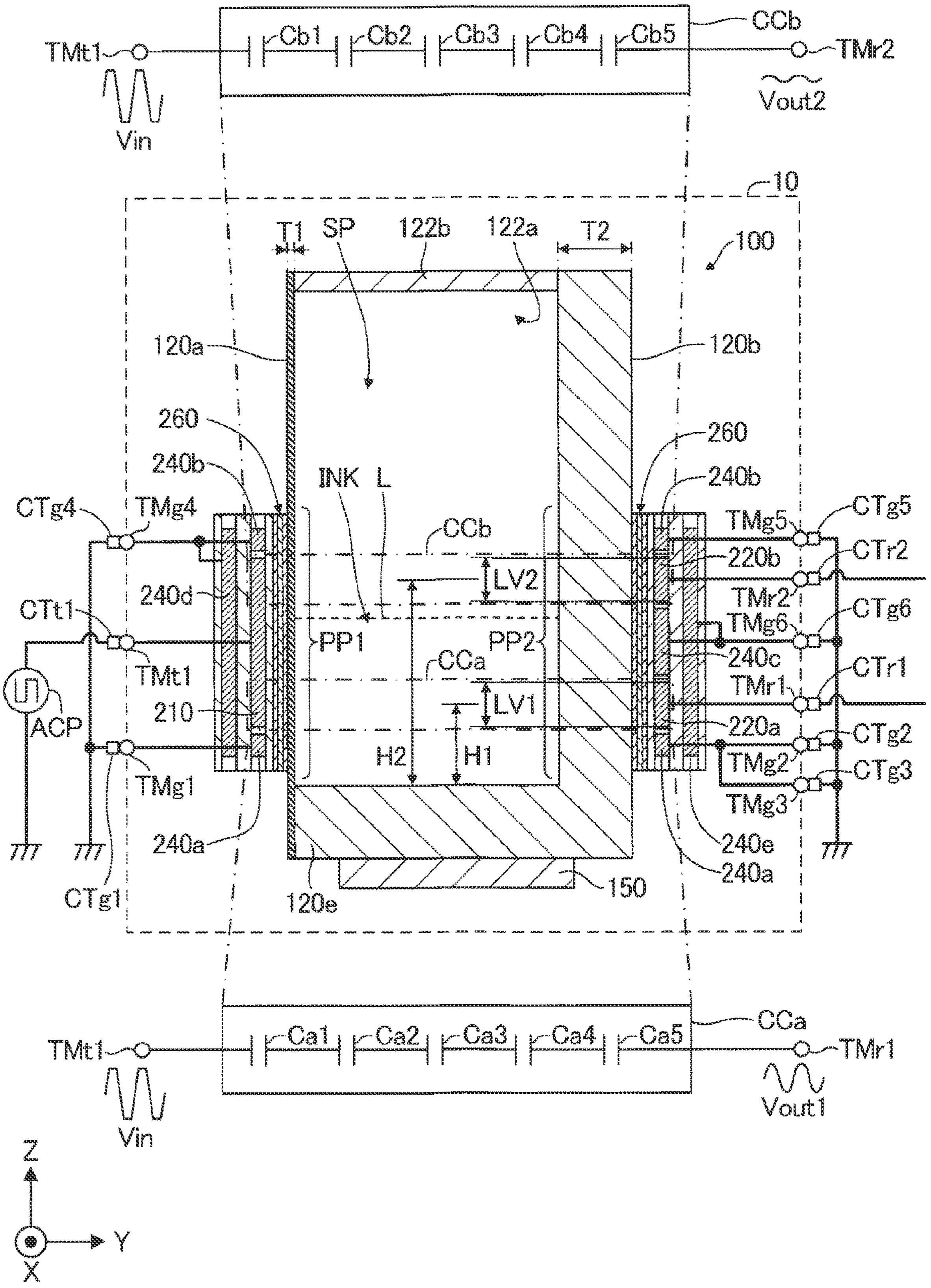
FIG. 8 is an explanatory diagram for explaining the outline of a method for detecting a storage amount of ink in the ink tank.

In the present embodiment, for example, an external contact CTt1 shown in FIG. 8 corresponds to the first external contact, an external contact CTr1 corresponds to the second external contact, an external contact CTr2 corresponds to the third external contact, and external contacts CTg1 to CTg6 correspond to the constant voltage contacts. In the below, the external contacts CTt1, CTr1, CTr2 and CTg1 to CTg6 may be collectively referred to as external contacts CT. The external contact CT is also used as a general term for the first external contact, the second external contact, the third external contact, and the plurality of constant voltage contacts.

The coupling between the plurality of terminals TM and the plurality of external contacts CT is realized by, for example, a spring contact. For example, the plurality of external contacts CT are provided in an external substrate that can be attached to and detached from the ink tank 100. When the external substrate is attached to the ink tank 100, on each of the plurality of external contacts CT provided in the external substrate, a force that pushes the external contact CT in the +X direction acts due to a repulsive force of a spring or the like.

Here, when focusing on a positional relationship between the plurality of terminals TM and the positioning portions PT20 and PT22, in the FPC 200, at least a part of a terminal arrangement region AR including the plurality of terminals TM is located between the positioning portion PT20 and the positioning portion PT22. In a portion of the FPC 200 that is close to the positioning portions PT20 and PT22, a deviation of an attachment position of the FPC 200 with respect to the ink tank 100 is smaller than that in a portion of the FPC 200 that is far from the positioning portions PT20 and PT22.

In the present embodiment, since the plurality of terminals TM are arranged near the positioning portions PT20 and PT22, it is possible to reduce the deviation of the plurality of terminals TM with respect to the ink tank 100 from a predetermined position. As a result, in the present embodiment, the erroneous coupling between the plurality of terminals TM and the plurality of external contacts CT can be suppressed. Further, in the present embodiment, since it is possible to reduce the deviation of the plurality of terminals TM with respect to the ink tank 100 from the predetermined position, it is possible to improve stability of the coupling between the plurality of terminals TM and the plurality of external contacts CT.

Further, as shown in the schematic view of the ink tank 100 seen from the +Z direction, the FPC 200 is bent along an outer periphery of the ink tank 100 at bent portions BP1 and BP2. Further, when the ink tank 100 is seen from the +Z direction, the plurality of terminals TM are provided at the edge portion EP1 of the two edge portions EP1 and EP2 of the ink tank 100, and the supply port 160 is located closer to the edge portion EP2 than the edge portion EP1. The two edge portions EP1 and EP2 of the ink tank 100 are edge portions that are separated from each other in the X direction among edge portions that are grasped when the ink tank 100 is seen from the +Z direction. When the ink tank 100 is seen from the +Z direction, the X direction corresponds to a longitudinal direction of the ink tank 100. In the below, an edge portion of the outer wall 120*e* in the edge portion EP1 of the ink tank 100 may be simply referred to as the edge portion EP1 of the outer wall 120*e*. Similarly, an edge portion of the outer wall 120*e* in the edge portion EP2 of the ink tank 100 may be simply referred to as the edge portion EP2 of the outer wall 120*e*.

As described above, in the present embodiment, the supply port 160 is located closer to the edge portion EP2 than the edge portion EP1 provided with the plurality of terminals TM. Therefore, in the present embodiment, even if the ink INK leaks from the supply port 160 when the ink INK is supplied, it is possible to prevent the leaked ink INK from contaminating the vicinity of the plurality of terminals TM. If the vicinity of the plurality of terminals TM is contaminated by ink INK or the like leaking from the supply port 160, the plurality of terminals TM may be short-circuited. In the present embodiment, since it is possible to prevent the vicinity of the plurality of terminals TM from being contaminated by the ink INK leaking from the supply port 160, it is possible to prevent the plurality of terminals TM from being short-circuited.

Next, a cross section of the ink tank 100 and the FPC 200 will be explained with reference to FIG. 7.

FIG. 7 is a cross-sectional view showing an example of a cross section of the ink tank 100 and the FPC 200 taken along the line A1-A2 shown in FIG. 3. In FIG. 7, in order to make the figure easier to see, elements located in the +Z direction with respect to the partition wall 122*b*, the support portion 130 and the like are not shown.

The FPC 200 may include, for example, a non-conductive first cover film layer 201, a conductive first conductor layer 202, a non-conductive base material layer 203, a conductive second conductor layer 204, and a non-conductive second cover film layer 205. For example, the base material layer 203 is provided between the first cover film layer 201 and the second cover film layer 205. Further, the first conductor layer 202 is provided between the first cover film layer 201 and the base material layer 203, and the second conductor layer 204 is provided between the second cover film layer 205 and the base material layer 203.

The first conductor layer 202 includes an input electrode 210, detection electrodes 220*a* and 220*b*, and shield wirings 240*a*, 240*b* and 240*c*. Further, the first conductor layer 202 includes the wirings 212, 222*a* and 222*b* shown in FIGS. 2 and 3. Further, the second conductor layer 204 includes shield wirings 240*d* and 240*e* held at a constant voltage such as a ground voltage. Further, the second conductor layer 204 includes the terminals TMt1, TMr1, TMr2 and TMg1 to TMg6 shown in FIG. 6. The shield wirings 240*d* and 240*e* are formed of, for example, the same material as that of the input electrode 210.

The first cover film layer 201 and the second cover film layer 205 are formed of, for example, a polyimide film. The first cover film layer 201 and the second cover film layer 205 may be formed of a material other than the polyimide film.

Further, the tank unit 10 includes a double-sided tape 260 for adhering the FPC 200 to the ink tank 100. For example, the first cover film layer 201 is provided between the second cover film layer 205 and the ink tank 100, and is adhered to the ink tank 100 by the double-sided tape 260. The double-sided tape 260 includes, for example, a base material 264, a first adhesive layer 262 formed on a first surface SF1 of the base material 264, and a second adhesive layer 266 formed on a second surface SF2 opposite to the first surface SF1 of the base material 264.

For example, the FPC 200 is adhered to a position of the ink tank 100 determined by the positioning portions PT10, PT12, PT20 and PT22 shown in FIG. 6 by the double-sided tape 260. As a result, the input electrode 210 included in the FPC 200 is provided in the outer surface OF1*a* of the first arrangement portion PP1 of the outer wall 120*a*, and the detection electrodes 220*a* and 220*b* included in the FPC 200 are provided in the outer surface OF2*a* of the second arrangement portion PP2 of the outer wall 120*b*. For example, the input electrode 210 is arranged at a position where the entire input electrode 210 overlaps the outer surface OF1*a* of the first arrangement portion PP1 in a plan view from the −Y direction. Further, the detection electrodes 220*a* and 220*b* are arranged at positions where the entire detection electrode 220*a* and the entire detection electrode 220*b* overlap the outer surface OF2*a* of the second arrangement portion PP2 in a plan view from the +Y direction.

Further, in the present embodiment, the FPC 200 is attached to the ink tank 100 such that the entire detection electrode 220*a* and the entire detection electrode 220*b* overlap the input electrode 210 in a plan view from the +Y direction. The detection electrodes 220*a* and 220*b* are arranged at different positions in the Z direction.

For example, in the Z direction, the detection electrode 220*a* is arranged such that a center of the detection electrode 220*a* is at a position H1, and the detection electrode 220*b* is arranged such that a center of the detection electrode 220*b* is at a position H2. The positions H1 and H2 are positions in the Z direction when the inner surface IF3 of the outer wall 120*e* is a starting point, and the position H2 is a position in the +Z direction with respect to the position H1. Therefore, the detection electrode 220*b* is arranged in the +Z direction with respect to the detection electrode 220*a*. In the below, the position in the +Z direction with respect to a specific position is also referred to as a position higher than the specific position, and the position in the −Z direction with respect to the specific position is also referred to as a position lower than the specific position.

The detection electrode 220*a* may be arranged such that a side in the −Z direction of two sides of the detection electrode 220*a* along the X direction is at the position H1, or may be arranged such that a side in the +Z direction of the detection electrode 220*a* is at the position H1. Similarly, the detection electrode 220*b* may be arranged such that a side in the −Z direction of two sides of the detection electrode 220*b* along the X direction is at the position H2, or may be arranged such that a side in the +Z direction of the detection electrode 220*b* is at the position H2.

In the present embodiment, since the FPC 200 is provided with the shield wirings 240*d* and 240*e*, it is possible to reduce the interference between the plurality of FPCs 200 having a one-to-one correspondence with the plurality of ink tanks 100 included in the tank unit 10. The interference between the FPCs 200 is, for example, that a signal of one FPC 200 of two FPCs 200 is transmitted as a noise to one or both of the input electrode 210 and the detection electrode 220 of the other FPC 200.

Further, a large amplitude signal of about 42 V is supplied to a piezoelectric element that drives the ejection section 30*a* of the head unit 30. In the present embodiment, since the FPC 200 is provided with the shield wirings 240*d* and 240*e*, it is possible to reduce transmission of the large amplitude signal supplied to the piezoelectric element to one or both of the input electrode 210 and the detection electrode 220 as a noise.

Further, in the present embodiment, since the FPC 200 is fixed to the ink tank 100 with the double-sided tape 260 having a substantially uniform thickness, a distance between the input electrode 210 and the outer surface OF1*a* of the first arrangement portion PP1 and a distance between the detection electrode 220 and the outer surface OF2*a* of the second arrangement portion PP2 are substantially constant. Therefore, in the present embodiment, it is possible to suppress uneven distribution of the adhesive as compared with a case where the FPC 200 is fixed to the ink tank 100 with a general curable adhesive. That is, in the present embodiment, it is possible to suppress variation of a distance between the input electrode 210 and the detection electrode 220 depending on a position in the detection electrode 220 as compared with a case where the FPC 200 is fixed to the ink tank 100 with a general curable adhesive. As a result, in the present embodiment, it is possible to improve a detection accuracy of the storage amount of the ink INK stored in the ink tank 100.

Further, in the present embodiment, an inner surface IF1 of the outer wall 120*a* on a side opposite to the outer surface OF1 and an inner surface IF2 of the outer wall 120*b* on a side opposite to the outer surface OF2 are subjected to the water-repellent treatment. Specifically, the water-repellent treatment is applied to a portion of the inner surface IF1 of the outer wall 120*a* exposed to the space SP and a portion of the inner surface IF2 of the outer wall 120*b* exposed to the space SP. That is, in the inner surface IF1 of the outer wall 120*a*, a portion to be adhered to the outer walls 120*c*, 120*d* and 120*e* and a portion to be adhered to the partition walls 122*a* and 122*b* are not subjected to the water-repellent treatment. The water-repellent treatment is, for example, a water-repellent treatment with a silicone-based coating. The water-repellent treatment is not limited to the water-repellent treatment with the silicone-based coating. For example, the water-repellent treatment may be a water-repellent treatment with a fluorine-based coating.

Here, in the present embodiment, in the inner surface IF1 of the outer wall 120*a*, a lowercase alphabet "a" is added to an end of a code of the inner surface IF1 of the first arrangement portion PP1. Similarly, in the inner surface IF2 of the outer wall 120*b*, a lowercase alphabet "a" is added to an end of a code of the inner surface IF2 of the second arrangement portion PP2.

A range in which the water-repellent treatment is applied is not limited to the examples described above as long as the inner surface IF1*a* of the first arrangement portion PP1 of the outer wall 120*a* and the inner surface IF2*a* of the second arrangement portion PP2 of the outer wall 120*b* are subjected to the water-repellent treatment. For example, the inner surface IF1*a* of the first arrangement portion PP1 and the inner surface IF2*a* of the second arrangement portion PP2 may be subjected to the water-repellent treatment by the fluorine-based coating or the water-repellent treatment by the silicone-based coating.

In the present embodiment, since the inner surface IF1*a* of the first arrangement portion PP1 and the inner surface IF2*a* of the second arrangement portion PP2 are subjected to the water-repellent treatment, it is possible to improve water repellency of the inner surface IF1*a* of the first arrangement portion PP1 and the inner surface IF2*a* of the second arrangement portion PP2. Thereby, in the present embodiment, it is possible to suppress adhesion of the ink INK to the inner surfaces IF1*a* and IF2*a* as compared with a case where the inner surfaces IF1*a* and IF2*a* are not subjected to the water-repellent treatment.

For example, in a case where the ink INK is attached to the inner surfaces IF1*a* and IF2*a*, the detection accuracy of the storage amount of the ink INK stored in the ink tank 100 may decrease as compared with a case where the ink INK is not attached to the inner surfaces IF1*a* and IF2*a*. In the present embodiment, since it is possible to suppress the adhesion of the ink INK to the inner surfaces IF1*a* and IF2*a*, it is possible to improve the detection accuracy of the storage amount of the ink INK stored in the ink tank 100.

Further, in the present embodiment, as described above, in the inner surface IF1 of the outer wall 120*a*, the portion that adheres to the outer walls 120*c*, 120*d* and 120*e* and the portion that adheres to the partition walls 122*a* and 122*b* are not subjected to the water-repellent treatment. Therefore, in the present embodiment, it is possible to suppress a decrease in strength of adhesion between the outer walls 120*c*, 120*d* and 120*e* and the outer wall 120*a*, and a decrease in strength of adhesion between the partition walls 122*a* and 122*b* and the outer wall 120*a*.

Here, when the ink INK is ejected from the ejection section 30*a* of the head unit 30, the storage amount of the ink INK in the ink tank 100 is reduced, so that the liquid level L of the ink INK is lowered. In the present embodiment, the management unit 2 having the tank unit 10 and the detection circuit 20 detects the liquid level L of the ink INK by the detection circuit 20, so that the storage amount of the ink INK in the ink tank 100, that is, a remaining amount of the ink INK can be grasped. The management unit 2 may include a notification portion that notifies a user of the ink jet printer 1 of the remaining amount of the ink INK. For example, the notification portion may notify the user of the ink jet printer 1 of the remaining amount of the ink INK by displaying the remaining amount of the ink INK. In an aspect in which the management unit 2 includes the notification portion, by notifying the user of the ink jet printer 1 of the remaining amount of the ink INK, it is possible to prevent the ink INK from running out at an undesired timing.

Next, with reference to FIG. 8, the outline of a method for detecting the storage amount of the ink INK in the ink tank 100 will be explained.

FIG. 8 is an explanatory diagram for explaining the outline of a method for detecting the storage amount of the ink INK in the ink tank 100. Note that FIG. 8 shows a cross section of the ink tank 100 and the FPC 200 taken along the line A1-A2 shown in FIG. 3. Also in FIG. 8, in order to make the figure easier to see, similarly to FIG. 7, the elements located in the +Z direction with respect to the partition wall 122*b*, the support portion 130 and the like are not shown.

A capacitor CCa is composed of the input electrode 210, the detection electrode 220*a*, and a dielectric existing between the input electrode 210 and the detection electrode 220*a*. For example, the double-sided tape 260, the outer wall 120*a*, one or both of the ink INK and air, and the outer wall 120*b* correspond to main dielectrics existing between the input electrode 210 and the detection electrode 220*a*. A capacitance of the capacitor CCa is represented, for example, by a combined capacitance of a plurality of capacitors divided based on a plurality of dielectrics existing between the input electrode 210 and the detection electrode 220*a*.

In FIG. 8, it is assumed that the capacitor CCa is divided into capacitors Ca1 and Ca5 having the double-sided tape 260 as a dielectric, a capacitor Ca2 having the outer wall 120*a* as a dielectric, a capacitor Ca3, and a capacitor Ca4 having the outer wall 120*b* as a dielectric. The capacitor Ca3 is a capacitor in which one or both of the ink INK and the air among the dielectrics existing between the input electrode 210 and the detection electrode 220*a* are used as the dielectric.

A capacitor CCb is composed of the input electrode 210 and the detection electrode 220*b* and a dielectric existing between the input electrode 210 and the detection electrode 220*b*. The dielectric existing between the input electrode 210 and the detection electrode 220*b* is the same as the dielectric existing between the input electrode 210 and the detection electrode 220*a*. For example, the capacitor CCb is divided into capacitors Cb1 and Cb5 having the double-sided tape 260 as a dielectric, a capacitor Cb2 having the outer wall 120*a* as a dielectric, a capacitor Cb3, and a capacitor Cb4 having the outer wall 120*b* as a dielectric.

For example, a capacitance CC of each of the capacitors CCa and CCb is represented by an equation (1) using capacitances C1, C2, C3, C4 and C5 of a plurality of capacitors obtained by dividing each of the capacitors CCa and CCb.

$$CC=1/(1/C1+1/C2+1/C3+1/C4+1/C5) \quad (1)$$

In the present embodiment, it is assumed that the detection electrodes 220*a* and 220*b* have the same size, so that C1 in the equation (1) indicates the capacitance of the capacitors Ca1 and Cb1, and C2 indicates the capacitance of the capacitors Ca2 and Cb2. C4 in the equation (1) indicates the capacitance of the capacitors Ca4 and Cb4, and C5 indicates the capacitance of the capacitors Ca5 and Cb5. When the equation (1) indicates the capacitance C of the capacitor CCa, C3 indicates the capacitance of the capacitor Ca3, and when the equation (1) indicates the capacitance C of the capacitor CCb, C3 indicates the capacitance of the capacitor Cb3.

In the below, the capacitances CC, C1, C2, C3, C4 and C5 may be collectively referred to as the capacitance C. For example, the capacitance C [F] is represented by an equation (2).

$$C=\varepsilon 0*\varepsilon 1*S/d \quad (2)$$

Note that "*" in the equation (2) indicates multiplication. S in the equation (2) indicates an area of the detection electrode 220*a* or 220*b*, and *d* indicates a distance between electrodes of the capacitor. In the example shown in FIG. 8, a length of the dielectric of the capacitor in the Y direction corresponds to a distance d. 60 in the equation (2) indicates a dielectric constant of a vacuum, and 61 indicates a relative permittivity of the dielectric of the capacitor.

As shown in the equation (2), the capacitance C increases in proportion to the relative permittivity 61 of the dielectric of the capacitor. Among the capacitors Ca1 to Ca5 and Cb1 to Cb5, in the capacitors other than the capacitors Ca3 and Cb3, the relative permittivity 61 does not change even if the storage amount of the ink INK in the ink tank 100 changes. On the other hand, in the capacitors Ca3 and Cb3 having one or both of the ink INK and the air as a dielectric, the relative permittivity 61 differs depending on the storage amount of the ink INK in the ink tank 100.

For example, in the capacitor Ca3, the relative permittivity 61 changes depending on a ratio of the ink INK and the air existing between the input electrode 210 and the detection electrode 220*a*. The relative permittivity 61 of the ink INK is larger than the relative permittivity 61 of the air. For example, the relative permittivity 61 of the ink INK varies depending on a material of the ink INK, and is about 80 if it is considered to be close to the relative permittivity of water. Further, the relative permittivity 61 of the air is approximately 1.

As described above, in the capacitors Ca3 and Cb3, the capacitance C3 changes depending on the storage amount of the ink INK in the ink tank 100. For example, an influence of a change in the capacitance C3 of the capacitor Ca3 on the capacitor CCa is large in a case where the capacitance C of the capacitor other than the capacitor Ca3 is large as compared with a case where the capacitance C of the capacitor other than the capacitor Ca3 is small. Similarly, an influence of the change in the capacitance C3 of the capacitor Cb3 on the capacitor CCb is large in a case where the capacitance C of the capacitor other than the capacitor Cb3 is large as compared with a case where the capacitance C of the capacitor other than the capacitor Cb3 is small.

For example, the capacitance C increases in proportion to a reciprocal of the distance d between the electrodes of the capacitor. That is, in a case where a length of the dielectric of the capacitor in the Y direction is small, the capacitance C is large as compared with a case where the length of the dielectric of the capacitor in the Y direction is large. Therefore, in the present embodiment, as explained in FIG. 7, the thickness T1 of the first arrangement portion PP1 of the outer wall 120*a* is thinner than the thickness T2 of the second arrangement portion PP2 of the outer wall 120*b* and the thickness T3 of the outer wall 120*d*. The thickness T1 of the first arrangement portion PP1 is not particularly limited as long as the thickness T1 is thinner than one of the thicknesses T2 and T3. For example, the thickness T1 of the first arrangement portion PP1 may be about 0.01 mm, and the thickness T2 of the second arrangement portion PP2 may be about 1 mm.

In the present embodiment, since the thickness T1 of the first arrangement portion PP1 is thinner than the thicknesses T2 and T3, the capacitance C1 of the capacitors Ca1 and Cb1 can be increased as compared with a case where the thickness T1 of the first arrangement portion PP1 is the same as the thickness T2 or the thickness T3. Thereby, in the present embodiment, it is possible to accurately detect the change in the capacitance C3 of each of the capacitors Ca3 and Cb3. As a result, in the present embodiment, it is possible to improve the detection accuracy of the storage amount of the ink INK in the ink tank 100.

Further, in the present embodiment, it is assumed that the dielectric constant of the first arrangement portion PP1 of the outer wall 120*a* is higher than the dielectric constant of the second arrangement portion PP2 of the outer wall 120*b* and the dielectric constant of the outer wall 120*d*. In this case, for example, the capacitance C1 of the capacitors Ca1 and Cb1 can be increased as compared with a case where the outer wall 120*a* is formed of a material having the same dielectric constant as the outer wall 120*b* or 120*d*.

In the example shown in FIG. 8, the terminal TMg of the shield wiring 240 is grounded through any of the external contacts CTg1 to CTg6 in order to reduce the transmission of a noise to the input electrode 210, the detection electrodes 220*a* and 220*b* and the like.

The terminal TMt1 of the input electrode 210 is electrically coupled to the AC power supply ACP via the external contact CTt1. The AC power supply ACP outputs, for example, an AC signal including a pulse having an amplitude of 3.3 [V] as an input signal Vin to the input electrode 210. For example, the input signal Vin is transmitted to the detection electrode 220*a* as a detection signal Vout1 via the capacitor CCa, and is transmitted to the detection electrode 220*b* via the capacitor CCb as a detection signal Vout2. The terminal TMr1 of the detection electrode 220*a* is electrically coupled to the input terminal IN1 of the selection circuit 21 described later in FIG. 10 via the external contact CTr1, and the terminal TMr2 of the detection electrode 220*b* is electrically coupled to the input terminal IN2 of the selection circuit 21 via the external contact CTr2. As a result, the detection signals Vout1 and Vout2 are input to the selection circuit 21. The detection signals Vout1 and Vout2 are examples of an "electric signal".

The amplitude of the detection signal Vout1 is large in a case where the capacitance CC of the capacitor CCa is large as compared with a case where the capacitance CC of the capacitor CCa is small. For example, the amplitude of the detection signal Vout1 is large in a case where the capacitance C3 of the capacitor Ca3 is large as compared with a case where the capacitance C3 of the capacitor Ca3 is small. That is, in a case where a space between the input electrode 210 and the detection electrode 220*a* is filled with the ink INK, the amplitude of the detection signal Vout1 is large as compared with a case where the space between the input electrode 210 and the detection electrode 220*a* is filled with the air. Similarly, in a case where a space between the input electrode 210 and the detection electrode 220*b* is filled with the ink INK, the amplitude of the detection signal Vout2 is large as compared with a case where the space between the input electrode 210 and the detection electrode 220*b* is filled with the air.

In the example shown in FIG. 8, since the liquid level L of the ink INK is located between a liquid level range LV1 and a liquid level range LV2, the amplitude of the detection signal Vout1 is larger than the amplitude of the detection signal Vout2. The liquid level range LV1 corresponds to a position of the detection electrode 220*a* in the Z direction, and is a range from the side in the −Z direction to the side in the +Z direction of the two sides of the detection electrode 220*a* along the X direction. Further, the liquid level range LV2 corresponds to a position of the detection electrode 220*b* in the Z direction, and is a range from the side in the −Z direction to the side in the +Z direction of the two sides of the detection electrode 220*b* along the X direction.

Next, with reference to FIG. 9, a relationship between the liquid level L of the ink INK in the ink tank 100 and the detection signals Vout1 and Vout2 will be explained.

Figure 9:
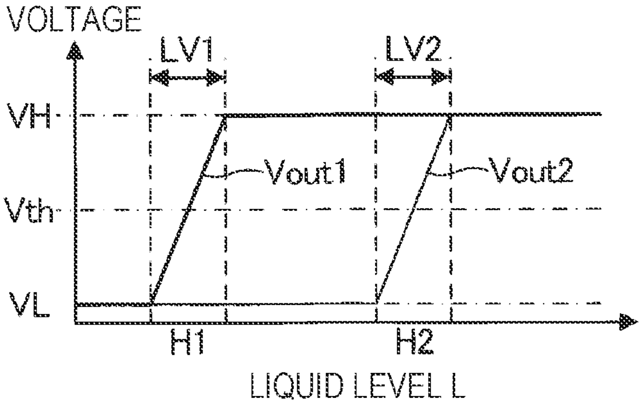
FIG. 9 is an explanatory diagram for explaining a relationship between a liquid level of the ink in the ink tank and a detection signal.

FIG. 9 is an explanatory diagram for explaining the relationship between the liquid level L of the ink INK in the ink tank 100 and the detection signals Vout1 and Vout2. Hereinafter, the detection signals Vout1 and Vout2 may be collectively referred to as detection signals Vout. A horizontal axis in the figure indicates a position of the liquid level L of the ink INK in the Z direction. For example, the position H2 is a position in the +Z direction with respect to the position H1. The liquid level range LV2 is located in the +Z direction with respect to the liquid level range LV1. That is, the liquid level range LV2 is located above the liquid level range LV1. A vertical axis of the figure shows a magnitude of the detection signal Vout, which is a voltage of the detection electrode 220. The magnitude of the detection signal Vout may be, for example, an amplitude of the detection signal Vout or an effective value of the detection signal Vout. A voltage VH is larger than a voltage Vth, and the voltage Vth is larger than a voltage VL.

The voltage Vth is a threshold voltage when the magnitude of the detection signal Vout is expressed by two values such as a high level and a low level. For example, the voltage Vth may be a central voltage between the voltages VL and VH, a voltage closer to the voltage VL than the voltage VH between the voltages VL and VH, or a voltage closer to the voltage VH than the voltage VL between the voltages VL and VH.

When the space between the input electrode 210 and the detection electrode 220*a* is filled with the air and there is no ink INK between the input electrode 210 and the detection electrode 220*a*, the magnitude of the detection signals Vout1 and Vout2 is the voltage VL. The magnitude of the detection signal Vout1 increases when a proportion of the ink INK existing between the input electrode 210 and the detection electrode 220*a* increases. For example, when the magnitude of the detection signal Vout1 is the voltage Vth, it can be considered that the liquid level L of the ink INK exists in the liquid level range LV1 including the position H1 where the detection electrode 220*a* is arranged. When the space between the input electrode 210 and the detection electrode 220*a* is filled with the ink INK and there is no air between the input electrode 210 and the detection electrode 220*a*, the magnitude of the detection signal Vout1 is the voltage VH.

The magnitude of the detection signal Vout2 increases when a proportion of the ink INK existing between the input electrode 210 and the detection electrode 220*b* increases. For example, when the magnitude of the detection signal Vout2 is the voltage Vth, it can be considered that the liquid level L of the ink INK exists in the liquid level range LV2 including the position H2 where the detection electrode 220*b* is arranged. When the space between the input electrode 210 and the detection electrode 220*b* is filled with the ink INK and there is no air between the input electrode 210 and the detection electrode 220*b*, the magnitude of the detection signal Vout2 is the voltage VH.

Next, the detection circuit 20 will be explained with reference to FIG. 10.

Figure 10:
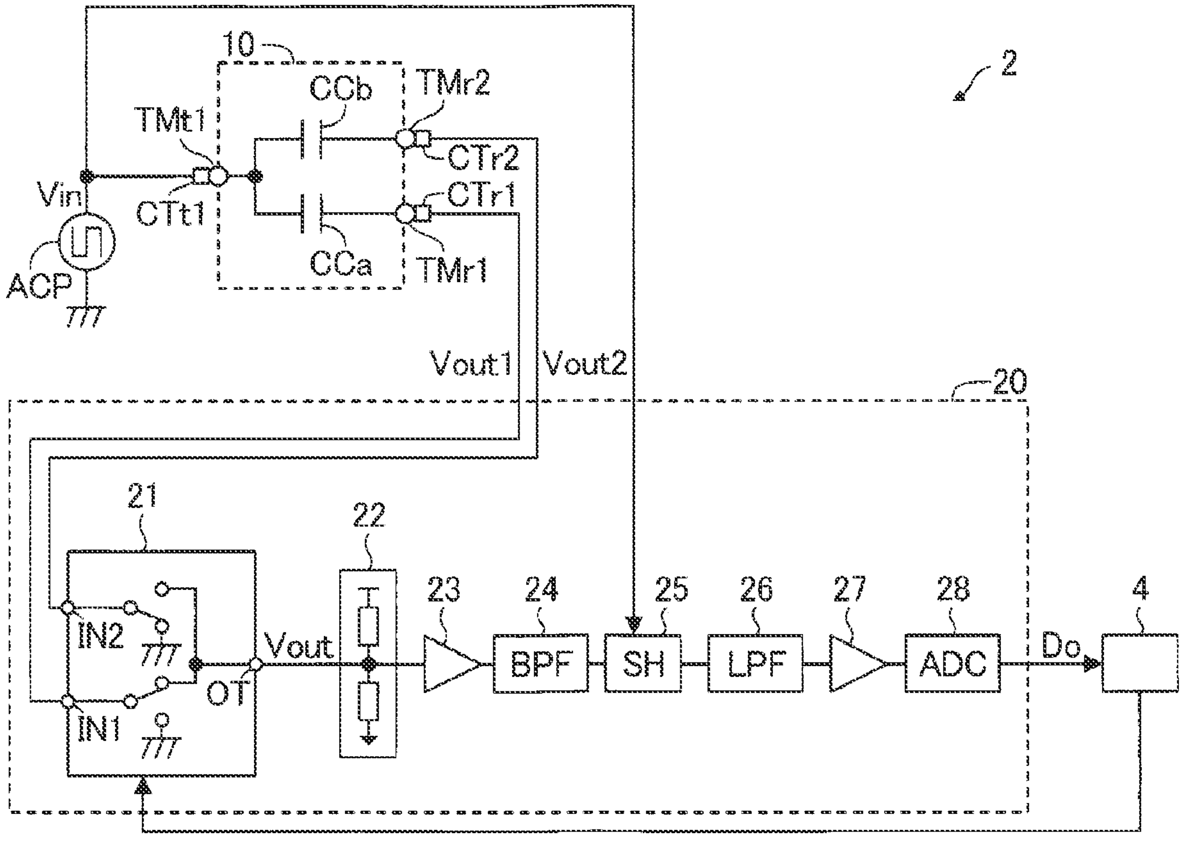
FIG. 10 is a circuit diagram of a detection circuit.

FIG. 10 is a circuit diagram of the detection circuit 20. Note that FIG. 10 is an excerpt of a portion of the management unit 2 that manages the storage amount of the ink INK in one of the plurality of ink tanks 100 of the tank unit 10.

Further, in FIG. 10, for easy explanation, the tank unit 10 is illustrated by an equivalent circuit represented by the capacitors CCa and CCb.

The detection circuit 20 includes the selection circuit 21, a bias circuit 22, a buffer circuit 23, a band pass filter (BPF) 24, a sample and hold (SH) circuit 25, a low pass filter (LPF) 26, an amplifier circuit 27, and an analog to digital converter (ADC) 28.

The selection circuit 21 includes the input terminals IN1 and IN2 and an output terminal OT. The selection circuit 21 electrically couples one of the input terminals IN1 and IN2 to the output terminal OT and grounds the other of the input terminals IN1 and IN2 according to control by the control unit 4.

For example, the input terminal IN1 of the selection circuit 21 is electrically coupled to the external contact CTr1 in contact with the terminal TMr1, and the input terminal IN2 of the selection circuit 21 is electrically coupled to the external contact CTr2 in contact with the terminal TMr2. That is, the input terminal IN1 of the selection circuit 21 is electrically coupled to the detection electrode 220*a* via the external contact CTr1 and the terminal TMr1, and the input terminal IN2 of the selection circuit 21 is electrically coupled to the detection electrode 220*b* via the external contact CTr2 and the terminal TMr2. The output terminal OT of the selection circuit 21 is electrically coupled to the buffer circuit 23 via the bias circuit 22.

That is, the selection circuit 21 outputs the detection signal Vout selected according to the control by the control unit 4 out of the detection signal Vout1 received at the input terminal IN1 and the detection signal Vout2 received at the input terminal IN2 to the buffer circuit 23 from the output terminal OT. In this way, the selection circuit 21 switches the detection signal Vout output to the buffer circuit 23 between the detection signal Vout1 and the detection signal Vout2.

The bias circuit 22 biases, for example, the output terminal OT of the selection circuit 21, i.e., an input of the buffer circuit 23, to a predetermined bias voltage between a power supply voltage and a ground voltage. The bias circuit 22 may bias the input of the buffer circuit 23 by a predetermined bias current.

The buffer circuit 23 outputs the detection signal Vout output from the selection circuit 21 to the BPF 24. As described above, the detection signal Vout output from the selection circuit 21 is biased to the predetermined bias voltage by the bias circuit 22. In the buffer circuit 23, for example, an input impedance is higher than an output impedance. For example, the buffer circuit 23 is used for impedance conversion.

The BPF 24 selectively passes components in a predetermined frequency range and removes other components. For example, the BPF 24 outputs, to the SH circuit 25, a signal of a component in a predetermined frequency range of the detection signal Vout output from the buffer circuit 23.

The SH circuit 25 receives, for example, the input signal Vin output from the AC power supply ACP and the signal output from the BPF 24. Then, the SH circuit 25 samples the signal output from the BPF 24 in a cycle based on a cycle of the input signal Vin, and holds a voltage value of the sampled signal until an operation of the ADC 28 is completed. Further, the SH circuit 25 outputs the sampled signal to the LPF 26.

The LPF 26 removes a component having a frequency higher than a predetermined threshold value and allows a component having a frequency equal to or lower than the predetermined threshold value to pass therethrough. For example, the LPF 26 removes a component having a frequency higher than the predetermined threshold value from the signals output from the SH circuit 25, and outputs a signal of a component having a frequency equal to or lower than the predetermined threshold value to the amplifier circuit 27. Therefore, the signal that has passed through the LPF 26 is a signal from which a noise and the like of components having a frequency higher than the predetermined threshold value have been removed.

The amplifier circuit 27 amplifies the signal output from the LPF 26 at a predetermined amplification factor, and outputs the amplified signal to the ADC 28. The signal output from the amplifier circuit 27 to the ADC 28 is an analog signal.

The ADC 28 converts the analog signal output from the amplifier circuit 27 into a digital signal. Then, the ADC 28 outputs the digital signal converted from the analog signal to the control unit 4 as an output signal Do. The output signal Do is a digital signal indicating a magnitude of the detection signal Vout selected by the selection circuit 21 from the detection signals Vout1 and Vout2. In this way, the detection circuit 20 detects the storage amount of the ink INK in the ink tank 100 by detecting the magnitudes of the detection signals Vout1 and Vout2. Although the details will be described later in FIG. 14, for example, the control unit 4 specifies the storage amount of the ink INK in the ink tank 100 based on the output signal Do output from the detection circuit 20.

The configuration of the detection circuit 20 is not limited to the example shown in FIG. 10. For example, the detection circuit 20 may include, instead of the ADC 28, a comparator for comparing whether or not an output voltage of the amplifier circuit 27 is equal to or higher than a predetermined value. Further, for example, when the number of the detection electrode 220 is one, the selection circuit 21 may be omitted. Alternatively, when the number of the detection electrodes 220 is three or more, for example, the selection circuit 21 includes three or more input terminals IN having a one-to-one correspondence with the three or more detection electrodes 220. Then, the selection circuit 21 electrically couples one of the three or more input terminals IN to the output terminal OT, and grounds the other input terminals IN.

Next, an overall configuration of the FPC 200 will be explained with reference to FIG. 11.

Figure 11:
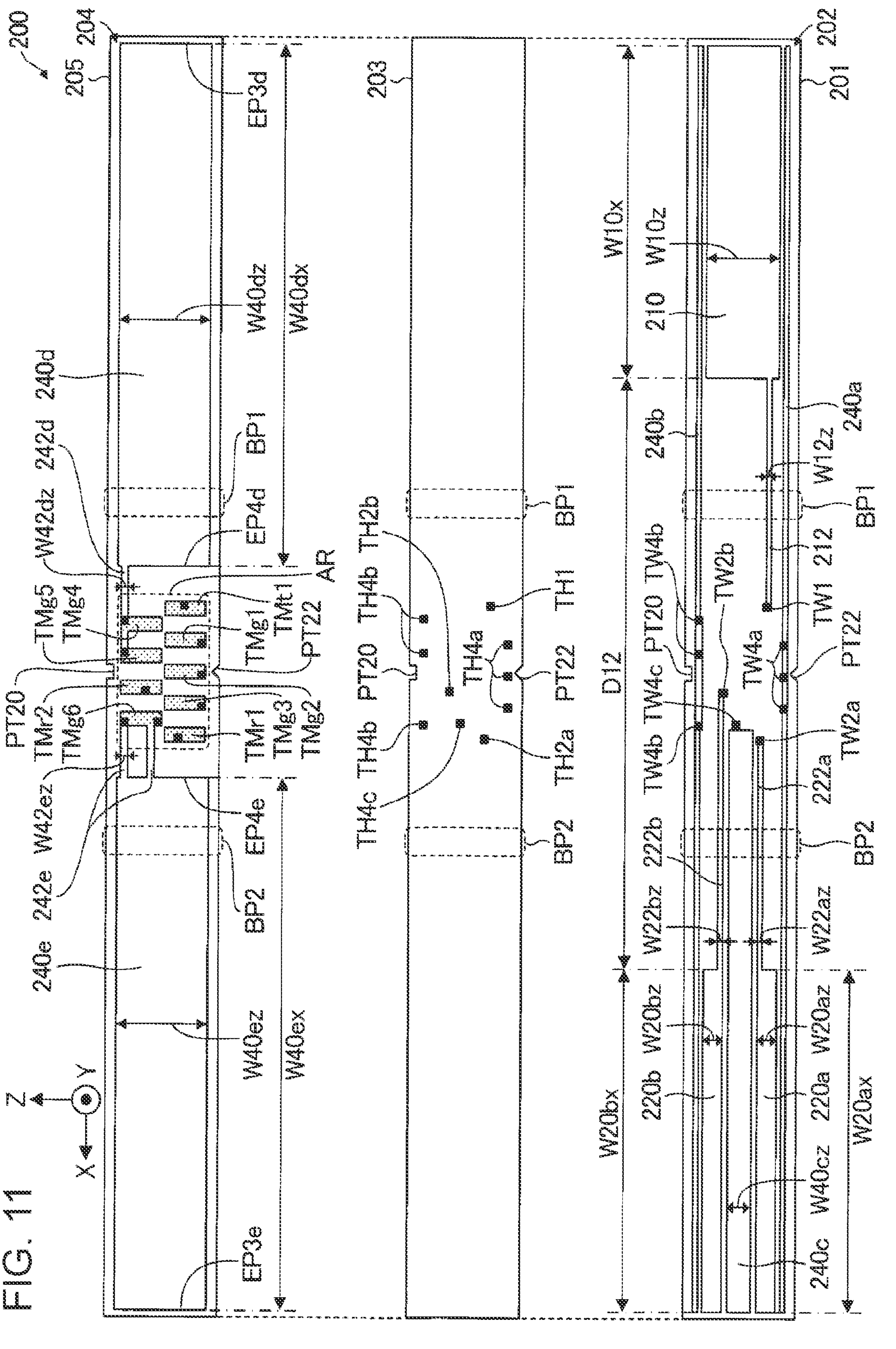
FIG. 11 is a plan view showing an example of the flexible printed substrate.

FIG. 11 is a plan view showing an example of the FPC 200. Note that FIG. 11 is a plan view of the FPC 200 in a state of not being adhered to the ink tank 100. In FIG. 11, in order to facilitate a correspondence with FIG. 3, the +X direction, the +Y direction, and the +Z direction with respect to the detection electrode 220 are the same as those in FIG. 3. Further, in FIG. 11, in order to make the figure easier to see, the FPC 200 is described by being divided into a figure of the first cover film layer 201 and the first conductor layer 202, a figure of the base material layer 203, and a figure of the second conductor layer 204 and the second cover film layer 205.

The FPC 200 is, for example, an FPC capable of mounting components on both sides of the base material layer 203. For example, the first conductor layer 202 is provided in one surface of the base material layer 203, and the second conductor layer 204 is provided in the other surface of the base material layer 203.

The first conductor layer 202 includes, for example, the input electrode 210, the wiring 212 of the input electrode 210, the detection electrode 220*a*, the wiring 222*a* of the detection electrode 220*a*, the detection electrode 220*b*, the wiring 222*b* of the detection electrode 220*b*, and the shield wirings 240*a*, 240*b* and 240*c*. The input electrodes 210, the detection electrodes 220*a* and 220*b*, the wirings 212, 222*a* and 222*b*, and the shield wirings 240*a*, 240*b* and 240*c* each extend in the X direction.

For example, a distance D12 between the input electrode 210 and the detection electrode 220 is larger than the width W10*z* of the input electrode 210 in the Z direction. Further, for example, a width W12*z* of the wiring 212 of the input electrode 210 in the Z direction is smaller than the width W10*z* of the input electrode 210 in the Z direction, and the width W10*z* of the input electrode 210 in the Z direction is smaller than the width W10*x* of the input electrode 210 in the X direction. Further, the width W20*az* of the wiring 222*a* of the detection electrode 220*a* in the Z direction is smaller than the width W20*az* of the detection electrode 220*a* in the Z direction, and the width W20*az* of the detection electrode 220*a* in the Z direction is smaller than the width W20*ax* of the detection electrode 220*a* in the X direction. Similarly, the width W20*bz* of the wiring 222*b* of the detection electrode 220*b* in the Z direction is smaller than the width W20*bz* of the detection electrode 220*b* in the Z direction, and the width W20*bz* of the detection electrode 220*b* in the Z direction is smaller than the width W20*bx* of the detection electrode 220*b* in the X direction.

In the present embodiment, it is assumed that the detection electrodes 220*a* and 220*b* have substantially the same shape and the detection electrodes 220*a* and 220*b* have substantially the same size. For example, the width W20*az* of the detection electrode 220*a* in the Z direction is substantially equal to the width W20*bz* of the detection electrode 220*b* in the Z direction, and the width W20*ax* in the X direction of the detection electrode 220*a* is substantially equal to the width W20*bx* of the detection electrode 220*b* in the X direction. When the detection electrodes 220*a* and 220*b* have substantially the same shape, it is considered that electrical characteristics of the capacitor CCa including the detection electrode 220*a* and the capacitor CCb including the detection electrode 220*b* are substantially the same. Therefore, in the present embodiment, the detection circuit 20 using the detection signal Vout1 input from the detection electrode 220*a* and the detection circuit 20 using the detection signal Vout2 input from the detection electrode 220*b* can be shared. As a result, in the present embodiment, it is possible to suppress an increase in the number or circuit scale of the detection circuits 20 corresponding to one ink tank 100.

If the detection circuit 20 can be shared between the detection electrodes 220*a* and 220*b*, for example, the size of the detection electrode 220*a* may be different from the size of the detection electrode 220*b*. For example, a difference between the width W20*az* of the detection electrode 220*a* in the Z direction and the width W20*bz* of the detection electrode 220*b* in the Z direction may be equal to or less than a first value, and a difference between the width W20*ax* of the detection electrode 220*a* in the X direction and the width W20*bx* of the detection electrode 220*b* in the X direction may be equal to or less than a second value. The first value and the second value are, for example, allowable values for a difference in size between the detection electrodes 220*a* and 220*b* when the detection circuit 20 is shared between the detection electrodes 220*a* and 220*b*. Further, when the detection circuits 20 are individually provided for the detection electrodes 220*a* and 220*b*, the detection electrodes 220*a* and 220*b* may not have substantially the same shape or may not have substantially the same size.

In the below, the width W20*az* of the detection electrode 220*a* in the Z direction and the width W20*bz* of the detection electrode 220*b* in the Z direction may be collectively referred to as widths W20*z*, and the width W20*ax* of the detection electrode 220*a* in the X direction and the width W20*bx* of the detection electrode 220*b* in the X direction may be collectively referred to as widths W20*x*.

Further, the shield wiring 240*c* is arranged between the detection electrode 220*a* and the detection electrode 220*b*, and between the wiring 222*a* and the wiring 222*b*. In the present embodiment, it is assumed that a width W40*cz* of the shield wiring 240*c* in the Z direction is equal to or greater than the width W20*az* of the detection electrode 220*a* in the Z direction and equal to or greater than the width W20*bz* of the detection electrode 220*b* in the Z direction. When the width W40*cz* of the shield wiring 240*c* is equal to or greater than the width W20 of the detection electrode 220, an interference between the two detection electrodes 220*a* and 220*b* can be reduced as compared with a case where the width W40*cz* of the shield wiring 240*c* is less than the width W20 of the detection electrode 220.

Further, the bent portion BP1 includes a part of the wiring 212 of the input electrode 210, a part of the shield wiring 240*a*, and a part of the shield wiring 240*b*, and does not include the input electrode 210. Similarly, the bent portion BP2 includes a part of the wiring 222*a* of the detection electrode 220*a*, a part of the wiring 222*b* of the detection electrode 220*b*, a part of the shield wiring 240*a*, and a part of the shield wiring 240*b*, and does not include the detection electrodes 220*a* and 220*b*. That is, the FPC 200 is bent along the outer periphery of the ink tank 100 at a portion where the wiring 212 is arranged and a portion where the wiring 222*a* is arranged.

As described above, the bent portion BP1 does not include the input electrode 210 having a width wider than that of the wiring 212. Therefore, in the present embodiment, a rigidity of the bent portion BP1 can be made lower than that of a portion where the input electrode 210 is arranged. Similarly, in the present embodiment, a rigidity of the bent portion BP2 can be made lower than that of a portion where the detection electrode 220 is arranged. As a result, in the present embodiment, the FPC 200 can be easily bent along the outer periphery of the ink tank 100 at the bent portions BP1 and BP2.

The second conductor layer 204 includes, for example, the shield wiring 240*d*, a lead wiring 242*d* of the shield wiring 240*d*, the shield wiring 240*e*, a lead wiring 242*e* of the shield wiring 240*e*, and the plurality of terminals TM. The shield wiring 240*d* is electrically coupled to one or more terminals TMg of the plurality of terminals TMg via the lead wiring 242*d*, and the shield wiring 240*e* is electrically coupled to one or more terminals TMg of the plurality of terminals TMg via the lead wiring 242*e*. For example, the shield wiring 240*d* is electrically coupled to the terminals TMg4 and TMg5 by the lead wiring 242*d*. Further, for example, the shield wiring 240*e* is electrically coupled to the terminal TMg6 by the lead wiring 242*e*.

The lead wirings 242*d* and 242*e* are formed of the same material as the input electrode 210. In the present embodiment, it is assumed that the shield wiring 240*d* and the lead wiring 242*d* are integrally formed, and the shield wiring 240*e* and the lead wiring 242*e* are integrally formed. In this case, the lead wiring 242*d* is directly coupled to the shield wiring 240*d*, and the lead wiring 242*e* is directly coupled to the shield wiring 240*e*. The shield wiring 240*d*, the lead wiring 242*d*, and the terminals TMg4 and TMg5 may be integrally formed. Similarly, the shield wiring 240*e*, the lead wiring 242*e*, and the terminal TMg6 may be integrally formed.

The shield wiring 240*d* includes, for example, a region that overlaps the entire input electrode 210 and at least a part of the wiring 212 in a plan view from the +Y direction. For example, a width W40*dx* of the shield wiring 240*d* in the X direction is larger than the width W10*x* of the input electrode 210 in the X direction. Further, a width W40*dz* of the shield wiring 240*d* in the Z direction is larger than the width W10*z* of the input electrode 210 in the Z direction. That is, the shield wiring 240*d* extends in the X direction with a constant width W40*dz*. The shield wiring 240*d* may extend in the X direction with a substantially constant width W40*dz* including an error.

In the example shown in FIG. 11, the bent portion BP1 is located between two edge portions EP3*d* and EP4*d* of the shield wiring 240*d*. The two edge portions EP3*d* and EP4*d* of the shield wiring 240*d* are, for example, edge portions that are separated from each other in the X direction among edge portions that are grasped in a plan view from the +Y direction. The edge portion EP4*d* located in the +X direction with respect to the edge portion EP3*d* may be located in the −X direction with respect to the bent portion BP1 in a range including a region where the shield wiring 240*d* overlaps the entire input electrode 210 in a plan view from the +Y direction.

The shield wiring 240*e* includes, for example, a region that overlaps the entire detection electrode 220*a*, the entire detection electrode 220*b*, at least a part of the wiring 222*a*, and at least a part of the wiring 222*b* in a plan view from the +Y direction. For example, a width W40*ex* of the shield wiring 240*e* in the X direction is larger than both the width W20*ax* of the detection electrode 220*a* in the X direction and the width W20*bx* of the detection electrode 220*b* in the X direction. Further, a width W40*ez* of the shield wiring 240*e* in the Z direction is larger than a sum of the width W20*az* of the detection electrode 220*a* in the Z direction and the width W20*bz* of the detection electrode 220*b* in the Z direction. That is, the shield wiring 240*e* extends in the X direction with a constant width W40*ez*. The shield wiring 240*e* may extend in the X direction with a substantially constant width W40*ez* including an error.

In the example shown in FIG. 11, the bent portion BP2 is located between two edge portions EP3*e* and EP4*e* of the shield wiring 240*e*. The two edge portions EP3*e* and EP4*e* of the shield wiring 240*e* are, for example, edge portions that are separated from each other in the X direction among edge portions that are grasped in a plan view from the +Y direction. The edge portion EP4*e* located in the −X direction with respect to the edge portion EP3*e* may be located in the +X direction with respect to the bent portion BP2 in a range including a region where the shield wiring 240*e* overlaps the entire detection electrode 220 in a plan view from the +Y direction.

Here, in FIG. 11, the +Y direction corresponds to a direction perpendicular to a surface of the input electrode 210 facing the outer wall 120*a* and a direction perpendicular to a surface of the detection electrode 220 facing the outer wall 120*b*. Further, the X direction corresponds to an extending direction of the FPC 200.

Further, in a terminal arrangement in which the terminals TMt1, TMr1, TMg1, TMg2 and TMg3 are arranged, the terminal TMt1 is located at one end of the terminal arrangement and the terminal TMr1 is located at the other end of the terminal arrangement.

Further, the number of terminals TMg located between the terminal TMt1 and one of the terminals TMr1 and TMr2 is larger than the number of terminals TMg located between the terminals TMr1 and TMr2. In the example shown in FIG. 11, the number of terminals TMg located between terminals TMr1 and TMr2 is two of the terminals TMg3 and TMg6. The number of terminals TMg located between the terminal TMt1 and the terminal TMr1 is three of the terminals TMg1, TMg2, and TMg3. Further, the number of terminals TMg located between the terminals TMt1 and the terminal TMr2 is four of the terminals TMg1, TMg2, TMg4 and TMg5. In the present embodiment, by increasing the number of terminals TMg located between the terminal TMt1 and one of the terminals TMr1 and TMr2, it is possible to reduce an interference between the terminal TMt1 and the one of the terminals TMr1 and TMr2.

When focusing on a distance between the terminals TM rather than the number of the terminals TMg, a distance between the terminal TMt1 and one of the terminals TMr1 and TMr2 is larger than a distance between the terminals TMr1 and TMr2. The distance between the terminals TM may be a distance between a center of one terminal TM and a center of the other terminal TM of two terminals TM, or may be a shortest distance between the two terminals TM. In this case, by increasing the distance between the terminal TMt1 and the one of the terminals TMr1 and TMr2, it is possible to reduce the interference between the terminal TMt1 and the one of the terminals TMr1 and TMr2.

Through holes TH1, TH2*a*, TH2*b*, TH4*a*, TH4*b* and TH4*c* penetrating through the base material layer 203 are formed in the base material layer 203. In the below, the through holes TH1, TH2*a*, TH2*b*, TH2*a*, TH4*a*, TH4*b* and TH4*c* may be collectively referred to as through holes TH. In the example shown in FIG. 11, the number of the through holes TH is ten, but the number of the through holes TH is not limited to ten.

A through wiring TW1 inserted through the through hole TH1 is coupled to the terminal TMt1 and the wiring 212. The wiring 212 couples the through wiring TW1 and the input electrode 210. That is, the input electrode 210 is electrically coupled to the terminal TMt1 by the through wiring TW1. A through wiring TW2*a* inserted through the through hole TH2*a* couples the terminal TMr1 and the wiring 222*a*. The wiring 222*a* couples the through wiring TW2*a* and the detection electrode 220*a*. That is, the detection electrode 220*a* is electrically coupled to the terminal TMr1 by the through wiring TW2*a*. A through wiring TW2*b* inserted through the through hole TH2*b* couples the terminal TMr2 and the wiring 222*b*. The wiring 222*b* couples the through wiring TW2*b* and the detection electrode 220*b*. That is, the detection electrode 220*b* is electrically coupled to the terminal TMr2 by the through wiring TW2*b*.

Further, the shield wiring 240*a* is electrically coupled to the terminals TMg1, TMg2 and TMg3 by through wiring TW4*a* inserted through the through hole TH4*a*. The shield wiring 240*b* is electrically coupled to the terminals TMg4, TMg5 and TMg6 by the through wiring TW4*b* inserted through the through hole TH4*b*. The shield wiring 240*c* is electrically coupled to the terminal TMg6 by the through wiring TW4*c* inserted through the through hole TH4*c*. In the below, the through wiring TW1, TW2*a*, TW2*b*, TW4*a*, TW4*b* and TW4*c* may be collectively referred to as through wirings TW.

Here, the second conductor layer 204 including the shield wirings 240*d* and 240*e*, the plurality of terminals TM and the like is covered with the second cover film layer 205 except for the plurality of terminals TM. That is, the plurality of terminals TM are exposed to an outside of the FPC 200. Thereby, in the present embodiment, it is possible to realize contacts by spring contacts or the like between the plurality of terminals TM and the plurality of external contacts CT. In the FPC 200, at least a part of a terminal arrangement region AR including the plurality of terminals TM is located between the input electrode 210 and the detection electrode 220*a*. For example, in the FPC 200, the input electrode 210 is located in the −X direction with respect to the terminal arrangement region AR, and the detection electrode 220 is located in the +X direction with respect to the terminal arrangement region AR. In the present embodiment, since the plurality of terminals TM are integrated between the input electrode 210 and the detection electrode 220*a*, it is possible to reduce a size of the external substrate or the like provided with the plurality of external contacts CT in contact with the plurality of terminals TM.

As described above, in the present embodiment, the input electrode 210 and the detection electrodes 220*a* and 220*b* are provided in one FPC 200. Therefore, in the present embodiment, for example, the FPC 200 can be easily attached to the ink tank 100 as compared with an aspect in which the input electrode 210 and the detection electrode 220 are provided in two different FPCs, respectively. Further, for example, in the aspect in which the input electrode 210 and the detection electrode 220 are provided in the two different FPCs, respectively, when the two FPCs are attached to the ink tank 100, deviation of a position of the detection electrode 220 with respect to the input electrode 210 may become large. On the other hand, in the present embodiment, since one FPC 200 needs to be attached to the ink tank 100, it is possible to reduce that the deviation of the position of the detection electrode 220 with respect to the input electrode 210 become large when the FPC 200 is attached to the ink tank 100.

The arrangement of the plurality of positioning portions PT is not limited to the example shown in FIG. 11. For example, the ink tank 100 may include a fifth positioning portion PT and a seventh positioning portion PT in addition to the positioning portions PT10 and PT12. In this case, the FPC 200 includes a sixth positioning portion PT that is fitted with the fifth positioning portion PT and an eighth positioning portion PT that is fitted with the seventh positioning portion PT. For example, in the X direction, at least a part of the terminal arrangement region AR may be located between the sixth positioning portion PT and the eighth positioning portion PT. That is, in the FPC 200, two positioning portions PT penetrating through the FPC 200 may be formed at positions sandwiching the terminal arrangement region AR in the X direction. In this case, since the positioning portions PT are arranged so as to surround the terminal arrangement region AR, it is possible to further reduce deviation of the plurality of terminals TM from a predetermined positions with respect to the ink tank 100 when the FPC 200 is attached to the ink tank 100.

Next, a relationship between a capacitance between the input electrode 210 and the detection electrode 220 and a size of the detection electrode 220 will be explained with reference to FIGS. 12 and 13.

Figure 12:
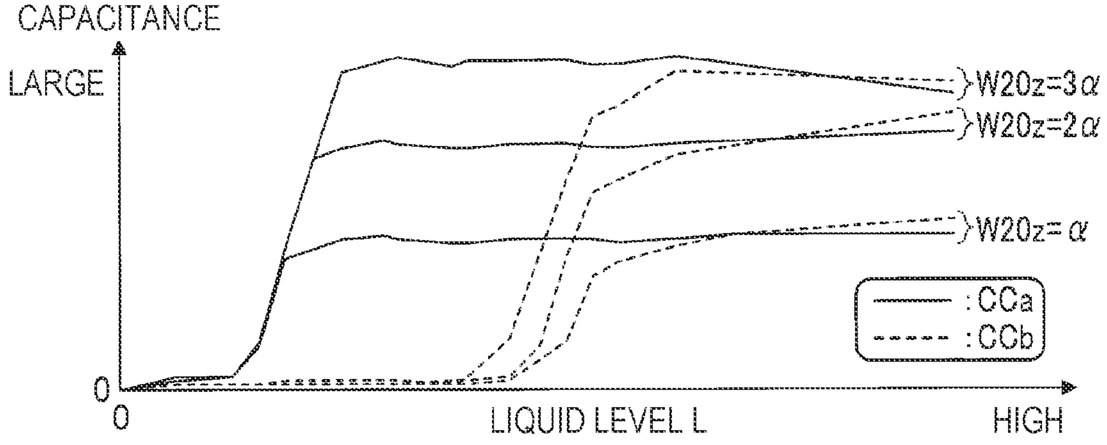
FIG. 12 is an explanatory diagram for explaining an example of a relationship between a capacitance between an input electrode and a detection electrode and a size of the detection electrode.

FIG. 12 is an explanatory diagram for explaining an example of the relationship between the capacitance between the input electrode 210 and the detection electrode 220 and the size of the detection electrode 220. A horizontal axis of the figure shows the position of the liquid level L of the ink INK in the Z direction, and a vertical axis of the figure shows the capacitance of the capacitors CCa and CCb. A solid line in the figure shows the capacitance of the capacitor CCa, and a broken line in the figure shows the capacitance of the capacitor CCb. Note that FIG. 12 shows results of simulation of three patterns in which the width W20*z* of the detection electrode 220 in the Z direction is "α", "2*α" and "3*α". α is a positive value. The width W20*x* of the detection electrode 220 in the X direction is the same in the simulation of the three patterns.

In a case where the width W20*z* of the detection electrode 220 in the Z direction is large, the capacitance when the space between the input electrode 210 and the detection electrode 220 is filled with the ink INK is large as compared with a case where the width W20*z* of the detection electrode 220 in the Z direction is small. Even if the width W20*z* of the detection electrode 220 in the Z direction changes, an amount of change in capacitance with respect to a predetermined amount of change in proportion of the ink INK existing between the input electrode 210 and the detection electrode 220 is almost constant.

Figure 13:
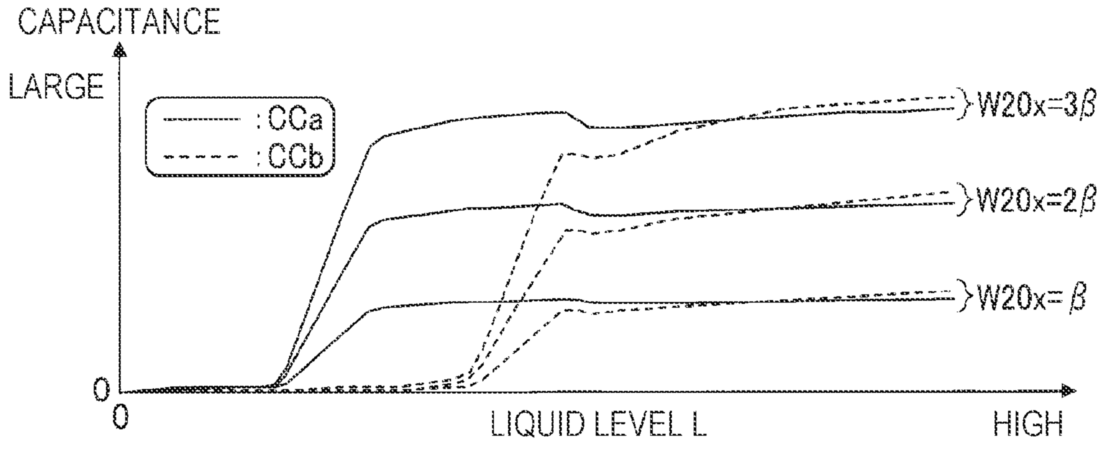
FIG. 13 is an explanatory diagram for explaining another example of the relationship between the capacitance between the input electrode and the detection electrode and the size of the detection electrode.

FIG. 13 is an explanatory diagram for explaining another example of the relationship between the capacitance between the input electrode 210 and the detection electrode 220 and the size of the detection electrode 220. As in FIG. 12, a horizontal axis in the figure shows the position of the liquid level L of the ink INK in the Z direction, and a vertical axis in the figure shows the capacitance of the capacitors CCa and CCb. A solid line in the figure shows the capacitance of the capacitor CCa, and a broken line in the figure shows the capacitance of the capacitor CCb. Note that FIG. 13 shows results of simulation of three patterns in which the width W20*x* of the detection electrode 220 in the X direction is "β", "2*β", and "3*β". β is a positive value. The width W20*z* of the detection electrode 220 in the Z direction is the same in the simulation of the three patterns.

In a case where the width W20*x* of the detection electrode 220 in the X direction is large, the capacitance when the space between the input electrode 210 and the detection electrode 220 is filled with the ink INK is large as compared with a case where the width W20*x* in the X direction of the detection electrode 220 is small. That is, in a case where an area of the detection electrode 220 is large, the capacitance when the space between the input electrode 210 and the detection electrode 220 is filled with the ink INK is large as compared with a case the area of the detection electrode 220 is small.

Further, in a case where the width W20*x* of the detection electrode 220 in the X direction is large, an amount of change in capacitance with respect to a predetermined amount of change in proportion of the ink INK existing between the input electrode 210 and the detection electrode 220 is large as compared with a case where the width W20*x* of the detection electrode 220 in the X direction is small. That is, in a case where the width W20*x* of the detection electrode 220 in the X direction is large, the change in capacitance with respect to the change in proportion of the ink INK existing between the input electrode 210 and the detection electrode 220 becomes sensitive as compared with a case where the width W20*x* of the detection electrode 220 in the X direction is small. In a case where the change in capacitance with respect to the change in proportion of the ink INK existing between the input electrode 210 and the detection electrode 220 is sensitive, the storage amount of the ink INK in the ink tank 100 can be detected accurately as compared with a case where the change in capacitance is not sensitive. Therefore, in the present embodiment, as explained in FIG. 11 and the like, the detection electrodes 220*a* and 220*b* are formed such that the width W20*x* in the X direction is larger than the width W20*z* in the Z direction.

Next, an example of an operation of the control unit 4 will be explained with reference to FIG. 14.

Figure 14:
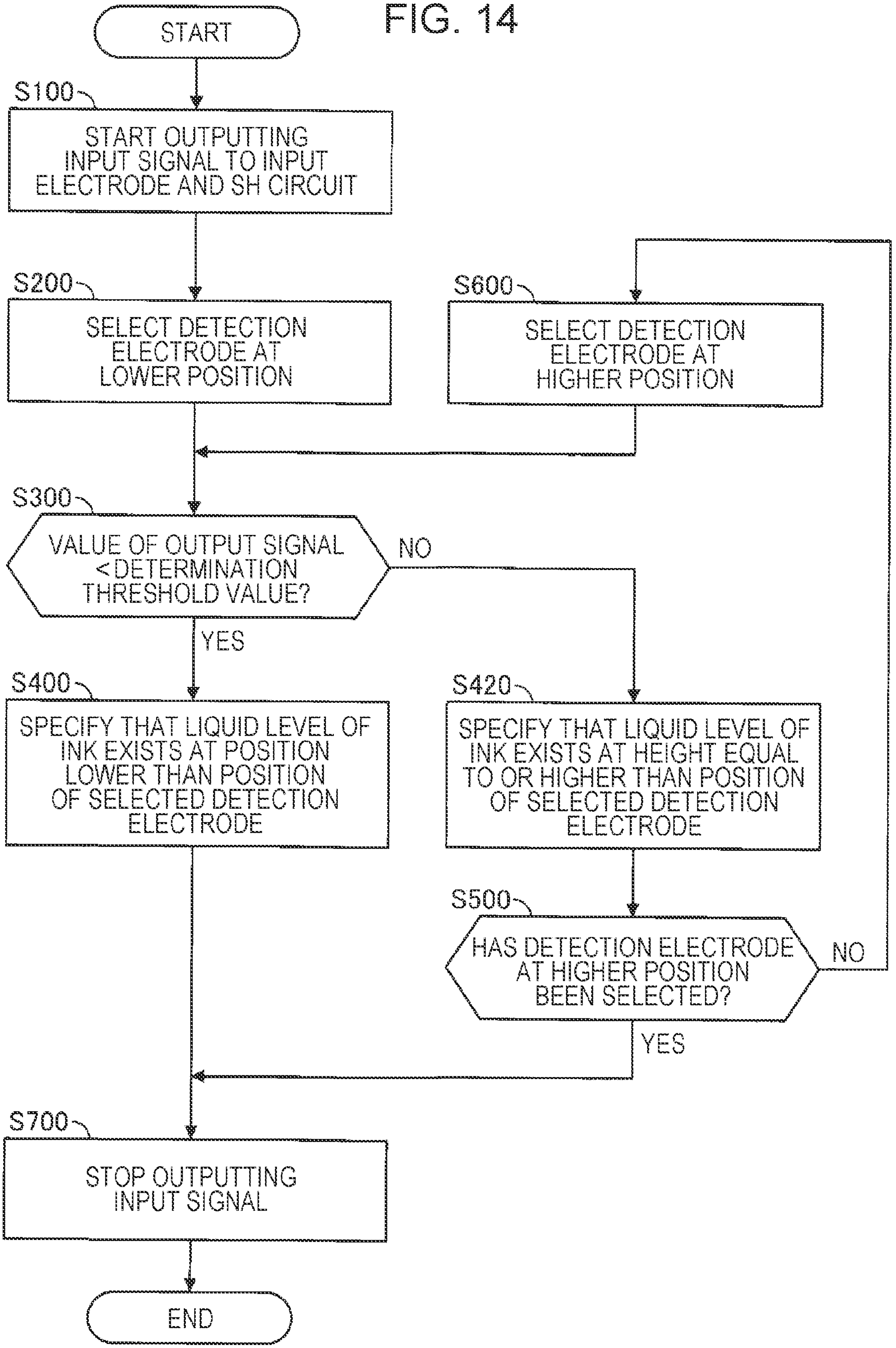
FIG. 14 is a flowchart showing an example of an operation of a control unit.

FIG. 14 is a flowchart showing an example of the operation of the control unit 4. Note that FIG. 14 shows an example of the operation of the control unit 4 when the control unit 4 specifies the storage amount of the ink INK in the ink tank 100.

First, in step S100, the control unit 4 starts outputting the input signal Vin to the input electrode 210 and the SH circuit 25 by controlling the AC power supply ACP. For example, the control unit 4 outputs a control signal for instructing the AC power supply ACP to start outputting the input signal Vin including a pulse having an amplitude of 3.3 [V]. As a result, the AC power supply ACP outputs the input signal Vin to the input electrode 210 and the SH circuit 25.

Next, in step S200, the control unit 4 causes the selection circuit 21 to select the detection electrode 220*a* at the position H1 lower than the detection electrode 220*b* from the detection electrodes 220*a* and 220*b*. As a result, a digital signal indicating the magnitude of the detection signal Vout1 input to the detection circuit 20 from the detection electrode 220*a* selected by the selection circuit 21 is output from the detection circuit 20 to the control unit 4 as the output signal Do.

Next, in step S300, the control unit 4 determines whether or not a value of the output signal Do is less than a determination threshold value. The determination threshold value is, for example, a threshold value corresponding to the voltage Vth shown in FIG. 9. For example, the determination threshold value is a threshold value for determining whether or not the liquid level L of the ink INK in the ink tank 100 is lower than a position corresponding to the detection electrode 220.

If a result of the determination in step S300 is affirmative, the control unit 4 advances the process to step S400. On the other hand, if the result of the determination in step S300 is negative, the control unit 4 advances the process to step S420.

In step S400, the control unit 4 specifies that the liquid level L of the ink INK in the ink tank 100 exists at the position lower than the position of the detection electrode 220 selected by the selection circuit 21. After executing the process of step S400, the control unit 4 advances the process to step S700.

Further, in step S420, the control unit 4 specifies that the liquid level L of the ink INK in the ink tank 100 exists at a height equal to or higher than the position of the detection electrode 220 selected by the selection circuit 21. After executing the process of step S420, the control unit 4 advances the process to step S500.

In step S500, the control unit 4 determines whether or not the detection electrode 220*b* at the position H2 higher than the detection electrode 220*a* has been selected from the detection electrodes 220*a* and 220*b*. If a result of the determination in step S500 is affirmative, the control unit 4 advances the process to step S700. On the other hand, if the result of the determination in step S500 is negative, the control unit 4 advances the process to step S600.

In step S600, the control unit 4 causes the selection circuit 21 to select the detection electrode 220*b* at the position H2 higher than the detection electrode 220*a* from the detection electrodes 220*a* and 220*b*. As a result, a digital signal indicating the magnitude of the detection signal Vout2 input to the detection circuit 20 from the detection electrode 220*b* selected by the selection circuit 21 is output from the detection circuit 20 to the control unit 4 as the output signal Do. After executing the process of step S600, the control unit 4 returns the process to step S300. As a result, the determination is executed as to whether or not the liquid level L of the ink INK in the ink tank 100 is lower than the position corresponding to the detection electrode 220*b*.

Further, in step S700, the control unit 4 stops outputting the input signal Vin to the input electrode 210 and the SH circuit 25 by controlling the AC power supply ACP. For example, the control unit 4 outputs a control signal for instructing the AC power supply ACP to stop outputting the input signal Vin. As a result, the AC power supply ACP stops outputting the input signal Vin. After executing the process of step S700, the control unit 4 ends the process of specifying the storage amount of the ink INK in the ink tank 100.

The operation of the control unit 4 is not limited to the example shown in FIG. 14. For example, the control unit 4 may advance the process to step S500 after executing the process of step S400. That is, even when the control unit 4 specifies that the liquid level L of the ink INK is at the position lower than the position corresponding to the detection electrode 220*a*, the control unit 4 may select the detection electrode 220*b* at the position H2 higher than the detection electrode 220*a* to execute the determination of step S300. Then, for example, when a determination result of step S300 when the detection electrode 220*b* is selected contradicts a determination result of step S300 when the detection electrode 220*a* is selected, the control unit 4 may determine that there is a measurement error.

For example, when the value of the output signal Do indicating the magnitude of the detection signal Vout1 of the detection electrode 220*a* is less than the determination threshold value, the liquid level L of the ink INK is a position lower than the position corresponding to the detection electrode 220*a*. Therefore, the liquid level L of the ink INK is a position lower than the position corresponding to the detection electrode 220*b* at the position H2 higher than the detection electrode 220*a*. Therefore, when a measurement error does not occur, the value of the output signal Do indicating the magnitude of the detection signal Vout2 of the detection electrode 220*b* is less than the determination threshold value. Therefore, when the value of the output signal Do indicating the magnitude of the detection signal Vout1 of the detection electrode 220*a* is less than the determination threshold value and the value of the output signal Do indicating the magnitude of the detection signal Vout2 of the detection electrode 220*b* is equal to or greater than the determination threshold value, the control unit 4 may determine that there is a measurement error.

Further, the control unit 4 may select the detection electrode 220*b* in step S200 and select the detection electrode 220*a* in step S600. In this case, the determination of step S500 is omitted, and the determination as to whether or not the detection electrode 220*a* has been selected is executed after at least step S400 out of steps S400 and 420.

Further, the control unit 4 may determine in step S300 whether or not the value of the output signal Do is equal to or greater than the determination threshold value.

Next, an example of a method for manufacturing the tank unit 10 will be explained with reference to FIG. 15.

Figure 15:
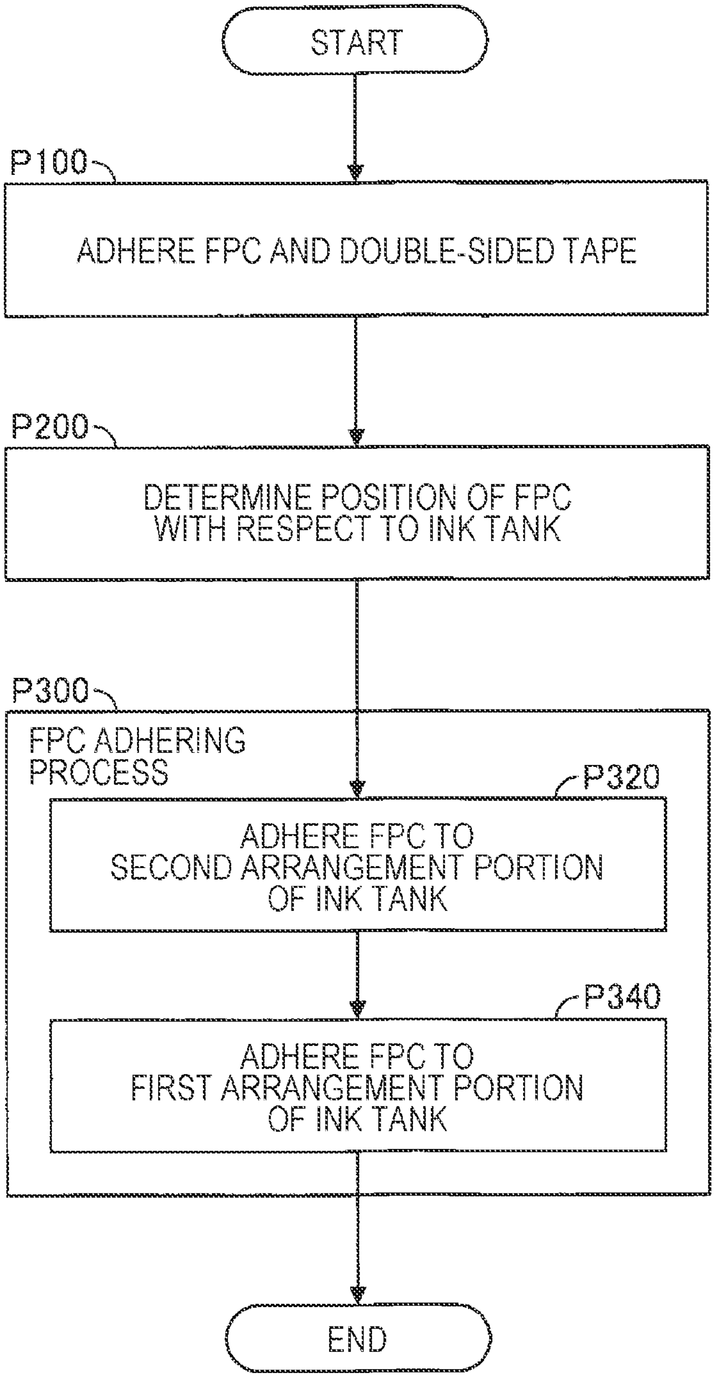
FIG. 15 is an explanatory diagram for explaining an example of a method for manufacturing a tank unit.

FIG. 15 is an explanatory diagram for explaining an example of a method for manufacturing the tank unit 10.

First, in process P100, the first adhesive layer 262 of the double-sided tape 260 and the FPC 200 are adhered to each other.

Next, in process P200, the position of the FPC 200 with respect to the ink tank 100 is determined by fitting between the positioning portion PT10 and the positioning portion PT20 and fitting between the positioning portion PT12 and the positioning portion PT22. That is, the position of the FPC 200 with respect to the ink tank 100 is determined by fitting the positioning portion PT10 provided in the outer wall 120*d* with the positioning portion PT20 provided in the FPC 200.

Next, in an FPC adhering process of process P300, the second adhesive layer 266 of the double-sided tape 260 adhered to the FPC 200 is adhered to the ink tank 100.

More specifically, first, in process P320, the FPC 200 is adhered to the second arrangement portion PP2 of the ink tank 100. In the present embodiment, the second arrangement portion PP2 corresponds to a portion of the plurality of outer walls 120 having a higher elastic modulus than the first arrangement portion PP1. That is, in process P320, the portion of the plurality of outer walls 120 having a higher elastic modulus than the first arrangement portion PP1 is adhered to the second adhesive layer 266 of the double-sided tape 260 adhered to the FPC 200. Therefore, process P320 includes a process of adhering the second adhesive layer 266 of the double-sided tape 260 adhered to the FPC 200 and the outer wall 120*d*. Then, in process P340, the FPC 200 is adhered to the first arrangement portion PP1 of the ink tank 100. More specifically, the first arrangement portion PP1 and the second adhesive layer 266 of the double-sided tape 260 adhered to the FPC 200 are adhered to each other. Therefore, process P340 includes a process of adhering the second adhesive layer 266 of the double-sided tape 260 adhered to the FPC 200 to the outer wall 120*a*. As described above, in the present embodiment, process P300 includes processes P320 and P340.

The ink tank 100 is formed by fixing the outer wall 120*a* formed of a nylon film to a portion formed of a plastic or the like having a higher elastic modulus than the nylon film, for example, the outer walls 120*c*, 120*d* and 120*e*, and the like. The process of fixing the outer wall 120*a* to the outer walls 120*c*, 120*d* and 120*e* and the like may be executed before process P100 or after process P100 as long as it is executed before process P200.

For example, in the manufacturing method of a comparative example in which the FPC 200 is adhered to the outer wall 120*a* and then the outer wall 120*a* is adhered to the outer walls 120*c*, 120*d* and 120*e*, and the like, there is a risk that the FPC 200 will be damaged by a pressing process by a roller for crimping, and the like. On the other hand, in the present embodiment, since the FPC 200 is adhered to the outer wall 120*a* after the process of adhering the outer wall 120*a* to the outer walls 120*c*, 120*d* and 120*e*, and the like, it is possible to suppress the damage to the FPC 200.

Further, in the manufacturing method of another comparative example in which the double-sided tape 260 is adhered to the ink tank 100 and then the double-sided tape 260 and the FPC 200 are adhered, the FPC 200 is adhered to the double-sided tape 260 adhered to the ink tank 100. Therefore, in the manufacturing method of the other comparative example described above, it is difficult to accurately adhere the FPC 200 to the double-sided tape 260 as compared with the present embodiment, so that the attachment position of the FPC 200 may deviate from a predetermined position. If the attachment position of the FPC 200 deviates from the predetermined position, the FPC 200 may float from the ink tank 100.

In the present embodiment, since process P300 of adhering the double-sided tape 260 and the ink tank 100 is executed after process P100 of adhering the FPC 200 and the double-sided tape 260, the FPC 200 can be accurately adhered to the double-sided tape 260. Therefore, in the present embodiment, by executing process P300 after process P100, the tank unit 10 can be easily manufactured while suppressing the deviation of the attachment position of the FPC 200 with respect to the ink tank 100 from the predetermined position.

Next, with reference to FIG. 16, an example of detecting the storage amount of the ink INK when the ink tank 100 is inclined will be explained.

Figure 16:
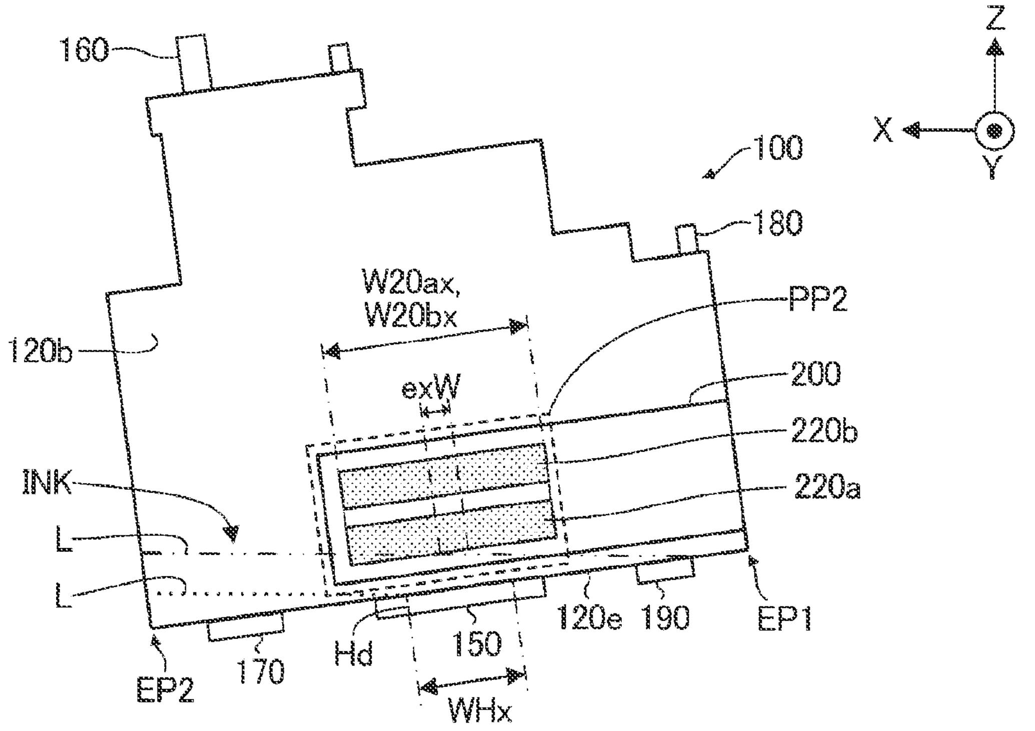
FIG. 16 is an explanatory diagram for explaining an example of detecting the storage amount of the ink when the ink tank is inclined.

FIG. 16 is an explanatory diagram for explaining an example of detecting the storage amount of the ink INK when the ink tank 100 is inclined. FIG. 16 is a schematic view of the ink tank 100 seen from the +Y direction. In FIG. 16, the ink tank 100 in a case where the edge portion EP1 of the outer wall 120*e* is located in the +Z direction with respect to the edge portion EP2 of the outer wall 120*e* is schematically shown. For example, in FIG. 16, in order to make the figure easier to see, the illustration of elements other than the detection electrodes 220*a* and 220*b* among a plurality of elements included in the FPC 200 is omitted.

In the example shown in FIG. 16, the liquid level L of the ink INK indicated by the two-dot chain line is located in the +Z direction with respect to the discharge port Hd. In this case, since the ink INK exists between the input electrode 210 and the detection electrode 220*a*, the detection signal Vout1 having a magnitude corresponding to a proportion of the ink INK existing between the input electrode 210 and the detection electrode 220*a* is input to the detection circuit 20.

For example, when the width W20*ax* of the detection electrode 220*a* is a width exW smaller than the width WHx of the discharge port Hd, there is no ink INK between the input electrode 210 and the detection electrode 220*a* having the width exW. In this case, even if the ink INK that can be used for the printing process remains in the ink tank 100, it is erroneously determined that the storage amount of the ink INK is less than a predetermined lower limit value. The ink INK that can be used for the printing process is, for example, the ink INK that can be discharged from the discharge port Hd when the printing process is executed. In the present embodiment, since the width W20*ax* of the detection electrode 220*a* is larger than the width WHx of the discharge port Hd, it is possible to suppress erroneous determination that the storage amount of the ink INK is less than the lower limit value.

The liquid level L of the ink INK shown by the dotted line in FIG. 16 corresponds to the liquid level L of the ink INK remaining in the space SP without being discharged from the discharge port Hd because the ink tank 100 is inclined. In this case, since the ink INK does not exist between the input electrode 210 and the detection electrode 220*a*, it is determined that the storage amount of the ink INK is less than the lower limit value. As described above, in the present embodiment, since the detection electrode 220*a* is formed near the discharge port Hd, it is possible to suppress the erroneous detection of the ink INK that remains in the space SP without being discharged from the discharge port Hd, as the ink INK that can be used for the printing process. For example, in the aspect of the first comparative example described later in FIG. 17, since the detection electrode 220*a* is formed at a place far from the discharge port Hd, the ink INK remaining in the space SP without being discharged from the discharge port Hd may be erroneously detected as the ink INK that can be used for the printing process.

Next, with reference to FIG. 17, the outline of the ink tank 100Z according to the first comparative example in which the detection electrode 220*a* is formed at a place far from the discharge port Hd will be explained.

Figure 17:
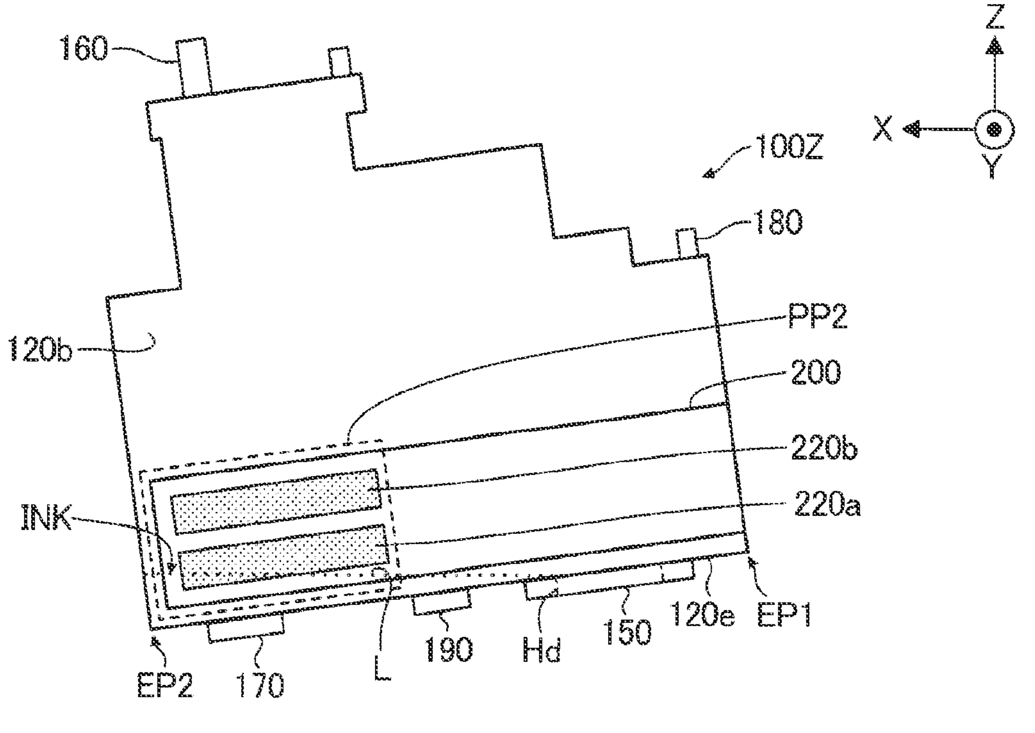
FIG. 17 is an explanatory diagram for explaining the outline of an ink tank according to a first comparative example.

FIG. 17 is an explanatory diagram for explaining the outline of the ink tank 100Z according to the first comparative example. FIG. 17 is a schematic view of the ink tank 100Z seen from the +Y direction. In FIG. 17, similarly to FIG. 16, the ink tank 100Z in a case where the edge portion EP1 of the outer wall 120*e* is located in the +Z direction with respect to the edge portion EP2 of the outer wall 120*e* is schematically shown. In the ink tank 100Z according to the first comparative example, the discharge port Hd is provided near the edge portion EP1 of the outer wall 120*e*, and the detection electrodes 220*a* and 220*b* and the input electrode 210 (not shown in FIG. 17) are provided at a position closer to the edge portion EP1 of the outer wall 120*e* than the discharge port Hd. Other configurations of the ink tank 100Z are the same as the configurations of the ink tank 100 explained with reference to FIGS. 1 to 16.

The liquid level L of the ink INK shown by the dotted line in FIG. 17 corresponds to the liquid level L of the ink INK remaining in the space SP without being discharged from the discharge port Hd because the ink tank 100Z is inclined. In the example shown in FIG. 17, since the ink INK exists between the input electrode 210 and the detection electrode 220*a*, the detection signal Vout1 having a magnitude corresponding to a proportion of the ink INK existing between the input electrode 210 and the detection electrode 220*a* is input to the detection circuit 20. Therefore, in the first comparative example, there is a possibility that the ink INK remaining in the space SP without being discharged from the discharge port Hd is erroneously detected as the ink INK that can be used for the printing process. On the other hand, in the present embodiment, as explained in FIG. 16, since the detection electrode 220*a* is formed near the discharge port Hd, even when the ink tank 100 is inclined, it is possible to suppress the erroneous detection of the storage amount of the ink INK.

Further, in the first comparative example, in a case where the ink tank 100Z is inclined such that the edge portion EP1 near the discharge port Hd is located in the +Z direction with respect to the edge portion EP2 far from the discharge port Hd, the amount of the ink INK remaining in the space SP without being discharged from the discharge port Hd increases as compared with the present embodiment. That is, in the present embodiment, since the discharge port Hd is provided near the center of the outer wall 120*e*, when the ink tank 100 is used in an inclined state, it is possible to reduce the amount of the ink INK remaining in the space SP without being discharged from the discharge port Hd.

As described above, in the present embodiment, the ink jet printer 1 includes the tank unit 10 for storing ink INK, the detection circuit 20 for detecting the storage amount of the ink INK stored in the tank unit 10, and the ejection section 30*a* for ejecting the ink INK supplied from the tank unit 10.

The tank unit 10 includes the ink tank 100, the input electrode 210, the detection electrode 220*a*, and the support portion 130*a*. The ink tank 100 includes the plurality of outer walls 120 and the plurality of partition walls 122, and stores the ink INK in the space SP surrounded by the plurality of outer walls 120*a*, 120*b*, 120*c*, 120*d* and 120*e* and the plurality of partition walls 122*a* and 122*b*. The input electrode 210 is provided in the first arrangement portion PP1 of the outer wall 120*a*. The detection electrode 220*a* is provided in the outer wall 120*b*. The support portion 130*a* supports the first arrangement portion PP1 and the second arrangement portion PP2 of the plurality of outer walls 120. The first arrangement portion PP1 is thinner than the second arrangement portion PP2.

In the present embodiment, the outer wall 120*a* is an example of a "first wall", and the outer wall 120*b* is an example of a "second wall". The first arrangement portion PP1 is an example of a "first portion", and the second arrangement portion PP2 is an example of a "second portion". Further, a part or all of the outer walls 120*b*, 120*c*, 120*d* and 120*e* may be regarded as the "second portion". Further, the input electrode 210 is an example of a "first electrode", and the detection electrode 220*a* is an example of a "second electrode". The support portion 130*a* is an example of a "first support portion", and the support portion 130*b* is an example of the "second support portion". The rod portion 132 of the support portion 130*a* is an example of a "first rod portion", and the rod portion 132 of the support portion 130*b* is an example of a "second rod portion". The rod portions 132*a* and 132*c* are examples of "two rod-shaped portions". The end portion E1 is an example of a "first end portion" and the end portion E2 is an example of a "second end portion". The Z direction is an example of a "first direction", and the X direction is an example of a "second direction". Further, in the modification example described later, an extending portion ET2*a* is an example of an "extending portion".

As described above, in the present embodiment, the first arrangement portion PP1 thinner than the second arrangement portion PP2 is supported by the support portion 130*a*. Thereby, in the present embodiment, it is possible to suppress deformation of the first arrangement portion PP1. That is, in the present embodiment, it is possible to suppress variation of the distance between the input electrode 210 and the detection electrode 220 depending on the position in the first arrangement portion PP1. As a result, in the present embodiment, it is possible to improve the detection accuracy of the storage amount of the ink INK in the ink tank 100.

Further, in the present embodiment, the second arrangement portion PP2 is included in the outer wall 120*b*, and the detection electrode 220 is provided in the second arrangement portion PP2 of the outer wall 120*b*. The support portion 130*a* includes a rod-shaped rod portion 132 that supports the first arrangement portion PP1 and the second arrangement portion PP2. Therefore, in the present embodiment, the rod portion 132 can suppress the deformation of the first arrangement portion PP1.

Further, in the present embodiment, the end portion E1 of the rod portion 132 of the support portion 130*a* is fixed to the edge portion of the first arrangement portion PP1, and the end portion E2 of the rod portion 132 of the support portion 130*a* is fixed to the edge portion of the second arrangement portion PP2. As described above, in the present embodiment, the rod portion 132 is arranged in the vicinity of the input electrode 210 and the detection electrode 220*a* while avoiding the presence of the rod portion 132 between the input electrode 210 and the detection electrode 220*a*. It is considered that the change in capacitance according to the change in storage amount of the ink INK can be detected accurately in a case where the rod portion 132 does not exist between the input electrode 210 and the detection electrode 220*a* as compared with a case where the rod portion 132 exists between the input electrode 210 and the detection electrode 220*a*. That is, in the present embodiment, since it is possible to suppress the deformation of the first arrangement portion PP1 while avoiding the presence of the rod portion 132 between the input electrode 210 and the detection electrode 220*a*, the detection accuracy of the storage amount of the ink INK can be improved efficiently.

Further, in the present embodiment, the support portion 130*b* that supports the first arrangement portion PP1 and the second arrangement portion PP2 is further provided. The support portion 130*b* includes the rod-shaped rod portion 132 that supports the first arrangement portion PP1 and the second arrangement portion PP2. The end portion E1 of the rod portion 132 of the support portion 130*a* and the end portion E1 of the rod portion 132 of the support portion 130*b* are fixed to the edge portion of the first arrangement portion PP1. The end portion E2 of the rod portion 132 of the support portion 130*a* and the end portion E2 of the rod portion 132 of the support portion 130*b* are fixed to the edge portion of the second arrangement portion PP2. The width W20*az* of the detection electrode 220*a* in the Z direction, which is a direction in which the ink INK increases or decreases in the ink tank 100, is smaller than the width W20*ax* of the detection electrode 220*a* in the X direction intersecting the Z direction. The rod portion 132 of the support portion 130*a* and the rod portion 132 of the support portion 130*b* are arranged at a distance in the X direction.

As described above, in the present embodiment, the rod portion 132 of the support portion 130*a* and the rod portion 132 of the support portion 130*b* are arranged in the vicinity of the input electrode 210 and the detection electrodes 220*a* at a distance in the X direction while avoiding the presence of the rod portion 132 between the input electrode 210 and the detection electrode 220*a*. Thereby, in the present embodiment, it is possible to efficiently suppress the deformation of the first arrangement portion PP1 while avoiding the presence of the rod portion 132 between the input electrode 210 and the detection electrode 220*a*.

Further, in the present embodiment, the support portion 130*a* extends along a direction from the first arrangement portion PP1 toward the second arrangement portion PP2. Therefore, in the present embodiment, the support portion 130*a* having a simple configuration can suppress the deformation of the first arrangement portion PP1.

Further, in the present embodiment, the support portion 130*a* may be formed in a grid pattern having openings through which the ink INK passes. In this case, it is possible to suppress the deformation of the first arrangement portion PP1 while suppressing the flow of the ink INK from being blocked by the support portion 130*a*.

Further, in the present embodiment, the support portion 130*a* includes two rod-shaped rod portions 132*a* and 132*c* that support the first arrangement portion PP1 and the second arrangement portion PP2. The width W20*az* of the detection electrode 220*a* in the Z direction is smaller than the width W20*ax* of the detection electrode 220*a* in the X direction intersecting the Z direction. The two rod portions 132*a* and 132*c* of the support portion 130*a* are arranged to be spaced apart from each other in the Z direction. Therefore, in the present embodiment, the deformation of the first arrangement portion PP1 can be suppressed by the two rod portions 132*a* and 132*c* of the support portion 130*a*.

Further, in the present embodiment, the support portion 130*a* is subjected to a water-repellent treatment. Thereby, in the present embodiment, it is possible to suppress the adhesion of the ink INK to the support portion 130*a*.

Further, in the present embodiment, the ink tank 100 includes the discharge port Hd for discharging the ink INK from the space SP. When the discharge port Hd is seen from a direction in which the ink INK decreases in the ink tank 100, the center of the space SP is located inside the discharge port Hd. Thereby, in the present embodiment, for example, when the ink tank 100 is used in an inclined state, it is possible to suppress a decrease in the detection accuracy of the storage amount of the ink INK in the ink tank 100.

2. Modification Example

Each of the above examples can be modified in various ways. Specific aspects of modification are illustrated below. Two or more aspects optionally selected from the following examples can be appropriately combined as long as they do not conflict with each other. In the modification examples exemplified below, for elements whose actions and functions are equivalent to those of the embodiment, the reference numerals referred to in the above description will be used and detailed descriptions thereof will be omitted as appropriate.

First Modification Example

In the above-described embodiment, a case where the FPC 200 extends in the X direction with a substantially constant width is exemplified, but the present disclosure is not limited to such an aspect. For example, widths of the bent portions BP1 and BP2 of the FPC 200 in the Z direction may be smaller than a width of a portion of the FPC 200 other than the bent portions BP1 and BP2 in the Z direction.

Figure 18:
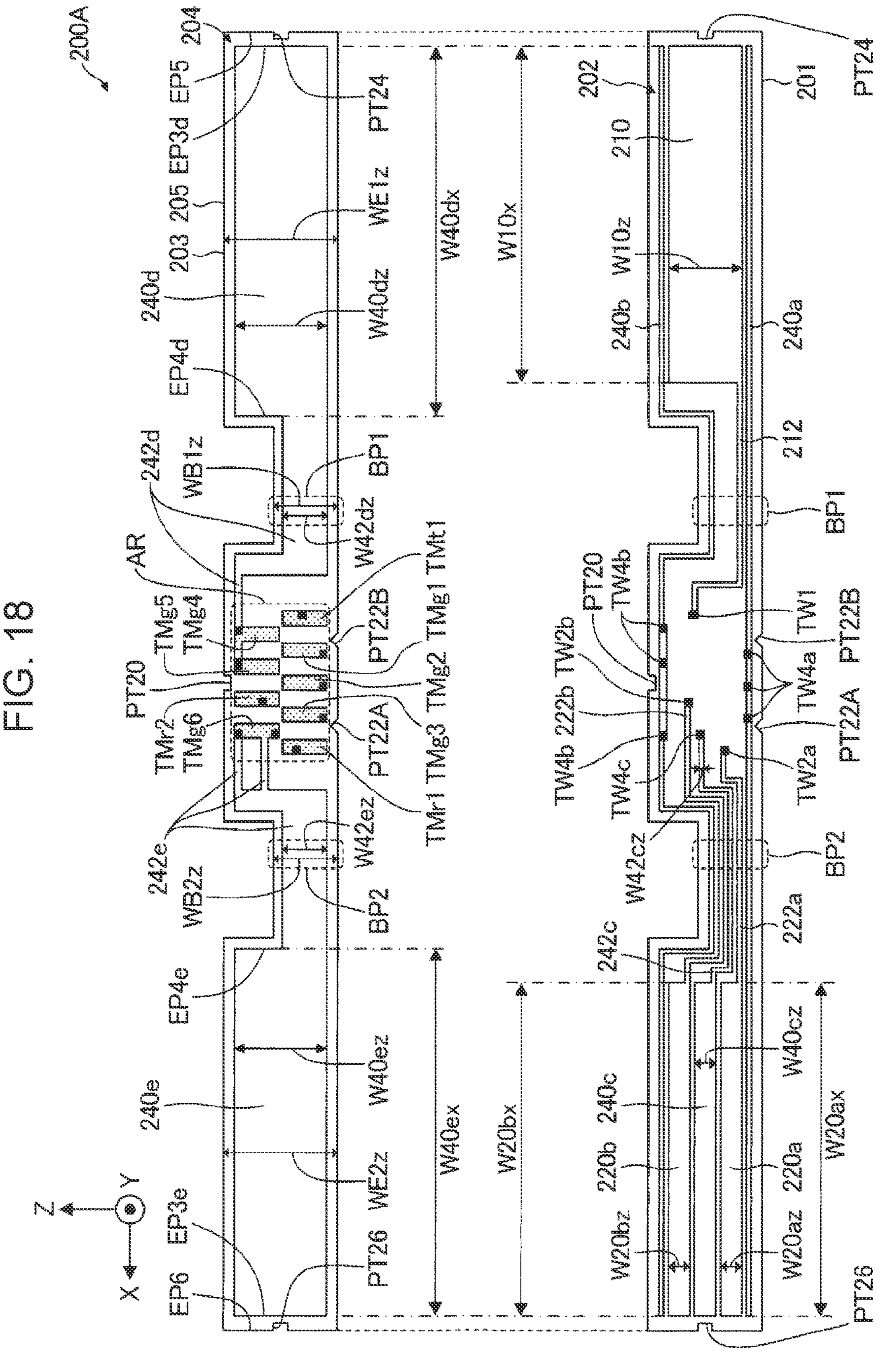
FIG. 18 is a plan view showing an example of a flexible printed substrate according to a first modification example.

FIG. 18 is a plan view showing an example of an FPC 200A according to the first modification example. Note that FIG. 18 shows a plan view of the FPC 200A in a state of not being adhered to the ink tank 100, as in FIG. 11. In FIG. 18, in order to make the figure easier to see, the FPC 200A is described by being divided into a figure of the first cover film layer 201 and the first conductor layer 202, and a figure of the base material layer 203, the second conductor layer 204, and the second cover film layer 205. The same elements as those explained with reference to FIGS. 1 to 17 are designated by the same reference numerals, and detailed explanations thereof will be omitted.

In the FPC 200A, a width WB1*z* of the bent portion BP1 in the Z direction is smaller than a width WE1*z* of a portion where the input electrode 210 is provided in the Z direction. Similarly, a width WB2*z* of the bent portion BP2 in the Z direction is smaller than a width WE2*z* of the portion where the detection electrode 220 is provided in the Z direction. Therefore, in this modification example, the rigidity of the bent portions BP1 and BP2 of the FPC 200A can be made lower than both the rigidity of the portion where the input electrode 210 is provided and the rigidity of the portion where the detection electrode 220 is provided.

Further, since the width WB1*z* of the bent portion BP1 and the width WB2*z* of the bent portion BP2 are different from those of the FPC 200, shapes of the wirings 212, 222*a* and 222*b* and the like are different from those of the FPC 200. For example, in the FPC 200A, the lead wiring 242*c* that couples the shield wiring 240*c* and the through wiring TW4*c* is formed of the same material as the input electrode 210. In this modification example, it is assumed that the shield wiring 240*c* and the lead wiring 242*c* are integrally formed. Further, the FPC 200A includes positioning portions PT22A and PT22B instead of the positioning portion PT22. Further, the FPC 200A includes a positioning portion PT24 and a PT26. Other configurations of the FPC 200A are the same as those of the FPC 200.

For example, the shield wiring 240*d* includes a region that overlaps the entire input electrode 210 and at least a part of the wiring 212 in a plan view from the +Y direction. Also in this modification example, for example, the width W40*dx* of the shield wiring 240*d* in the X direction is larger than the width W10*x* of the input electrode 210 in the X direction. Further, a width W40*dz* of the shield wiring 240*d* in the Z direction is larger than the width W10*z* of the input electrode 210 in the Z direction. In the FPC 200A, the two edge portions EP3*d* and EP4*d* of the shield wiring 240*d* are located in the −X direction with respect to the bent portion BP1. Therefore, a width W42*dz* of the bent portion BP1 in the Z direction of the lead wiring 242*d* of the shield wiring 240*d* is smaller than the width W40*dz* of the shield wiring 240*d* in the Z direction.

Further, for example, the shield wiring 240*e* includes a region that overlaps the entire detection electrode 220*a*, the entire detection electrode 220*b*, at least a part of the wiring 222*a*, and at least a part of the wiring 222*b* in a plan view from the +Y direction. For example, a width W40*ex* of the shield wiring 240*e* in the X direction is larger than both the width W20*ax* of the detection electrode 220*a* in the X direction and the width W20*bx* of the detection electrode 220*b* in the X direction. In the FPC 200A, the two edge portions EP3*e* and EP4*e* of the shield wiring 240*e* are located in the +X direction with respect to the bent portion BP2. Therefore, the width W42*ez* of the bent portion BP2 in the Z direction of the lead wiring 242*e* of the shield wiring 240*e* is smaller than the width W40*ez* of the shield wiring 240*e* in the Z direction.

Further, a width W42*cz* of the lead wiring 242*c* in the Z direction is smaller than the width W40*cz* of the shield wiring 240*c* in the Z direction. In this modification example, it is assumed that the width W40*cz* of the shield wiring 240*c*, the width W20*ax* of the detection electrode 220*a*, and the width W20*bx* of the detection electrode 220*b* are substantially the same.

Further, the positioning portions PT20, PT22A and PT22B are arranged such that a line connecting the positioning portions PT20, PT22A and PT22B is grasped as a triangular shape in a plan view from the +Y direction. For example, the positioning portion PT22B has a center in the FPC 200A at a position deviated from a line passing through a center of the positioning portion PT20 and a center of the positioning portion PT22A.

Further, in the FPC 200A, the positioning portion PT24 is formed on an edge portion EP5 on which the input electrode 210 is provided, and the positioning portion PT26 is formed on an edge portion EP6 on which the detection electrode 220 is provided.

Each of the plurality of positioning portions PT20, PT22A, PT22B, PT24 and PT26 is formed by cutting out the edge portion of the FPC 200A, for example, similarly to the positioning portion P120. The plurality of positioning portions PT20, PT22A, PT22B, PT24 and PT26 are not limited to the cutouts. For example, a part or all of the plurality of positioning portions PT20, PT22A, PT22B, PT24 and PT26 may be through holes penetrating through the FPC 200A in the X direction.

The ink tank 100 to which the FPC 200A is attached is provided with the plurality of positioning portions PT having a one-to-one correspondence with the plurality of positioning portions PT20, PT22A, PT22B, PT24 and PT26. For example, each of the plurality of positioning portions PT provided in the ink tank 100 is formed in a protruding shape for fitting with the corresponding positioning portion PT among the plurality of positioning portions PT20, PT22A, PT22B, PT24 and PT26.

The arrangement of the plurality of positioning portions PT is not limited to the example shown in FIG. 18. For example, in the FPC 200A, two positioning portions PT penetrating through the FPC 200A may be formed at positions sandwiching the terminal arrangement region AR in the X direction.

As described above, even in this modification example, the same effect as that of the above-described embodiment can be obtained. In this modification example, the second conductor layer 204 includes the lead wiring 242*d* coupled to the shield wiring 240*d* and the lead wiring 242*e* coupled to the shield wiring 240*e*. The lead wiring 242*d* includes the bent portion BP1 of which the width W42*dz* in the Z direction is smaller than the width W40*dz* of the shield wiring 240*d* in the Z direction. The lead wiring 242*e* includes the bent portion BP2 of which the width W42*ez* in the Z direction is smaller than the width W40*ez* of the shield wiring 240*e* in the Z direction. The FPC 200A is bent along the outer periphery of the ink tank 100 at the bent portions BP1 and BP2. Thereby, in this modification example, the rigidity of the bent portion BP1 can be made lower than that of a portion where the shield wiring 240*d* is arranged. Similarly, in this modification example, the rigidity of the bent portion BP2 can be made lower than that of a portion where the shield wiring 240*e* is arranged.

Further, in this modification example, in the FPC 200A, the positioning portion PT22B has a center at a position deviated from the line passing through the center of the positioning portion PT20 and the center of the positioning portion PT22A. In this case, the positioning portions PT20, PT22A and PT22B are arranged such that the line connecting the positioning portions PT20, PT22A and PT22B is grasped as a triangular shape in a plan view from the +Y direction. Therefore, in this modification example, for example, it is possible to further reduce the deviation of the position of the FPC 200 with respect to the ink tank 100 from the predetermined position as compared with a case where the positioning portions PT are only the positioning portions PT10 and PT20.

Further, in this modification example, the FPC 200A includes the positioning portion PT24. The positioning portion PT24 is located at the edge portion EP5 on which the input electrode 210 is provided. The ink tank 100 includes the positioning portion PT that is fitted with the positioning portion PT24. In this case, it is possible to reduce the deviation of the position of the input electrode 210 with respect to the ink tank 100 from the predetermined position.

Further, in this modification example, the FPC 200A includes the positioning portion PT26. The positioning portion PT26 is located at the edge portion EP6 on which the detection electrode 220 is provided. The ink tank 100 includes the positioning portion PT that is fitted with the positioning portion PT26. In this case, it is possible to reduce the deviation of the position of the detection electrode 220 with respect to the ink tank 100 from the predetermined position.

Second Modification Example

In the above-described embodiment and modification example, a case where the position of the wiring 222*a* overlaps the detection electrode 220*a* in the Z direction is exemplified, but the present disclosure is not limited to such an aspect. For example, a position of a part of the wiring 222*a* and the position of the detection electrode 220*a* may be different from each other in the Z direction.

Figure 19:
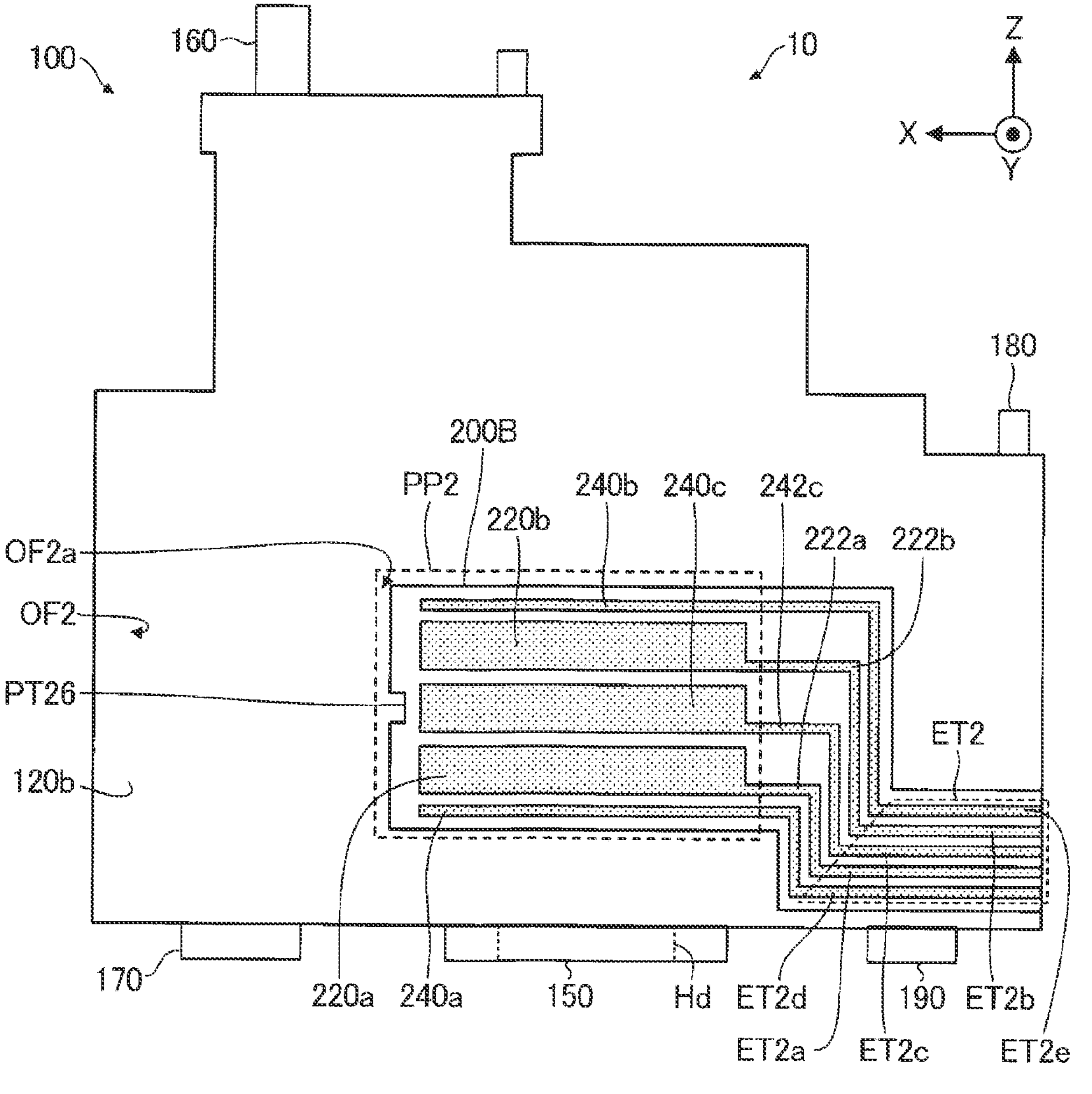
FIG. 19 is an explanatory diagram for explaining the outline of a flexible printed substrate according to a second modification example.

FIG. 19 is an explanatory diagram for explaining the outline of the FPC 200B according to the second modification example. Note that FIG. 19 is a plan view of the ink tank 100 and the FPC 200B as seen from the +Y direction. In FIG. 19, in order to make the explanation easier to understand, the illustration of the shield wiring 240*e* and the like is omitted. The same elements as those explained in FIGS. 1 to 18 are designated by the same reference numerals, and detailed explanations thereof will be omitted.

The FPC 200B is the same as the FPC 200A shown in FIG. 18 except that the wirings 222*a*, 222*b* and the like are formed so as to extend in the X direction through the position in the −Z direction with respect to the detection electrode 220*a*. For example, the wiring 222*a* includes an extending portion ET2*a* extending in the X direction, and the wiring 222*b* includes an extending portion ET2*b* extending in the X direction. Further, the lead wiring 242*c* includes an extending portion ET2*c* extending in the X direction. The shield wiring 240*a* includes an extending portion ET2*d* extending in the X direction, and the shield wiring 240*b* includes an extending portion ET2*e* extending in the X direction. In the below, the extending portions ET2*a*, ET2*b*, ET2*c*, ET2*d* and ET2*e* may be collectively referred to as extending portions ET2.

For example, all the extending portions ET2 are located in the −Z direction with respect to the detection electrode 220*a*. In the example shown in FIG. 19, the extending portion ET2*a* of the wiring 222*a* is located closer to the discharge port Hd than the detection electrode 220*a* in the Z direction. Similarly, the extending portion ET2*b* of the wiring 222*b* is located closer to the discharge port Hd than the detection electrode 220*b* in the Z direction.

For example, when the liquid level L of the ink INK changes from a position within a range of the wiring 222*a* in the Z direction to a position in the −Z direction with respect to the wiring 222*a* or a position in the +Z direction with respect to the wiring 222*a*, the wiring 222*a* may detect a change in the remaining amount of the ink INK.

When the range of the wiring 222*a* in the Z direction overlaps a range of the detection electrode 220*a* in the Z direction, the timing at which the detection electrode 220*a* detects the change in the remaining amount of the ink INK may overlap a timing at which the wiring 222*a* detects the change in the remaining amount of the ink INK. In this case, an error corresponding to a detection result by the wiring 222*a* may be included in a detection result by the detection electrode 220*a*. Therefore, for example, it is preferable that the wiring 222*a* is routed mainly through the position in the −Z direction with respect to the detection electrode 220*a* or the position in the +Z direction with respect to the detection electrode 220*a*.

In this modification example, since the wirings 222*a*, 222*b* and the like are routed through the position in the −Z direction with respect to the detection electrode 220*a*, the detection accuracy of the storage amount of the ink INK can be improved as compared with a case where the range of the wiring 222*a* in the Z direction overlaps the range of the detection electrode 220*a* in the Z direction.

Next, the overall configuration of the FPC 200B will be explained with reference to FIG. 20.

Figure 20:
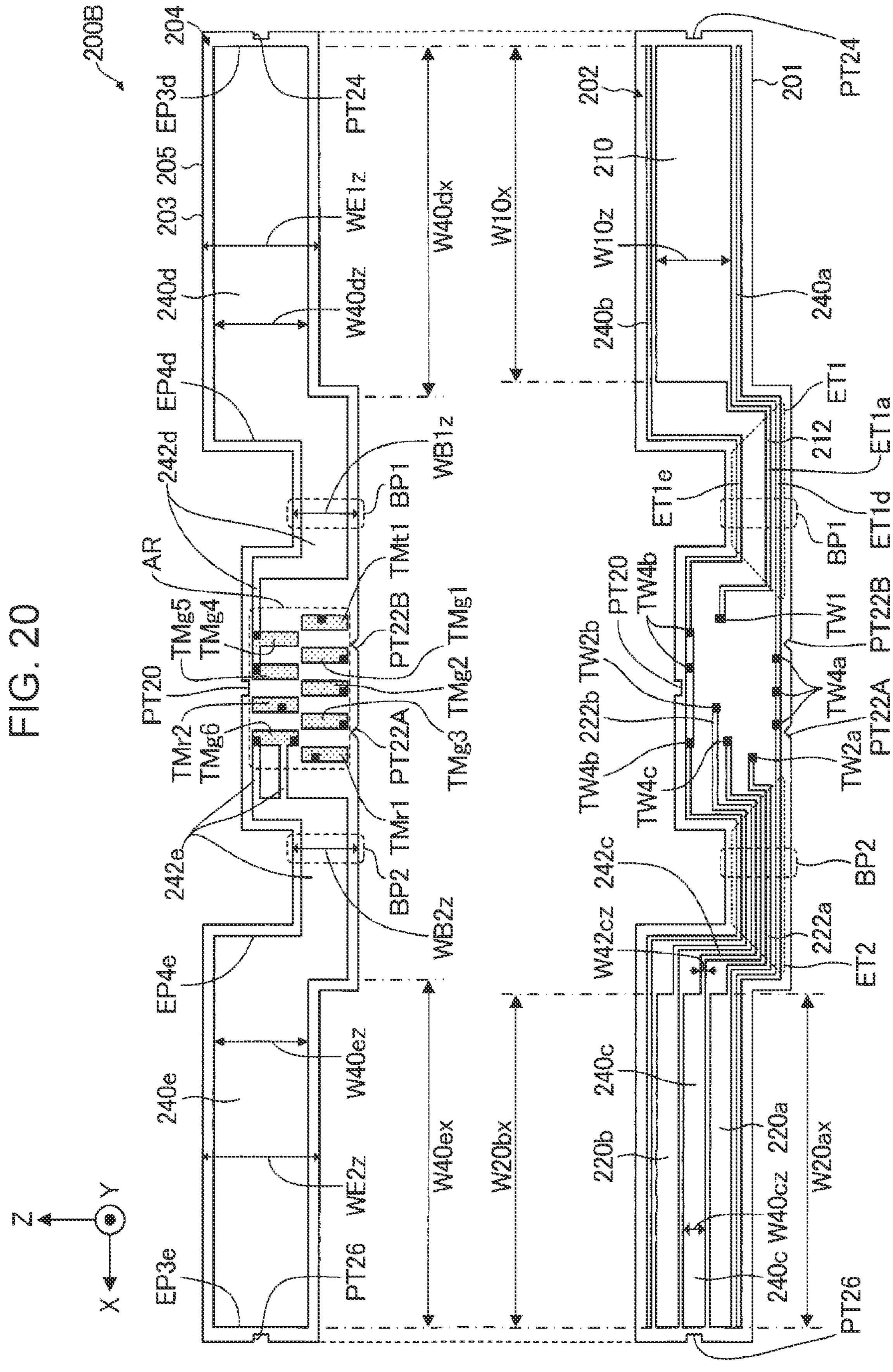
FIG. 20 is a plan view showing an example of the flexible printed substrate shown in FIG. 19.

FIG. 20 is a plan view showing an example of the FPC 200B shown in FIG. 19. Note that FIG. 20 shows a plan view of the FPC 200B in a state of not being adhered to the ink tank 100, as in FIG. 18. Further, in FIG. 20, the FPC 200B is described by being divided into a figure of the first cover film layer 201 and the first conductor layer 202, and a figure of the base material layer 203, the second conductor layer 204, and the second cover film layer 205, as in FIG. 18. The same elements as those explained with reference to FIGS. 1 to 19 are designated by the same reference numerals, and detailed explanations thereof will be omitted.

In the FPC 200B, the wirings 212, 222*a* and 222*b* and the shield wirings 240*a* and 240*b* are routed through the positions in the −Z direction with respect to both the input electrode 210 and the detection electrode 220*a*.

For example, the wiring 212 includes an extending portion ET1*a* extending in the X direction. Further, the shield wiring 240*a* includes an extending portion ET1*d* extending in the X direction, and the shield wiring 240*b* includes an extending portion ET1*e* extending in the X direction. Hereinafter, the extending portions ET1*a*, ET1*d* and ET1*e* may be collectively referred to as extending portions ET1.

For example, the extending portion ET1 of each of the wiring 212 and the shield wirings 240*a* and 240*b* extends in the X direction through the bent portion BP1. Similarly, for example, the extending portion ET2 of each of the wirings 222*a* and 222*b* and the shield wirings 240*a*, 240*b* and 240*c* extends in the X direction through the bent portion BP2.

Further, the extending portion ET1 of each of the wiring 212 and the shield wirings 240*a* and 240*b* are located in the −Z direction with respect to the input electrode 210. For example, the extending portion ET1*a* of the wiring 212 is located closer to the discharge port Hd than the input electrode 210 in the Z direction, similarly to the extending portion ET2*a* of the wiring 222*a* explained in FIG. 19.

Further, for example, the lead wiring 242*d* of the shield wiring 240*d* is formed in a shape including a region overlapping the extending portion ET1 of each of the wiring 212 and the shield wirings 240*a* and 240*b* in a plan view from the +Y direction. Similarly, the lead wiring 242*e* of the shield wiring 240*e* is formed in a shape including a region overlapping the extending portion ET2 of each of the wirings 222*a* and 222*b* and the shield wirings 240*a* and 240*b* in a plan view from the +Y direction.

Also in the FPC 200B, the width WB1*z* of the bent portion BP1 in the Z direction is smaller than the width WE1*z* of the portion where the input electrode 210 is provided in the Z direction, and the width WB2*z* of the bent portion BP2 in the Z direction is smaller than the width WE2*z* of the portion where the detection electrode 220 is provided in the Z direction. Therefore, also in this modification example, the rigidity of the bent portions BP1 and BP2 of the FPC 200A can be made lower than both the rigidity of the portion where the input electrode 210 is provided and the rigidity of the portion where the detection electrode 220 is provided.

The configuration of the FPC 200B according to the second modification example is not limited to the examples shown in FIGS. 19 and 20. For example, the extending portion ET1 of each of the wiring 212 and the shield wirings 240*a* and 240*b* may be located in the +Z direction with respect to the input electrode 210. Similarly, the extending portion ET2 of each of the wirings 222*a* and 222*b* and the shield wirings 240*a* and 240*b* may be located in the +Z direction with respect to the detection electrode 220*b*. Also in this case, for example, in the wiring 222*a*, the portion where the position in the Z direction overlaps the detection electrode 220*a* can be reduced, so that the detection accuracy of the storage amount of the ink INK can be improved.

As described above, also in this modification example, the same effect as that of the above-described embodiment and modification example can be obtained. Further, in this modification example, the wiring 212 includes the extending portion ET1*a* extending in the X direction. Further, the wiring 222*a* includes the extending portion ET2*a* extending in the X direction, and the wiring 222*b* includes the extending portion ET2*b* extending in the X direction. The position of the extending portion ET1*a* of the wiring 212 in the Z direction and the position of the input electrode 210 in the Z direction are different from each other. The position of the extending portion ET2*a* of the wiring 222*a* in the Z direction and the position of the detection electrode 220*a* in the Z direction are different from each other, and the position of the extending portion ET2*b* of the wiring 222*b* in the Z direction and the position of the detection electrode 220*b* in the Z direction are different from each other.

For example, in this modification example, the extending portion ET1*a* of the wiring 212 is located in the −Z direction with respect to the input electrode 210, and the extending portion ET2*a* of the wiring 222*a* is located in the −Z direction with respect to the detection electrode 220*a*. Further, the extending portion ET2*b* of the wiring 222*b* is located in the −Z direction with respect to the detection electrode 220*b*.

Further, in this modification example, the extending portion ET1*a* of the wiring 212 is located closer to the discharge port Hd than the input electrode 210 in the Z direction. The extending portion ET2*a* of the wiring 222*a* is located closer to the discharge port Hd than the detection electrode 220*b* in the Z direction.

As described above, in this modification example, the wirings 212, 222*a* and 222*b* and the shield wirings 240*a* and 240*b* are routed through the positions in the −Z direction with respect to both the input electrode 210 and the detection electrode 220*a*. Therefore, in this modification example, for example, the detection accuracy of the storage amount of the ink INK can be improved as compared with a case where the range of the wiring 222*a* in the Z direction overlaps the range of the detection electrode 220*a* in the Z direction.

Third Modification Example

In the above-described embodiment and modification examples, a case where the entire outer wall 120*a* is formed of a nylon film has been exemplified, but the present disclosure is not limited to such an aspect. For example, a portion of the outer wall 120*a* other than the first arrangement portion PP1 may be formed of a plastic having a higher elastic modulus than the nylon film.

Figure 21:
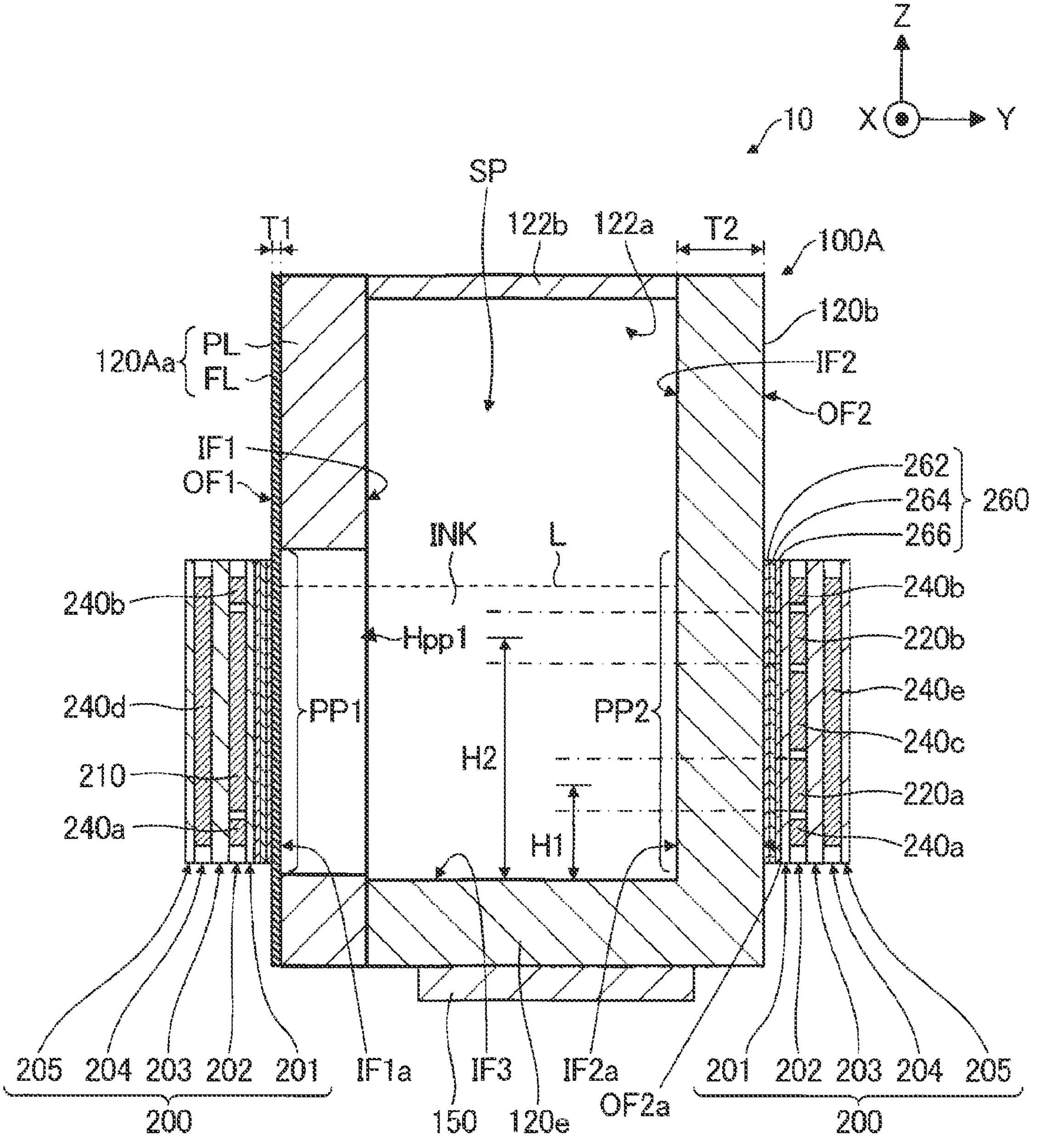
FIG. 21 is a cross-sectional view showing an example of a cross section of an ink tank and a flexible printed substrate according to a third modification example.

FIG. 21 is a cross-sectional view showing an example of a cross section of the ink tank 100A and the FPC 200 according to the third modification example. The cross section of the ink tanks 100A and FPC 200 shown in FIG. 21 corresponds to the cross section taken along the line A1-A2 shown in FIG. 3. In FIG. 21, elements located in the +Z direction with respect to the partition wall 122*b*, the support portion 130 and the like are not shown, as in FIG. 7. The same elements as those explained in FIGS. 1 to 20 are designated by the same reference numerals, and detailed explanations thereof will be omitted.

The ink tank 100A is the same as the ink tank 100 shown in FIG. 7 except that the ink tank 100A includes an outer wall 120Aa instead of the outer wall 120*a* shown in FIG. 7. The outer wall 120Aa includes a film portion FL formed of a film such as a nylon film and a plastic portion PL formed of a plastic having an elastic modulus larger than that of the film portion FL. For example, the material of the plastic portion PL is, for example, the same as the material of the outer wall 120*b*.

Further, the film portion FL is the same as the outer wall 120*a* shown in FIG. 7. However, the film portion FL is adhered to the plastic portion PL. The plastic portion PL is adhered to the outer walls 120*c*, 120*d* and 120*e* and the like in the same manner as the outer wall 120*a* shown in FIG. 7. That is, the plastic portion PL is located inside the film portion FL. Further, in the plastic portion PL, a through hole Hpp1 penetrating through the plastic portion PL is formed in the first arrangement portion PP'. When the outer wall 120Aa is seen from the −Y direction, a shape of a peripheral edge portion of the through hole Hpp1 is grasped as a shape similar to that of the first arrangement portion PP1, for example, a rectangular shape. Therefore, a thickness T1 of the film portion FL is the thickness of the first arrangement portion PP1 where the input electrode 210 or the like is provided. The thickness T1 of the film portion FL is thinner than, for example, the thickness T2 of the outer wall 120*b* formed of a plastic or the thickness T3 of the outer wall 120*d* shown in FIG. 5.

The configuration of the ink tank 100A is not limited to the example shown in FIG. 21. For example, the film portion FL may be formed in a size including the first arrangement portion PP1 and a peripheral portion of the first arrangement portion PP1 as long as the strength of adhesion to the plastic portion PL can be ensured. Further, an inner peripheral surface of the through hole Hpp1 may be subject to the water-repellent treatment. Further, in the inner peripheral surface of the through hole Hpp1, the inner peripheral surface close to the outer wall 120*e* may be inclined such that an opening in the +Y direction is larger than an opening in the −Y direction. In this case, it is possible to suppress that the ink INK remains in the through hole Hpp1.

Further, for example, the outer wall 120*b* may include the film portion FL and the plastic portion PL in the same manner as the outer wall 120Aa or the outer wall 120Ba shown in FIG. 22 described later. In this case, in the plastic portion PL formed as a part of the outer wall 120*b*, a through hole penetrating through the plastic portion PL is formed in the second arrangement portion PP2. In this case, the influence of the capacitance C5 of the second arrangement portion PP2 on the capacitance CC between the input electrode 210 and the detection electrode 220*a* can be reduced.

As described above, also in this modification example, the same effect as that of the above-described embodiment and modification example can be obtained. Further, in this modification example, the first arrangement portion PP1 of the outer wall 120Aa is thinner than a portion of the outer wall 120Aa other than the first arrangement portion PP1. In other words, the portion of the outer wall 120Aa other than the first arrangement portion PP1 is thicker than the first arrangement portion PP1. Therefore, in this modification example, for example, it is possible to suppress the deformation of the outer wall 120Aa due to the pressure inside the ink tank 100 and the like, as compared with an aspect in which the entire outer wall 120*a* is as thin as the first arrangement portion PP1. That is, in this modification example, it is possible to manufacture an ink tank 100 that is not easily deformed.

Further, in this modification example, the second arrangement portion PP2 may be thinner than at least a part of the plurality of outer walls 120 other than the first arrangement portion PP1. That is, the outer wall 120*b* may include the second arrangement portion PP2 as a third portion thinner than at least a part of the plurality of outer walls 120 other than the first arrangement portion PP1. The detection electrode 220*a* is provided in the second arrangement portion PP2. In this case, the first arrangement portion PP1 of the outer wall 120Aa is thinner than a portion of the plurality of outer walls 120 other than the first arrangement portion PP1 and the second arrangement portion PP2.

When the first arrangement portion PP1 and the second arrangement portion PP2 are thinner than other portions among the plurality of outer walls 120, the influence of the capacitance C1 of the first arrangement portion PP1 and the capacitance C5 of the second arrangement portion PP2 on the capacitance CC between the input electrode 210 and the detection electrode 220*a* becomes small. Therefore, among the plurality of outer walls 120, when the first arrangement portion PP1 and the second arrangement portion PP2 are thinner than other portions, it is possible to improve the detection accuracy of the storage amount of the ink INK as compared with a case where the second arrangement portion PP2 is not thinner than the other portions.

Fourth Modification Example

In the above-described third modification example, a case where the plastic portion PL is located inside among the film portion FL and the plastic portion PL included in the outer wall 120Aa is exemplified, but the present disclosure is not limited to such an aspect. For example, the film portion FL may be located inside among the film portion FL and the plastic portion PL included in the outer wall 120Aa.

Figure 22:
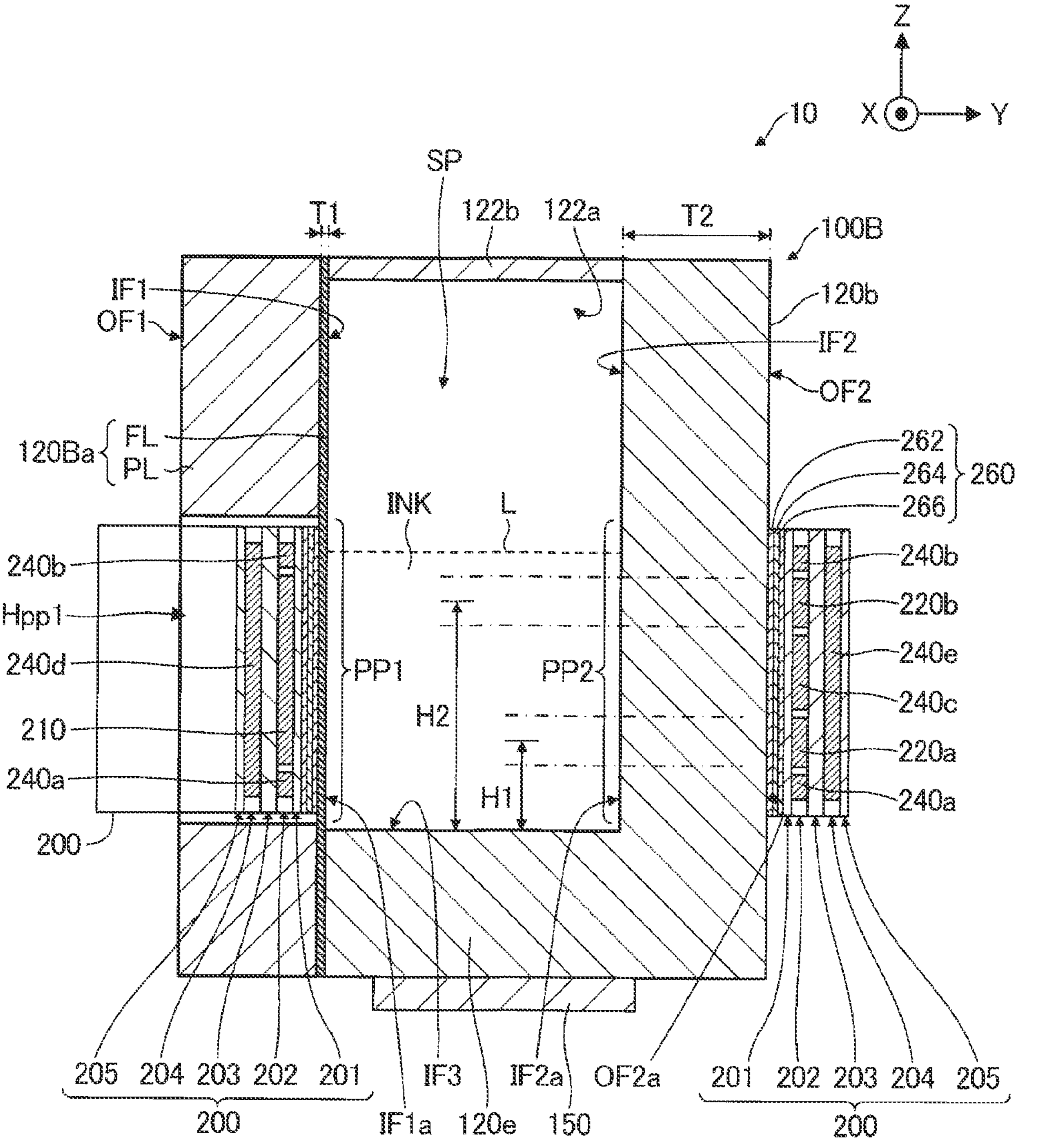
FIG. 22 is a cross-sectional view showing an example of a cross section of an ink tank and a flexible printed substrate according to a fourth modification example.

FIG. 22 is a cross-sectional view showing an example of a cross section of the ink tank 100B and the FPC 200 according to the fourth modification example. The cross section of the ink tank 100B and FPC 200 shown in FIG. 22 corresponds to the cross section taken along the line A1-A2 shown in FIG. 3. Also in FIG. 22, elements located in the +Z direction with respect to the partition wall 122*b*, the support portion 130 and the like are not shown, as in FIG. 7. The same elements as those explained in FIGS. 1 to 21 are designated by the same reference numerals, and detailed explanations thereof will be omitted.

The ink tank 100B is the same as the ink tank 100 shown in FIG. 7 except that the ink tank 100B includes an outer wall 120Ba instead of the outer wall 120*a* shown in FIG. 7. The outer wall 120Ba includes a film portion FL formed of a film such as a nylon film and a plastic portion PL formed of a plastic having an elastic modulus larger than that of the film portion FL. For example, the material of the plastic portion PL is, for example, the same as the material of the outer wall 120*b*.

Further, the film portion FL is the same as the outer wall 120*a* shown in FIG. 7. For example, the film portion FL is adhered to the outer walls 120*c*, 120*d* and 120*e*, and the like, similarly to the outer wall 120*a* shown in FIG. 7. However, a surface of the film portion FL opposite to the inner surface IF1 is adhered to the plastic portion PL. That is, the film portion FL is located inside the plastic portion PL. Further, in the plastic portion PL, a through hole Hpp1 penetrating through the plastic portion PL is formed in the first arrangement portion PP'. When the outer wall 120Aa is seen from the −Y direction, a shape of a peripheral edge portion of the through hole Hpp1 is grasped as a shape similar to that of the first arrangement portion PP1, for example, a rectangular shape. Therefore, a thickness T1 of the film portion FL is the thickness of the first arrangement portion PP1 where the input electrode 210 or the like is provided. The thickness T1 of the film portion FL is thinner than, for example, the thickness T2 of the outer wall 120*b* formed of a plastic or the thickness T3 of the outer wall 120*d* shown in FIG. 5.

Figure 23:
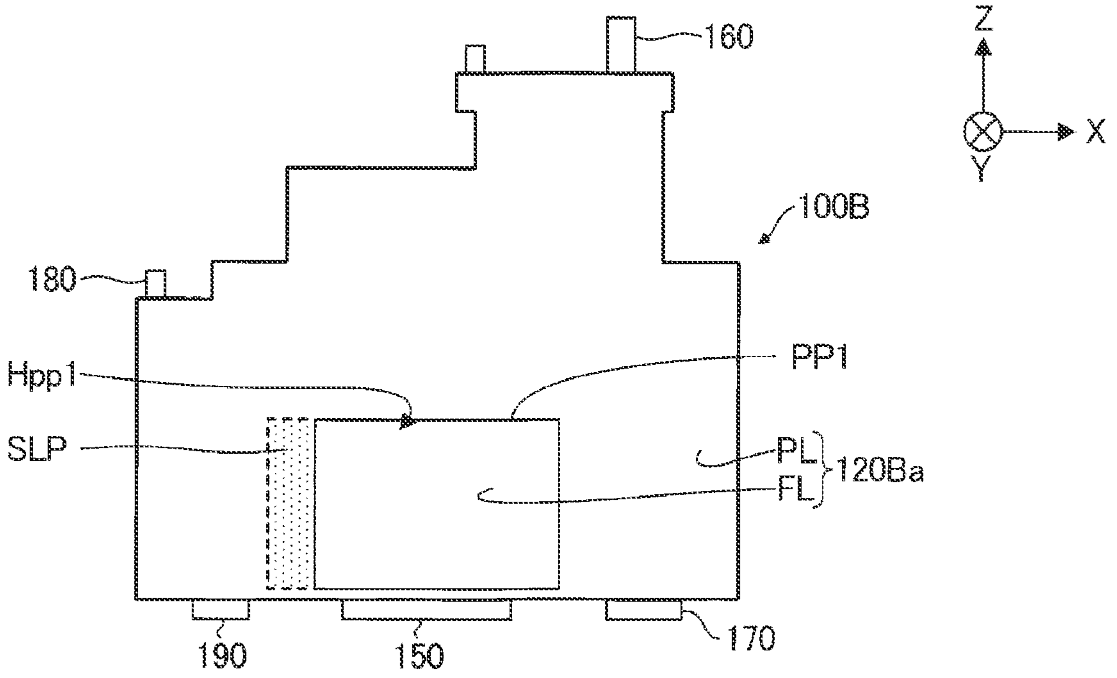
FIG. 23 is a plan view showing an example of the ink tank shown in FIG. 22.

Further, as shown in FIG. 23, in the inner peripheral surface of the through hole Hpp1, an inner peripheral surface SLP to which the FPC 200 is adhered is inclined such that an opening in the −Y direction is larger than an opening in the +Y direction.

FIG. 23 is a plan view showing an example of the ink tank 100B shown in FIG. 22. Note that FIG. 22 is a plan view of the ink tank 100B seen from the −Y direction. For example, in FIG. 16, the FPC 200 is not shown in order to make the figure easier to see.

In the inner peripheral surface of the through hole Hpp1 that penetrates through the plastic portion PL included in the outer wall 120Ba, the inner peripheral surface SLP to which the FPC 200 is adhered is inclined such that the opening in the −Y direction is larger than the opening in the +Y direction. A shaded portion in the figure shows the inner peripheral surface SLP that is inclined such that the opening in the −Y direction is larger than the opening in the +Y direction. In this modification example, the FPC 200 and the first arrangement portion PP1 of the film portion FL can be easily adhered to each other as compared with a case where the inner peripheral surface SLP is substantially perpendicular to the first arrangement portion PP1 of the film portion FL.

The configuration of the ink tank 100B is not limited to the examples shown in FIGS. 22 and 23. For example, the film portion FL may be formed in a size including the first arrangement portion PP1 and a peripheral portion of the first arrangement portion PP1 as long as the strength of adhesion to the plastic portion PL can be ensured.

Further, for example, the outer wall 120*b* may include the film portion FL and the plastic portion PL in the same manner as the outer wall 120Ba or the outer wall 120Aa shown in FIG. 21. In this case, in the plastic portion PL formed as a part of the outer wall 120*b*, a through hole penetrating through the plastic portion PL is formed in the second arrangement portion PP2. In this case, the influence of the capacitance C5 of the second arrangement portion PP2 on the capacitance CC between the input electrode 210 and the detection electrode 220*a* can be reduced.

As described above, also in this modification example, the same effect as that of the above-described embodiment and modification example can be obtained.

Fifth Modification Example

In the above-described embodiment and modification examples, a case where the number of the detection electrodes 220 is two is exemplified, but the present disclosure is not limited to such an aspect. For example, the number of the detection electrodes 220 may be one or three or more.

Figure 24:
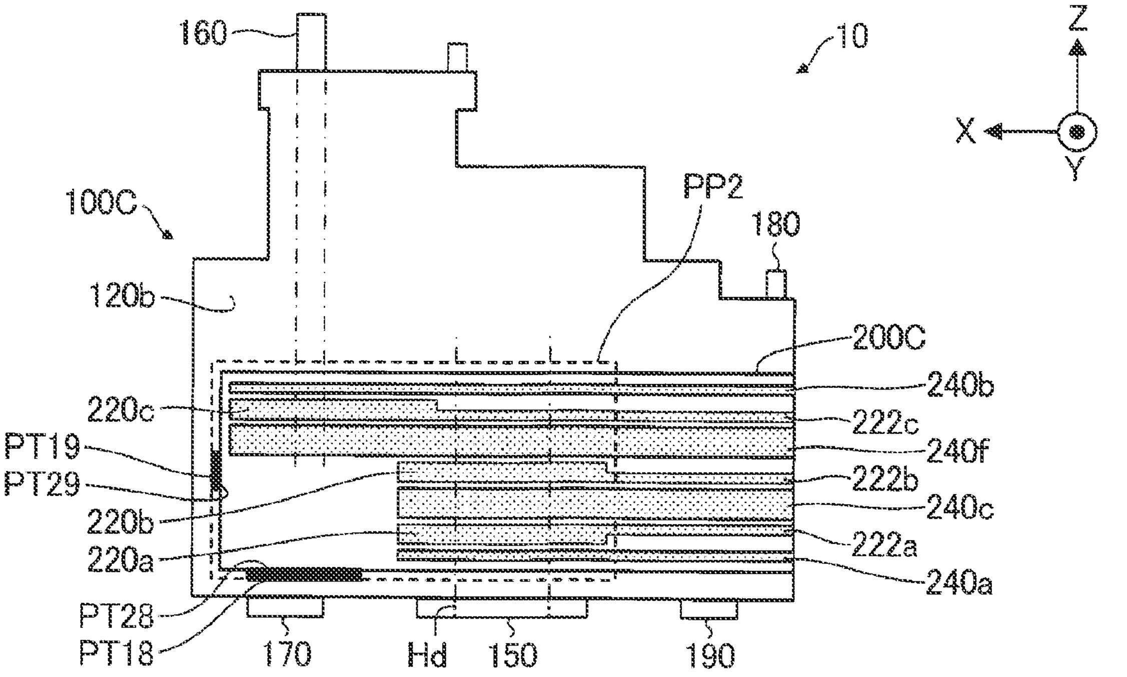
FIG. 24 is an explanatory diagram for explaining the outline of an ink tank and a flexible printed substrate according to a fifth modification example.

FIG. 24 is an explanatory diagram for explaining the outline of an ink tank 100C and an FPC 200C according to the fifth modification example. Note that FIG. 24 is a plan view of the ink tank 100 and the FPC 200 as seen from the +Y direction. In FIG. 24, the shield wiring 240*e* and the like are not shown in order to make the explanation easier to understand. The same elements as those explained in FIGS. 1 to 18 are designated by the same reference numerals, and detailed explanations thereof will be omitted.

The tank unit 10 is the same as the tank unit 10 shown in FIG. 3 except that the tank unit 10 includes the ink tank 100C and the FPC 200C instead of the ink tank 100 and the FPC 200 shown in FIG. 3. The ink tank 100C is the same as the ink tank 100 shown in FIG. 3 except that the FPC 200C is attached instead of the FPC 200 and that the ink tank 100C includes a positioning portion PT18 and a positioning portion PT19.

For example, the outer wall 120*b* of the ink tank 100C is provided with a positioning portion PT18 that determines the position of the lower side of the FPC 200C and a positioning portion PT18 that determines the position of the edge portion of the FPC 200C. The positioning portions PT18 and PT19 project, for example, in the +Y direction. The positioning portion PT18 extends in the X direction, and the positioning portion PT19 extends in the Z direction.

Of two sides of the FPC 200C along the X direction, a part of the side in the −Z direction functions as the positioning portion PT28. Of two sides of the FPC 200C along the Z direction, a part of the side close to the detection electrode 220 functions as the positioning portion PT29.

The FPC 200C is the same as the FPC 200 shown in FIG. 3 except that the FPC 200C includes a detection electrode 220*c* provided in the second arrangement portion PP2, a wiring 222*c* coupled to the detection electrode 220*c*, and a shield wiring 240*f*. For example, the detection electrode 220*c*, the wiring 222*c*, and the shield wiring 240*f* are formed of the same material as the input electrode 210 and are formed on the first conductor layer 202. For example, the wiring 222*c* is formed integrally with the detection electrode 220*c*.

The shield wiring 240*f* is located between the wiring 222*c* integrally formed with the detection electrode 220*c* and the wiring 222*b* integrally formed with the detection electrode 220*b*. The shield wiring 240*f* can reduce the interference between the detection electrodes 220*b* and 220*c*.

The detection electrode 220*c* is located between the shield wiring 240*f* and the shield wiring 240*b*. Further, the detection electrode 220*c* is the detection electrode 220 closest to the supply port 160 among the detection electrodes 220*a*, 220*b* and 220*c*. For example, the detection electrode 220*c* functions as an upper limit electrode for detecting whether or not the storage amount of the ink INK stored in the ink tank 100C is an upper limit storage amount. In this modification example, the detection electrode 220*c* extends in the X direction. Further, the position of the discharge port Hd in the X direction and the position of the detection electrode 220*c* in the X direction are different from each other. For example, the range of the discharge port Hd in the X direction does not overlap the range of the detection electrode 220*c* in the X direction. Further, at least a part of the range of the detection electrode 220*c* in the X direction overlaps at least a part of the range of the supply port 160 in the X direction. Therefore, in this modification example, when the storage amount of the ink INK exceeds the upper limit storage amount at the time of supplying the ink INK, it is possible to reduce the delay of the detection that the storage amount of the ink INK exceeds the upper limit storage amount.

The configurations of the ink tank 100C and the FPC 200C are not limited to the example shown in FIG. 24. For example, the positioning portions PT18 and PT19 may be omitted. Further, for example, the detection electrode 220*c* may be arranged such that the position in the X direction is the same as the detection electrodes 220*a* and 220*b*.

As described above, also in this modification example, the same effect as that of the above-described embodiment and modification example can be obtained. Further, in this modification example, the tank unit 10 includes the detection electrode 220*c* provided in the second arrangement portion PP2. Thereby, in this modification example, the storage amount of the ink INK can be detected in multiple stages.

Further, in this modification example, the ink tank 100C includes the supply port 160 for supplying the ink INK to the space SP. The detection electrodes 220*b* and 220*c* include the upper limit electrode for detecting whether or not the storage amount of the ink INK stored in the ink tank 100C is the upper limit storage amount. Of the detection electrodes 220*a*, 220*b* and 220*c*, the detection electrode 220 that functions as the upper limit electrode is closest to the supply port 160. In this modification example, the detection electrode 220*c* can detect whether or not the storage amount of the ink INK is the upper limit storage amount.

Further, in this modification example, the detection electrode 220*c* extends in the X direction. Further, the position of the discharge port Hd in the X direction and the position of the detection electrode 220*c* in the X direction are different from each other. At least a part of the range of the detection electrode 220*c* in the X direction overlaps at least a part of the range of the supply port 160 in the X direction. Therefore, in this modification example, when the storage amount of the ink INK exceeds the upper limit storage amount at the time of supplying the ink INK, it is possible to reduce the delay of the detection that the storage amount of the ink INK exceeds the upper limit storage amount.

Sixth Modification Example

In the above-described embodiment and modification examples, a film such as a nylon film may be adhered to the outer surface OF2 of the outer wall 120*b*. That is, a film may be provided between the outer wall 120*b* and the FPC 200. Further, both the outer walls 120*a* and 120*b* may be formed of a film such as a nylon film. Alternatively, the outer wall 120*b* may be formed of a film such as a nylon film, and the outer wall 120*a* may be formed of a plastic having a higher elastic modulus than the outer wall 120*b*.

Seventh Modification Example

In the above-described embodiment and modification examples, the ink jet printer 1 in which the tank unit 10 is not mounted on the carriage 32 is exemplified, but the present disclosure is not limited to such an aspect. For example, the tank unit 10 may be mounted on the carriage 32 or may be mounted on an ink server that supplies the ink INK to a printing apparatus. Further, the "liquid ejection apparatus" is not limited to the ink jet printer 1, and may be another printing apparatus. Further, the "storage device" is not limited to the tank unit 10 that stores the ink INK. For example, the "storage device" may be a device for storing an object other than the ink INK. That is, the "object" is not limited to the ink INK. For example, the "object" may be a liquid other than the ink INK, or may be a fluid. For example, the "object" may be oil.

Eighth Modification Example

In the above-described embodiment and modification examples, the support portion 130 may be omitted. Further, a flexible flat cable may be used instead of the FPC 200.

Ninth Modification Example

In the above-described embodiment and modification examples, a case where the discharge port Hd is located near the center of the outer wall 120*e* has been exemplified, but the present disclosure is not limited to such an aspect. For example, the discharge port Hd may be formed in the vicinity of one of the edge portions EP1 and EP2 of the outer wall 120*e*. Further, when the discharge port Hd is seen from the −Z direction, an aspect in which the discharge port Hd is not located between the input electrode 210 and the detection electrode 220 may be adopted. Further, even when the discharge port Hd is located near the center of the outer wall 120*e*, an aspect in which the discharge port Hd is not located between the input electrode 210 and the detection electrode 220 when the discharge port Hd is seen from the −Z direction may be adopted.

What is claimed is:

1. A storage device comprising:

a storage section including a plurality of walls and storing an object in a space surrounded by the plurality of walls;

a first electrode provided in a first portion of a first wall among the plurality of walls;

a second electrode provided in a second wall among the plurality of walls; and a first support portion supporting the first portion and a second portion among the plurality of walls, wherein the first portion is thinner than the second portion.

2. The storage device according to claim 1, wherein the second portion is included in the second wall, the second electrode is provided in the second portion of the second wall, and the first support portion includes a rod-shaped first rod portion that supports the first portion and the second portion.

3. The storage device according to claim 2, wherein a first end portion of the first rod portion is fixed to an edge portion of the first portion, and a second end portion of the first rod portion is fixed to an edge portion of the second portion.

4. The storage device according to claim 2, further comprising a second support portion supporting the first portion and the second portion, wherein the second support portion includes a rod-shaped second rod portion that supports the first portion and the second portion, a first end portion of the first rod portion and a first end portion of the second rod portion are fixed to an edge portion of the first portion, a second end portion of the first rod portion and a second end portion of the second rod portion are fixed to an edge portion of the second portion, a width of the second electrode in a first direction, which is a direction in which the object increases or decreases in the storage section, is smaller than a width of the second electrode in a second direction intersecting the first direction, and the first rod portion and the second rod portion are arranged at a distance in the second direction.

5. The storage device according to claim 2, wherein the first support portion extends along a direction from the first portion toward the second portion.

6. The storage device according to claim 1, wherein the first support portion is formed in a grid pattern having openings through which the object passes.

7. The storage device according to claim 1, wherein the second portion is included in the second wall, the second electrode is provided in the second portion of the second wall, the first support portion includes two rod-shaped portions that support the first portion and the second portion, a width of the second electrode in a first direction, which is a direction in which the object increases or decreases in the storage section, is smaller than a width of the second electrode in a second direction intersecting the first direction, and the two rod-shaped portions are arranged to be spaced apart from each other in the first direction.

8. The storage device according to claim 1, wherein the first support portion is subjected to a water-repellent treatment.

9. The storage device according to claim 1, wherein the storage section includes a discharge port for discharging the object from the space, and when the discharge port is seen from a direction in which the object decreases in the storage section, a center of the space is located inside the discharge port.

10. A liquid ejection apparatus comprising:

a storage device storing a liquid;

a detection circuit detecting a storage amount of the liquid stored in the storage device; and an ejection section ejecting the liquid supplied from the storage device, wherein the storage device includes a storage section including a plurality of walls and storing the liquid in a space surrounded by the plurality of walls, a first electrode provided in a first portion of a first wall among the plurality of walls, a second electrode provided in a second wall among the plurality of walls, and a first support portion supporting the first portion and a second portion among the plurality of walls, and the first portion is thinner than the second portion.

* * * * *